US012354605B2

(12) United States Patent
Kang et al.

(10) Patent No.: US 12,354,605 B2
(45) Date of Patent: Jul. 8, 2025

(54) ELECTRONIC DEVICE FOR PROCESSING USER SPEECH AND OPERATING METHOD THEREFOR

(71) Applicant: SAMSUNG ELECTRONICS CO., LTD., Suwon-si (KR)

(72) Inventors: Sang-Ki Kang, Suwon-si (KR); Jang-Seok Seo, Suwon-si (KR); Kook-Tae Choi, Seongnam-si (KR); Hyun-Woo Kang, Suwon-si (KR); Jin-Yeol Kim, Seoul (KR); Chae-Hwan Li, Suwon-si (KR); Kyung-Tae Kim, Hwaseong-si (KR); Dong-Ho Jang, Hwaseong-si (KR); Min-Kyung Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/629,194

(22) Filed: Apr. 8, 2024

(65) Prior Publication Data
US 2024/0274131 A1    Aug. 15, 2024

Related U.S. Application Data

(63) Continuation of application No. 17/572,419, filed on Jan. 10, 2022, now Pat. No. 11,955,124, which is a
(Continued)

(30) Foreign Application Priority Data
Mar. 28, 2017 (KR) .................. 10-2017-0039495

(51) Int. Cl.
*G10L 15/22* (2006.01)
*G06F 3/02* (2006.01)
(Continued)

(52) U.S. Cl.
CPC ............... *G10L 15/22* (2013.01); *G06F 3/02* (2013.01); *G06F 3/04886* (2013.01);
(Continued)

(58) Field of Classification Search
CPC ... G10L 15/22; G10L 2015/223; G10L 15/26; G10L 15/30; G10L 2015/225;
(Continued)

(56) References Cited

U.S. PATENT DOCUMENTS 5,799,279 A     8/1998  Gould et al.
11,222,635 B2 * 1/2022  Kang ...................... G06F 3/167
(Continued)

FOREIGN PATENT DOCUMENTS

EP    2669889 A2 *  4/2013  ............. G10L 15/26
EP    2 669 889     12/2013
(Continued)

OTHER PUBLICATIONS

International Search Report for PCT/KR2018/001408, mailed Apr. 25, 2018, 38 pages.
(Continued)

*Primary Examiner* — Vijay B Chawan
(74) *Attorney, Agent, or Firm* — Nixon & Vanderhye, P.C.

(57) ABSTRACT

An example electronic device includes a housing; a touch-screen display; a microphone; at least one speaker; a button disposed on a portion of the housing or set to be displayed on the touchscreen display; a wireless communication circuit; a processor; and a memory. When a user interface is not displayed on the touchscreen display, the electronic device enables a user to receive a user input through the button, receives user speech through the microphone, and then provides data on the user speech to an external server. An instruction for performing a task is received from the server.
(Continued)

When the user interface is displayed on the touchscreen display, the electronic device enables the user to receive the user input through the button, receives user speech through the microphone, and then provides data on the user speech to the external server.

15 Claims, 63 Drawing Sheets

Related U.S. Application Data continuation of application No. 16/497,088, filed as application No. PCT/KR2018/001408 on Feb. 1, 2018, now Pat. No. 11,222,635.

(51) Int. Cl.
*G06F 3/04886* (2022.01)
*G06F 3/16* (2006.01)
*G10L 15/30* (2013.01)

(52) U.S. Cl.
CPC .............. *G06F 3/167* (2013.01); *G10L 15/30* (2013.01); *G10L 2015/223* (2013.01)

(58) Field of Classification Search
CPC ..... G10L 15/063; G10L 15/28; G10L 15/005; G10L 15/04; G06F 3/167; G06F 3/0488; G06F 3/04886
USPC ........................................................ 704/275
See application file for complete search history.

(56) References Cited

U.S. PATENT DOCUMENTS

| | | | |
|---|---|---|---|
| 2008/0086306 A1* | 4/2008 | Hirota | H04M 3/4936 704/E15.044 |
| 2010/0312547 A1 | 12/2010 | Van Os et al. | |
| 2012/0034904 A1 | 2/2012 | LeBeau et al. | |
| 2013/0325484 A1* | 12/2013 | Chakladar | G10L 15/26 704/275 |
| 2014/0218372 A1 | 8/2014 | Missig | |
| 2014/0237367 A1* | 8/2014 | Jung | G06F 3/04845 715/728 |
| 2014/0358533 A1 | 12/2014 | Kurata | |
| 2014/0358535 A1* | 12/2014 | Lee | G10L 17/22 704/233 |
| 2015/0025890 A1 | 1/2015 | Jagatheesan et al. | |
| 2015/0185980 A1* | 7/2015 | An | G06F 3/0484 715/803 |
| 2016/0132293 A1* | 5/2016 | Ballinger | G10L 15/26 704/8 |
| 2016/0240194 A1* | 8/2016 | Lee | G06F 1/3293 |
| 2017/0110117 A1* | 4/2017 | Chakladar | G10L 15/16 |
| 2017/0116990 A1 | 4/2017 | Faaborg et al. | |
| 2017/0162198 A1* | 6/2017 | Chakladar | G06F 3/167 |
| 2019/0325872 A1* | 10/2019 | Song | G10L 15/30 |
| 2020/0036827 A1* | 1/2020 | Choi | H04M 1/72403 |
| 2020/0051560 A1* | 2/2020 | Yi | G06F 40/295 |
| 2020/0279563 A1* | 9/2020 | Chakladar | G10L 15/22 |
| 2020/0326832 A1* | 10/2020 | Lee | G06F 3/041 |
| 2021/0109703 A1* | 4/2021 | Kim | G06F 9/451 |
| 2022/0130388 A1* | 4/2022 | Kang | G10L 15/30 |

FOREIGN PATENT DOCUMENTS

| | | |
|---|---|---|
| KR | 10-2013-0133629 | 12/2013 |
| KR | 10-2015-0116389 | 10/2015 |
| KR | 10-2016-0033233 | 3/2016 |
| KR | 10-2016-0039244 | 4/2016 |

OTHER PUBLICATIONS

Written Opinion of the ISA for PCT/KR2018/001408, mailed Apr. 25, 2018, 5 pages.
Extended Search Report mailed Mar. 9, 2020 in counterpart European Patent Application No. 18775255.5.
Notification of the Reasons for Rejection mailed Aug. 31, 2021 in counterpart Korean Patent Application No. 10-2017-0039495 and English-language translation.
Extended Search Report dated Jan. 4, 2023 in European Patent Application No. 22199889.1.
Kang et al, U.S. Appl. No. 16/497,088, filed Sep. 24, 2019, now U.S. Pat. No. 11,222,635.
Kang et al, U.S. Appl. No. 17/572,419, filed Jan. 10, 2022, allowed.

* cited by examiner

ELECTRONIC DEVICE FOR PROCESSING USER SPEECH AND OPERATING METHOD THEREFOR

CROSS-REFERENCE TO RELATED APPLICATIONS

This application is a continuation of U.S. application Ser. No. 17/572,419, filed Jan. 10, 2022, which is a continuation of U.S. application Ser. No. 16/497,088, filed Sep. 24, 2019, now U.S. Pat. No. 11,222,635, which is the U.S. national phase of International Application No. PCT/KR2018/001408 filed Feb. 1, 2018, which designated the U.S. and claims priority to KR Patent Application No. 10-2017-0039495 filed Mar. 28, 2017. The entire contents of each of these applications are hereby incorporated by reference.

BACKGROUND

Field

Various embodiments of the present invention relate to electronic devices for processing users' utterance and methods for operating the same.

Description of Related Art

There have been developed technologies capable of receiving users' speeches through a speech recognition service or interface to provide various content services based on the users' intention or performing particular functions of electronic devices. Linguistic understanding is technology for recognizing and applying/processing a human being's language or text, and this encompasses natural language processing, machine translation, dialog system, answering inquiries, and speech recognition/synthesis.

Automatic speech recognition (ASR) may receive a user's speech, extract acoustic feature vectors from the speech, and generate text corresponding to the speech based on the feature vectors. ARS enables an electronic device to receive natural language inputs from the user's direct inputs. Natural language means language that human beings normally understand. Natural language cannot directly be appreciated by machines without separate analysis. Generally, natural language understanding (NLU) methods in speech recognition systems may include methods of understanding speech language via semantic steps of grammar manually built up and understanding methods by allowing word strings to correspond to a semantic structure defined based on a language model generated in a statistical method.

Electronic devices may provide various forms of speech-based services to users through speech recognition and natural language processing.

SUMMARY

Electronic devices may provide different results for the same user's utterance depending on speech processing methods. For example, in a case where a dictation service applies to the user's utterance "How's the weather today?" an electronic device may output the text recognition result "How's the weather?" and, in a case where a conversation service applies, the electronic device may provide the response "It's clear today." Electronic devices have difficulty in processing a user utterance corresponding to, e.g., a dictation service or conversation service and selecting a processing mode for the user utterance based on, e.g., the state of the electronic device.

According to various embodiments of the present invention, electronic devices and methods of operating the same may provide results processed according to various user utterance modes.

According to various embodiments of the present invention, an electronic device comprises a housing including a front surface, a rear surface, and a side surface surrounding a space between the front surface and the rear surface, a touchscreen display disposed in the housing and exposed through the front surface, a microphone disposed in the housing and exposed through a portion of the housing, at least one speaker disposed in the housing and exposed through another portion of the housing, a button disposed on yet another portion of the housing or configured to be displayed on the touchscreen display, a wireless communication circuit positioned in the housing, a processor positioned in the housing and electrically connected with the touchscreen display, the microphone, the speaker, and the wireless communication circuit, and a memory positioned in the housing and electrically connected with the processor, wherein the memory is configured to store a first application program including a first user interface to receive a text entry and store instructions which, when executed, enable the processor to perform a first operation and a second operation, wherein the first operation may include receiving a first-type user input through the button while the first user interface is not displayed on the touchscreen display, after receiving the first-type user input, receiving a first user utterance through the microphone, providing first data about the first user utterance to an external server including an automatic speech recognition (ASR) system and an intelligence system and, after providing the first data, receiving at least one command to perform a task generated by the intelligence system in response to the first user utterance from the external server, and the second operation may include receiving the first user input through the button while the first user interface is displayed on the touchscreen display, after receiving the first-type user input, receiving a second user utterance through the microphone, providing second data about the second user utterance to the external server, after providing the second data, receiving data about a text generated by the automatic speech recognition from the second user utterance from the external server but not receiving a command generated by the intelligence system, and entering the text to the first user interface.

According to various embodiments of the present invention, an electronic device comprises a housing including a front surface, a rear surface, and a side surface surrounding a space between the front surface and the rear surface, a touchscreen display disposed in the housing and exposed through the front surface, a microphone disposed in the housing and exposed through a portion of the housing, at least one speaker disposed in the housing and exposed through another portion of the housing, a button disposed on yet another portion of the housing or configured to be displayed on the touchscreen display, a wireless communication circuit positioned in the housing, a processor positioned in the housing and electrically connected with the touchscreen display, the microphone, the speaker, and the wireless communication circuit, and a memory positioned in the housing and electrically connected with the processor, wherein the memory is configured to store a first application program including a first user interface to receive a text entry and store instructions which, when executed, enable the processor to perform a first operation and a second operation, wherein the first operation may include receiving a first-type user input through the button, after receiving the first-type user input, receiving a first user utterance through the microphone, providing first data about the first user utterance to an external server including an automatic speech recognition (ASR) system and an intelligence system and, after providing the first data, receiving at least one command to perform a task generated by the intelligence system in response to the first user utterance from the external server, and the second operation may include receiving a second-type user input through the button, after receiving the second-type user input, receiving a second user utterance through the microphone, providing second data about the second user utterance to the external server, after providing the second data, receiving data about a text generated by ASR from the second user utterance from the external server but not receiving a command generated by the intelligence system, and entering the text to the first user interface.

According to various embodiments of the present invention, an electronic device comprises a housing including a front surface, a rear surface, and a side surface surrounding a space between the front surface and the rear surface, a touchscreen display disposed in the housing and exposed through the front surface, a microphone disposed in the housing and exposed through a portion of the housing, a wireless communication circuit positioned in the housing, a processor positioned in the housing and electrically connected with the touchscreen display, the microphone, the speaker, and the wireless communication circuit, and a memory positioned in the housing and electrically connected with the processor, wherein when executed, the memory may enable the processor to receive a user utterance through the microphone, send information associated with whether to perform natural language understanding (NLU) on a text obtained by performing automatic speech recognition (ASR) on data about the user utterance along with the data about the user utterance to an external server performing at least one of automatic speech recognition (ASR) or natural language understanding (NLU), if the information indicates not to perform the natural language understanding, receive the text for the data about the user utterance from the external server and, if the information indicates to perform the natural language understanding, receive a command obtained as a result of performing the natural language understanding on the text from the external server.

According to various embodiments of the present invention, it is possible to select any one of various user utterance processing modes based on at least one of the state of the electronic device or a user input and to provide the results processed according to the selected user utterance processing mode.

DETAILED DESCRIPTION

Figure 1:
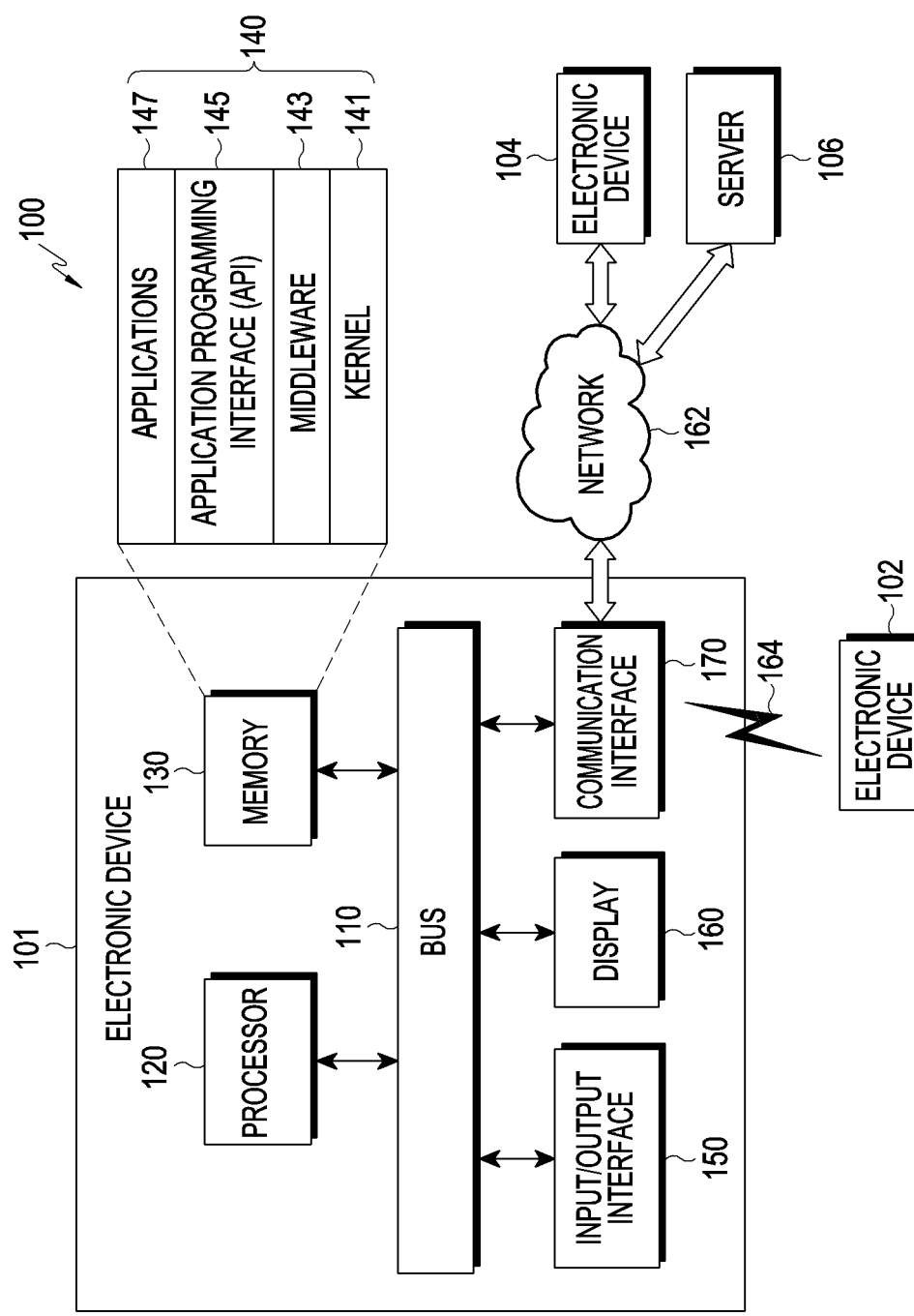
FIG. 1 is a block diagram illustrating an electronic device and a network according to various embodiments of the present invention.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present invention, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to various embodiments, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment of the present invention, the wireless communication may include at least one of, e.g., wireless fidelity (Wi-Fi), Bluetooth, Bluetooth low power (BLE), ZigBee, near field communication (NFC), magnetic secure transmission (MST), radio frequency, or body area network (BAN). According to an embodiment of the present invention, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
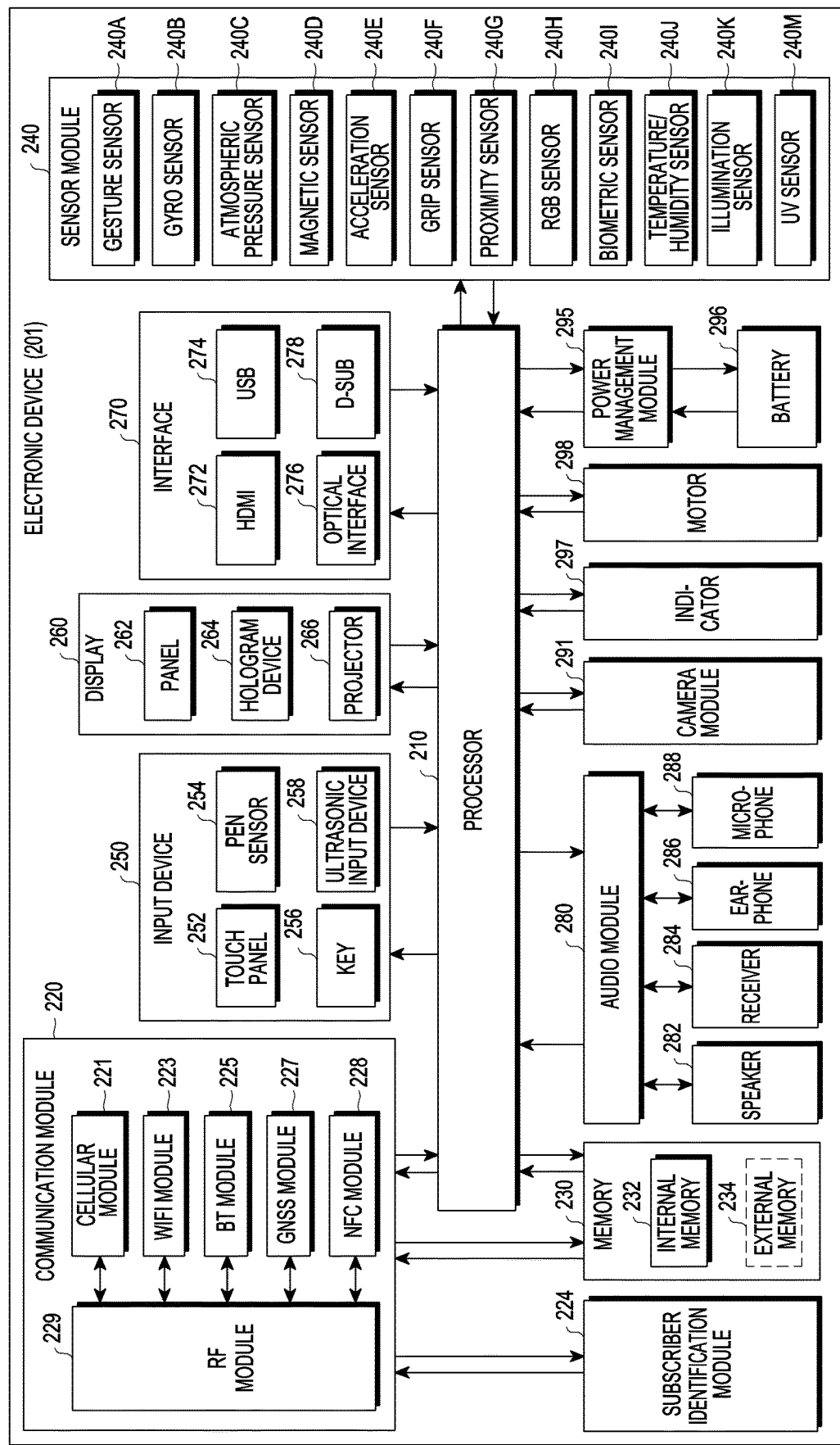
FIG. 2 is a block diagram illustrating an electronic device according to various embodiments of the present invention.

FIG. 2 is a block diagram illustrating an electronic device 201 according to various embodiments. The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a wireless fidelity (Wi-Fi) module 223, a Bluetooth (BT) module 225, a GNSS module 227, an NFC module 228, and an RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment, the cellular module 221 may perform at least some of the functions providable by the processor 210. According to an embodiment, the cellular module 221 may include a communication processor (CP). According to an embodiment of the present invention, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to another embodiment, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (IC-CID) or subscriber information (e.g., an international mobile subscriber identity (IMSI)).

The memory 230 (e.g., the memory 130) may include, e.g., an internal memory 232 or an external memory 234. For example, the internal memory 232 may include at least one of a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment, the electronic device 201 may further include a processor configured to control the sensor module 240 as part of the processor 210 or separately from the processor 210 and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a hardware button, optical key or keypad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present invention, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or MediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

According to various embodiments of the present invention, the electronic device 201 (or the electronic device 101) may include a housing with a front surface, a rear surface, and side surfaces between the front surface and the rear surface. A touchscreen display (e.g., the display 260) may be disposed inside the housing and be exposed through the front surface. A microphone 288 may be disposed inside the housing and be exposed through part of the housing. At least one speaker 282 may be disposed inside the housing and be exposed through another part of the housing. A hardware button (e.g., the key 256) may be disposed on another part of the housing or may be set to be displayed on the touchscreen display. A wireless communication circuit (e.g., the communication module 220) may be positioned inside the housing. The processor 210 (or the processor 120) may be positioned inside the housing and be electrically connected with the touchscreen display, the microphone 288, the speaker 282, and the wireless communication circuit. The memory 230 (or the memory 130) may be positioned inside the housing and be electrically connected with the processor 210.

According to various embodiments of the present invention, the memory 230 may be configured to store a first application program including a first user interface for receiving a text input. The memory 230 may store instructions enabling the processor 210 to perform a first operation and a second operation. The first operation may include receiving a first-type user input through the button while the first user interface is not displayed on the touchscreen display, after receiving the first-type user input, receiving a first user utterance through the microphone 288, providing first data about the first user utterance to an external server including an automatic speech recognition (ASR) and intelligent system, after providing the first data, receiving at least one command to perform tasks generated by the intelligent system in response to the first user utterance from the external server, and the second operation may include receiving the first user input through the button while displaying the first user interface on the touchscreen display, after receiving the first-type user input, receiving a second user utterance through the microphone 288, providing second data about the second user utterance to the external server, after providing the second data, receiving data about text generated by the automatic speech recognition from the second user utterance from the server but not receiving commands generated by the intelligence system, and entering the text to the first user interface.

According to an embodiment of the present invention, the button may include a physical key positioned on the side surface of the housing.

According to an embodiment of the present invention, the first-type user input may be one of a single press on the button, a double press on the button, a triple press on the button, a single press-and-hold on the button, or a double press-and-hold on the button.

According to an embodiment of the present invention, the instructions enable the processor to display the first user interface along with a virtual keyboard. The button may not be part of the virtual keyboard.

According to an embodiment of the present invention, the instructions may enable the processor 210 to receive data about text generated by the ASR from the first user utterance in the first operation from the external server.

According to an embodiment of the present invention, the first application program may include at least one of a note application program, an email application program, a web browser application program, or a calendar application program.

According to an embodiment of the present invention, the first application program may include a message application. The instructions may enable the processor 210 to, when a selected time elapses after the text has been entered, automatically send the entered text through the wireless communication circuit.

According to an embodiment of the present invention, the instructions may enable the processor 210 to perform a third operation. The third operation may include, while displaying the first user interface on the touchscreen display, receiving a second-type user input through the button, after receiving the second-type user input, receiving a third user utterance through the microphone, providing third data about the third user utterance to the external server, and after providing the third data, receiving at least one command to perform tasks generated by the intelligence system in response to the third user utterance.

According to an embodiment of the present invention, the instructions may enable the processor 210 to perform a fourth operation. The fourth operation may include, while displaying the first user interface on the touchscreen display, receiving the second-type user input through the button, after receiving the second-type user input, receiving a fourth user utterance through the microphone 288, providing fourth data about the fourth user utterance to the external server, after providing the fourth data, receiving at least one command to perform tasks generated by the intelligence system from the external server in response to the fourth user utterance, receiving a fifth user utterance through the microphone, providing fifth data about the fifth user utterance to the external server, and after providing the fifth data, receiving, from the external server, at least one command to perform tasks generated by the intelligence system in response to the fifth user utterance.

According to an embodiment of the present invention, the first-type user input and the second-type user input may differ from each other, and the user inputs may be selected from one of a single press on the button, a double press on the button, a triple press on the button, a single press-and-hold on the button, or a double press-and-hold on the button.

According to an embodiment of the present invention, the memory 230 may be configured to further store a second application program including a second user interface to receive text inputs. The instructions may, when executed, enable the processor 210 to perform a third operation. The third operation may include, while displaying the second user interface, receiving the first-type user input through the button, after receiving the first-type user input, receiving a third user utterance through the microphone, providing third data about the third user utterance to the external server, after providing the third data, receiving, from the external server, data about text generated by the ASR from the third user utterance, but not receiving commands generated by the intelligence system, entering the text to the second user interface, and a selected time period after the text has been entered, automatically sending the entered text through the wireless communication circuit.

According to an embodiment of the present invention, the memory 230 may be configured to store a first application program including a first user interface for receiving a text input. The memory 230 may store instructions, when executed, enabling the processor 210 to perform a first operation and a second operation. The first operation may include receiving a first-type user input through the button, after receiving the first-type user input, receiving a first user utterance through the microphone 288, providing first data about the first user utterance to an external server including an automatic speech recognition (ASR) and intelligent system, after providing the first data, receiving at least one command to perform tasks generated by the intelligent system in response to the first user utterance from the external server, and the second operation may include receiving a second-type user input through the button, after receiving the second-type user input, receiving a second user utterance through the microphone 288, providing second data about the second user utterance to the external server, after providing the second data, receiving data about text generated by the ASR from the second user utterance from the server but not receiving commands generated by the intelligence system, and entering the text to the first user interface.

According to an embodiment of the present invention, the instructions enable the processor 210 to display the first user interface along with a virtual keyboard. The button may not be part of the virtual keyboard.

According to an embodiment of the present invention, the instructions may enable the processor 210 to receive data about text generated by the ASR from the first user utterance in the first operation from the external server.

According to an embodiment of the present invention, the first application program may include at least one of a note application program, an email application program, a web browser application program, or a calendar application program.

According to an embodiment of the present invention, the first application program may include a message application. The instructions may enable the processor 210 to, when a selected time elapses after the text has been entered, automatically send the entered text through the wireless communication circuit.

According to an embodiment of the present invention, the instructions may enable the processor 210 to perform the first operation independently from displaying the first user interface on the display.

According to an embodiment of the present invention, the instructions may enable the processor 210 to perform the second operation in at least one case of when the electronic device is in a locked state or when the touchscreen display turns off.

According to an embodiment of the present invention, the instructions may enable the processor 210 to perform the second operation while displaying the first user interface on the touchscreen display.

According to an embodiment of the present invention, the memory 230 may store instructions that, when executed, enable the processor 210 to receive a user utterance through the microphone 288, send information associated with whether to perform natural language understanding on text obtained by performing ASR for data about the user utterance, along with data about the user utterance, to an external server performing at least one of automatic speech recognition (ASR) or natural language understanding (NLU), when the information indicates not to perform NLU, receive the text for the data about the user utterance from the external server, and when the information indicates to perform NLU, receive a command obtained as a result of performing the NLU on the text from the external server.

Figure 3:
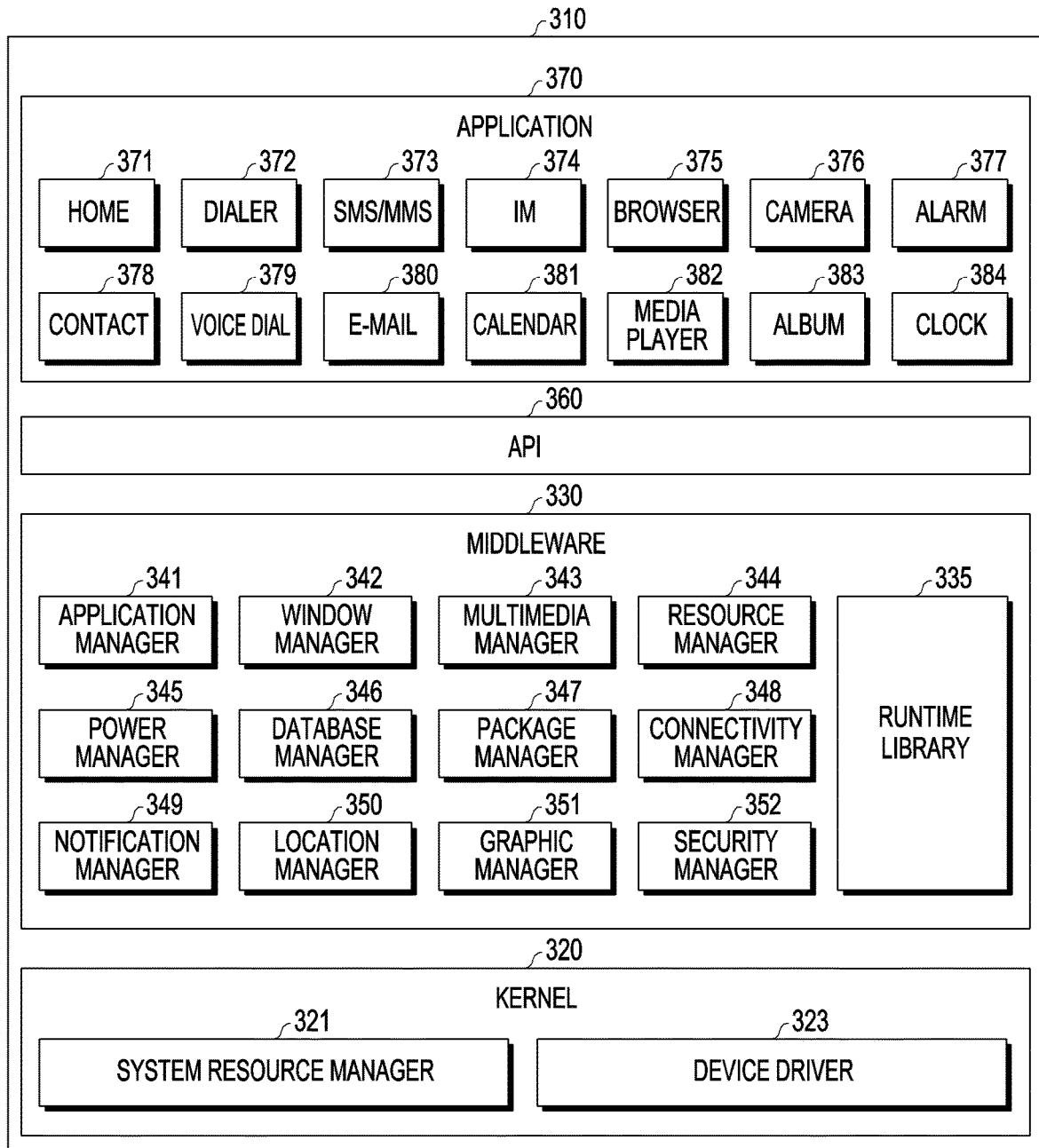
FIG. 3 is a block diagram illustrating a program module according to various embodiments of the present invention.

FIG. 3 is a block diagram illustrating a program module according to various embodiments. According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present invention, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341, for example, may manage the life cycle of the application 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present invention, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present invention, the middleware 330 may include a telephony manager for managing the voice or video call function of the electronic device or a middleware module able to form a combination of the functions of the above-described elements. According to an embodiment of the present invention, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, health-care (e.g., measuring the degree of workout or blood sugar), or provision of environmental information (e.g., provision of air pressure, moisture, or temperature information). According to an embodiment of the present invention, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present invention, the application 370 may include an application (e.g., a health-care application of a mobile medical device) designated according to an attribute of the external electronic device. According to an embodiment of the present invention, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present invention, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., compact disc-read only memory (CD-ROM), digital versatile disc (DVD), magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Figure 4A:
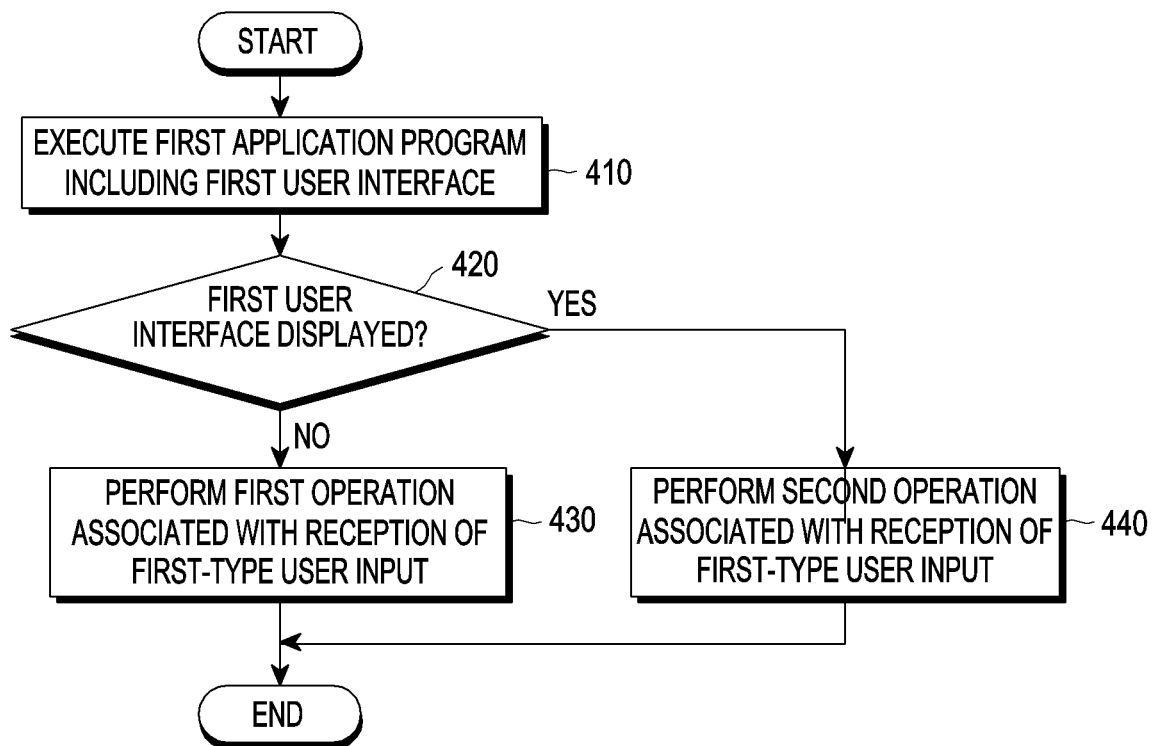
FIGS. 4A, 4B, and 4C are flowcharts illustrating a method of operating an electronic device according to various embodiments of the present invention.
Figure 4B:
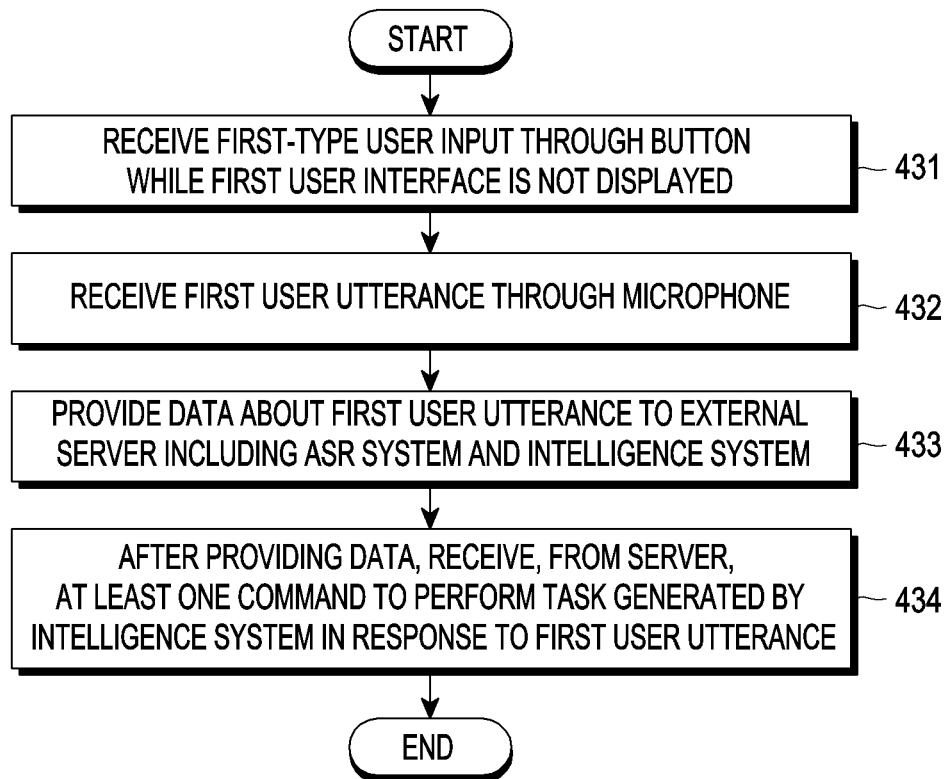
Figure 4C:
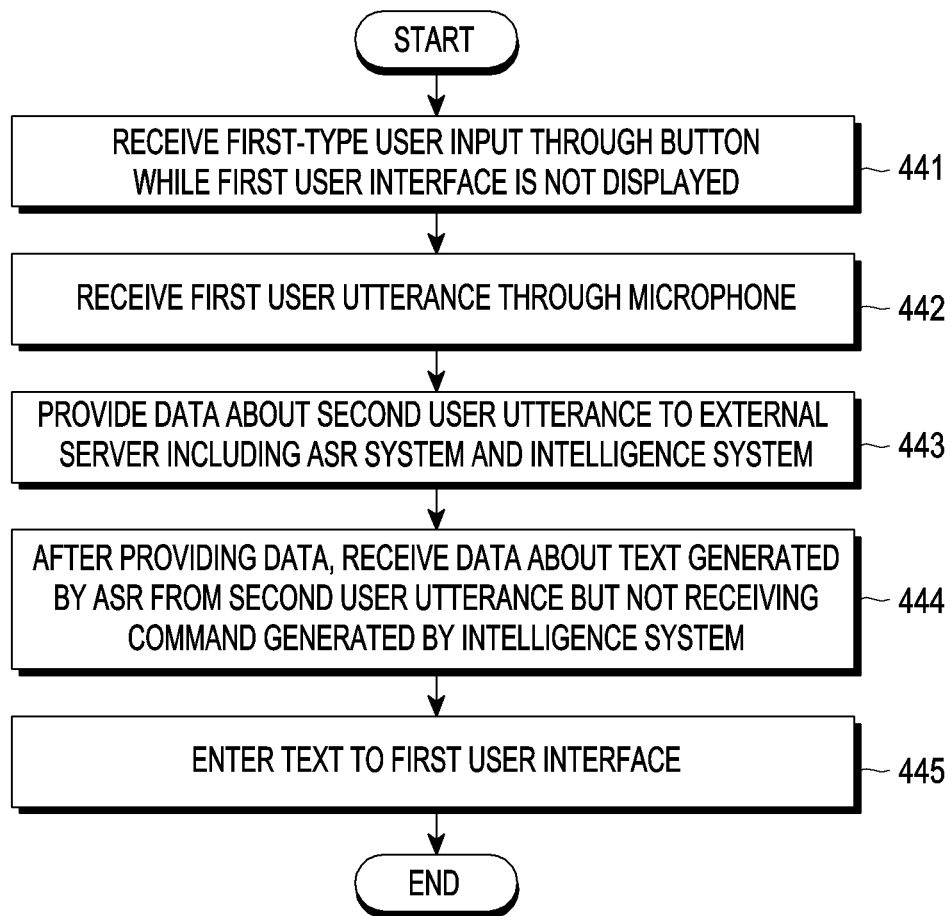
Figure 5A:
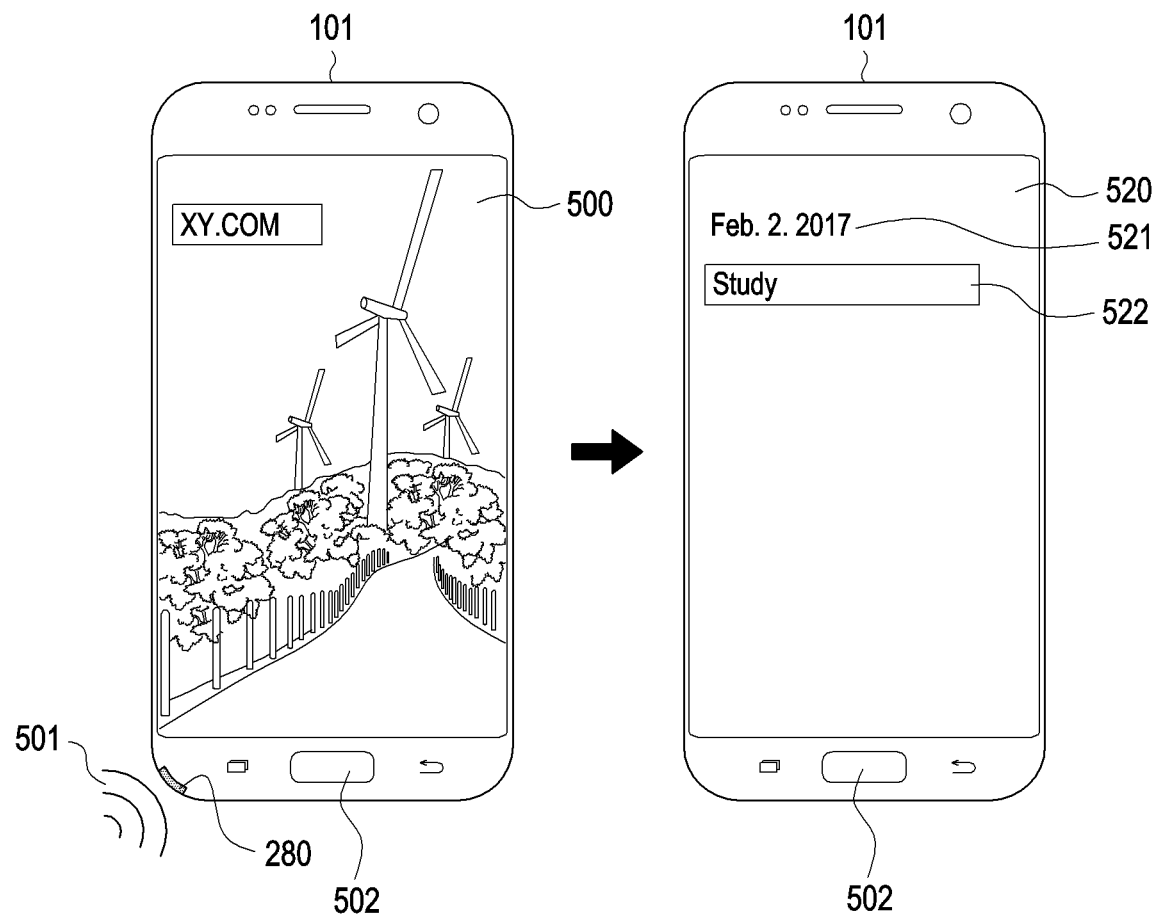
FIGS. 5A and 5B are concept views illustrating an electronic device according to various embodiments of the present invention.
Figure 5B:
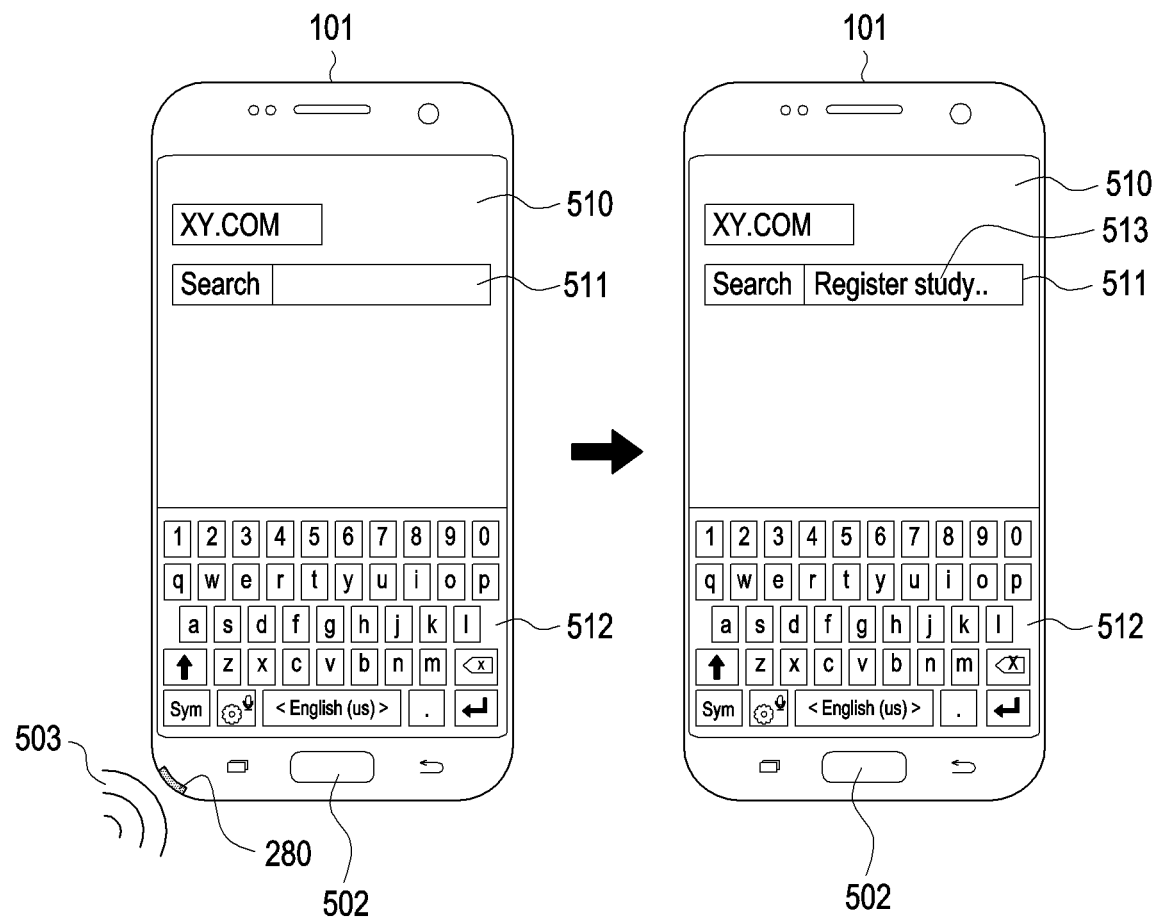

FIGS. 4A to 4C are flowcharts illustrating a method of operating an electronic device according to various embodiments of the present invention. The embodiments of FIGS. 4A to 4C are described in greater detail with reference to FIGS. 5A and 5B. FIGS. 5A and 5B are concept views illustrating an electronic device according to various embodiments of the present invention.

Referring to FIG. 4A, an electronic device 101 (e.g., the processor 120 or 210) may execute a first application program including a first user interface in operation 410. First application program including a first user interface may mean that at least part of an execution screen of the first application program includes the first user interface. For example, in a case where the first application program is a web browsing application, a screen downloaded from a server corresponding to an access URL may be transitorily or non-transitorily stored, and the first user interface may be included in the downloaded screen. This case may also be referred to as the first application including the first user interface. In other words, a screen previously stored by the first application program may include the first user interface or a screen transitorily or non-transitorily stored by execution of the first application program after the electronic device 101 installs the first application program may include the first user interface, and both cases may be referred to as the first application including the first user interface.

According to various embodiments of the present invention, the first user interface may be a text box provided to allow the user to input text. Or, the first user interface may include a keyboard (e.g., a virtual keyboard) for selecting a character input to, e.g., a text box. For example, as shown in FIG. 5B, the electronic device 101 may display a second execution screen 510 including a text box 511 capable of displaying a text input by the user through a keyboard 512 (e.g., a virtual keyboard) displayed. The operations of FIG. 5B are described below in greater detail with reference to FIG. 4C.

In operation 420, the electronic device 101 (e.g., the processor 120 or 210) may determine whether the first user interface is displayed. According to various embodiments of the present invention, the first application program may include various execution screens. For example, in a case where the first application program is a web browsing application program, a first execution screen 500 corresponding to a particular URL may be displayed as shown on the left side of FIG. 5A, and the first execution screen 500 may not include the first user interface, such as a text box or keyboard. As shown on the left side of FIG. 5B, the electronic device 101 may display a second execution screen 510 corresponding to a particular URL, and the second execution screen 510 may include the first user interface, such as a text box 511. The electronic device 101 may determine whether the displayed screen includes the first user interface, such as a text box, using, e.g., identification information about the displayed screen or a result of analyzing screens displayed and it may readily be appreciated by one of ordinary skill in the art that there is no limitation on methods of determining whether the screen displayed on the electronic device 101 includes the first user interface. Meanwhile, although the second execution screen 510 may further include a keyboard 512 for text entry to the text box 511, the keyboard 512 may not be displayed according to an implementation. Or, the electronic device 101 may be configured to start to display the keyboard 512 in response to a user designation, e.g., a touch, to the text box 511.

In operation 430, the electronic device 101 (e.g., the processor 120 or 210) may perform a first operation associated with reception of a first-type user input. If the first-type user input is entered while the first user interface is not displayed, the electronic device 101 may perform the first operation on a user utterance 501 input through the microphone 280. The first operation is described below in greater detail with reference to FIG. 4B. For example, the first-type user input may include input of a hardware button 502 of the electronic device 101. The button 502 may be included in, e.g., a key 256 of FIG. 2, and the position of the button 502 is not limited. According to various embodiments of the present invention, the button 502 may be implemented as a button other than the home button and may be positioned on a side surface of the housing of the electronic device 101. For example, according to various embodiments of the present invention, a hardware button used for speech recognition only may be placed on the side surface of the electronic device 101. The electronic device 101 may activate the microphone while the button is pressed and remains pressed and process a user utterance obtained through the activated microphone. Or, if the button is pressed, the electronic device 101 may activate the microphone and process a user utterance obtained through the activated microphone. As described above, the hardware button placed on the side surface of the electronic device 101 is described below in greater detail with reference to FIG. 18B. According to various embodiments of the present invention, the electronic device 101 may display a screen including a button rendered by software and detect, e.g., a touch thereto, thereby receiving a first-type user input. The electronic device 101 may receive a first-type user input made by the user through various input devices, e.g., a hardware button (502 or the key 256 of FIG. 2), the touch panel 252 of the touchscreen display, the pen sensor 254, or the ultrasonic input device 258, and it may readily be appreciated by one of ordinary skill in the art that the detecting input device is not limited to a particular type. Or, the electronic device 101 may receive the first-type user input through various sensor modules (e.g., the sensor module 240 of FIG. 2).

In operation 440, the electronic device 101 (e.g., the processor 120 or 210) may perform a second operation associated with reception of a second-type user input. If the second-type user input is entered while the first user interface is displayed, the electronic device 101 may perform the second operation on a user utterance 501 input through the microphone 280. The second operation is described below in greater detail with reference to FIG. 4C. The electronic device 101 may perform a different operation (e.g., the first operation or the second operation) on the same user utterance 501 when the first user input is received depending on whether the first user interface is displayed.

FIG. 4B is a flowchart illustrating a first operation of a first application program according to various embodiments of the present invention. Referring to FIG. 4B, the electronic device 101 (e.g., the processor 120 or 210) may receive a first-type user input through a button while the first user interface is not displayed in operation 431. For example, as shown on the left side of FIG. 5A, the electronic device 101 may display a first execution screen 500 not including the first user interface, such as a text box. While displaying the first execution screen 500, i.e., while the first user interface is not displayed, the electronic device 101 may receive a first-type user input through the button 502.

In operation 432, the electronic device 101 (e.g., the processor 120 or 210) may receive a first user utterance 501 through the microphone 280. In operation 433, the electronic device 101 (e.g., the processor 120 or 210) may provide data about the first user utterance 501 to an external server including an ASR system and an intelligence system. The intelligence system may apply NLU to a text obtained by, e.g., the ASR system and determine, e.g., the user's intent, thereby generating a command including a task corresponding thereto. For example, the electronic device 101 may send the data about the first user utterance 501 to the external server via the communication interface 170 or the communication module 220. For example, the microphone 280 may convert the first user utterance 501 into an electrical signal, and the electronic device 101 may send the converted electrical signal, i.e., a communication signal including data about the first user utterance 501, to the external server. The electronic device 101 may pre-process the converted electrical signal and send a communication signal including the pre-processed electrical signal to the external server which is described below in greater detail.

In operation 434, the electronic device 101 (e.g., the processor 120 or 210) may receive, from the server, at least one command to perform a task generated by the intelligence system in response to the first user utterance after providing the data. For example, the external server may include an automatic speech recognition (ASR) system capable of generating text using data about an utterance and an intelligence system capable of natural-language understanding text, grasping the meaning of the text, and generating a command corresponding to the text. The external server may generate at least one command to perform the task corresponding to the first user utterance using the automatic speech recognition system and the intelligence system. For example, the external server may generate at least one command from the received data, corresponding to the state of the electronic device 101 not displaying the first user interface. According to various embodiments of the present invention, the electronic device 101 may send information about the state of the electronic device not displaying the first user interface to the external server which is described below in greater detail. The external server may send the generated command to the electronic device 101. The electronic device 101 may perform the task corresponding to the first user utterance as it performs the received command. For example, referring to FIG. 5A, the electronic device 101 may obtain the first user utterance 501 "Register Study schedule on February second." The electronic device 101 may send the data about the first user utterance 501 to the external server, and the external server may apply ASR to the received data, thus obtaining the text "Register, Study schedule on February, second." The external server may generate a command including tasks to execute a schedule management application and register the schedule of "Study" on February 2 on the schedule management application, corresponding to the first user utterance 501 from the obtained text using the intelligence system. The external server may send the generated command to the electronic device 101, and the electronic device 101 may perform the task included in the command. As shown on the right side of FIG. 5A, the electronic device 101 may display an execution screen 520 of the schedule management application and display the result of registering the schedule 522 of "Study" on the February 2 item 521. According to various embodiments of the present invention, the electronic device 101 may keep displaying the first execution screen 500 while executing the schedule management application on background and register the schedule included in the task.

FIG. 4C is a flowchart illustrating a first operation of a first application program according to various embodiments of the present invention. Referring to FIG. 4C, the electronic device 101 (e.g., the processor 120 or 210) may receive a first-type user input through a button while the first user interface is displayed in operation 441.

In operation 442, the electronic device 101 (e.g., the processor 120 or 210) may receive a second user utterance through the microphone 280. For example, referring to FIG. 5A, the electronic device 101 may obtain the second user utterance 503 "Register Study schedule on February second." Here, the first user utterance 501 and the second user utterance 503 are assumed to be the same.

In operation 443, the electronic device 101 (e.g., the processor 120 or 210) may provide data about the second user utterance 503 to an external server including an ASR system and an intelligence system. In operation 444, after providing the data, the electronic device 101 (e.g., the processor 120 or 210) does not receive a command generated by the intelligence system but may receive data generated by the ASR from the second user utterance. In operation 445, the electronic device 101 (e.g., the processor 120 or 210) may input the received text 513 to the first user interface 511 and display the same. For example, the external server may obtain data about the text generated by the ASR from the second user utterance using the ASR system. According to various embodiments of the present invention, the electronic device 101 may send information about the state of the electronic device displaying the first user interface to the external server which is described below in greater detail. The external server may send the obtained text to the electronic device 101. The electronic device 101 may input the text received and obtained to the first user interface and display the same. For example, referring to FIG. 5B, the electronic device 101 may obtain the second user utterance 503 "Register Study schedule on February second." The electronic device 101 may send the data about the second user utterance 503 to the external server, and the external server may apply ASR to the received data, thus obtaining the text "Register, Study schedule on February, second." The external server may send the obtained text to the electronic device 101, and the electronic device 101 may display at least part 513 of the obtained text in the text box 511 as shown on the right side of FIG. 5B. According to various embodiments of the present invention, the electronic device 101 may be configured to input the text received from the external server to the first user interface based on the state information indicating that the first user interface is being displayed. According to various embodiments of the present invention, the external server may determine whether to obtain a text through ASR on the data received from the electronic device 101 and send the same to the electronic device 101 or to obtain a text through ASR on the data received from the electronic device 101, generate a command including a task from the obtained text, and send the same to the electronic device 101, according to the state information about the electronic device associated with whether the first user interface is displayed.

Meanwhile, according to various embodiments of the present invention, the electronic device 101 may process the user utterance using the ASR system and NLU system installed in the electronic device 101 without sending the data about the user utterance to the external server 600. For example, the electronic device 101 may determine whether to apply only ASR or both ASR and NLU to the obtained user utterance according to the determined user utterance processing mode. In the following embodiments, the operations performed by the external server may also be implemented to be performed by the electronic device 101.

FIGS. 6A to 6D are flowcharts illustrating operations of an electronic device and an external server according to various embodiments of the present invention.

Figure 6A:
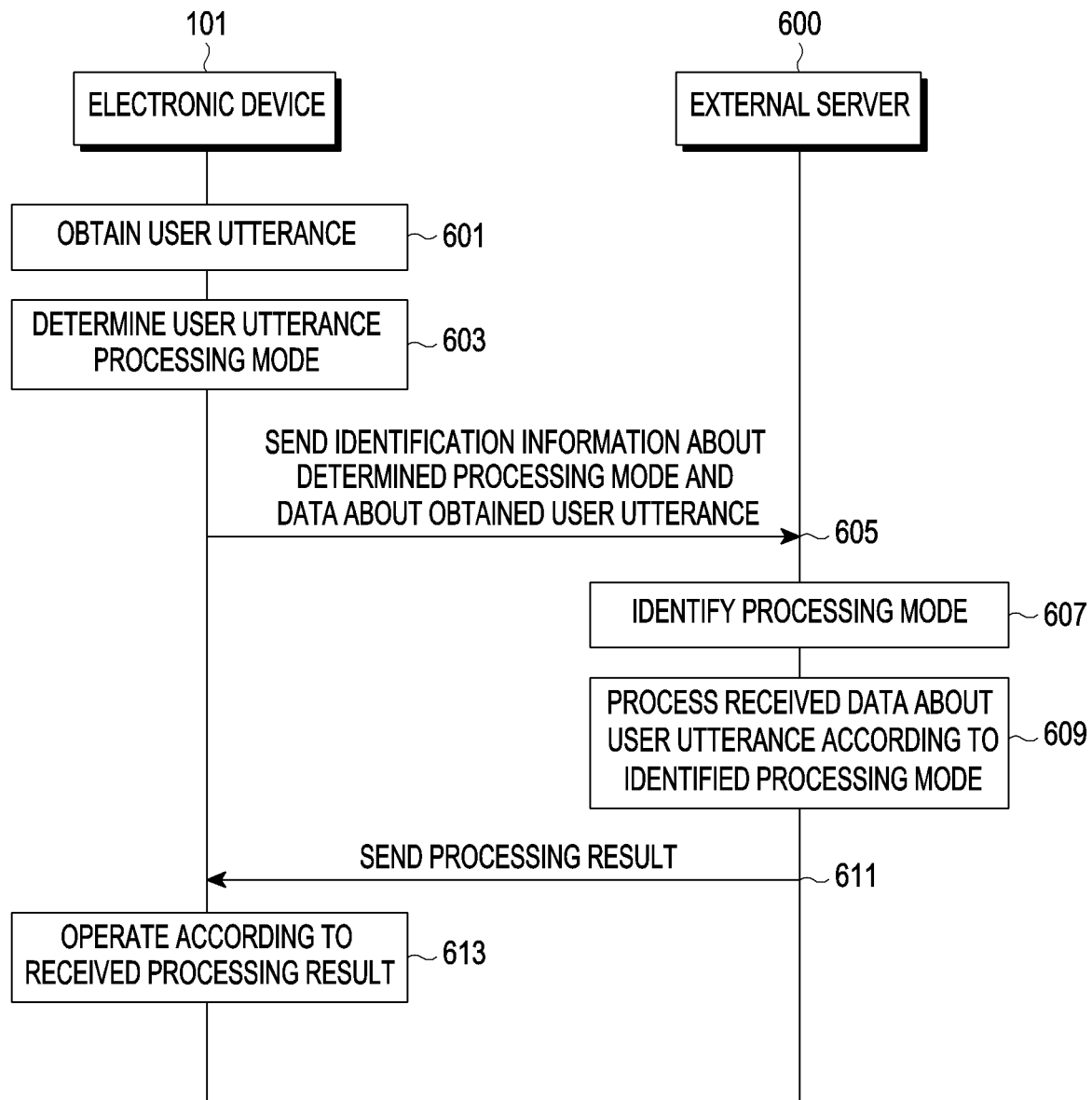
FIGS. 6A, 6B, 6C, and 6D are flowcharts illustrating operations of an electronic device and an external server according to various embodiments of the present invention.

Referring to FIG. 6A, in operation 601, the electronic device 101 (e.g., the processor 120 or 210) may obtain a user utterance. In operation 603, the electronic device 101 (e.g., the processor 120 or 210) may determine a user utterance processing mode. Although operation 601 is shown in FIG. 6A to be performed earlier than operation 603, this is merely an example and, according to various embodiments of the present invention, the electronic device 101 may determine a user utterance processing mode and then obtain a user utterance. For example, as described above in connection with FIGS. 4A to 4C, the user utterance processing mode may be determined based on whether the first user interface, such as a text box, is displayed. For example, the electronic device 101 may determine that the user utterance processing mode is a dictation mode corresponding to the state of the electronic device displaying the first user interface. For example, the electronic device 101 may determine that the user utterance processing mode is a command mode corresponding to the state of the electronic device not displaying the first user interface. The dictation mode may be a user utterance processing mode to allow the external server 600 to apply ASR to data about the received user utterance to obtain a text and then request to return the text. The command mode may be a user utterance processing mode to allow the external server 600 to apply ASR to data about the received user utterance to obtain a text, generate a command including a task from the obtained text, and request to return the command. According to various embodiments of the present invention, the electronic device 101 may determine the user utterance processing mode according to various factors, such as at least one of the state or type of the running application, the state or type of the displayed object, whether a second user input, e.g., a keyboard, is displayed, or the type of user input, as well as whether the first user interface is displayed as described above.

In operation 605, the electronic device 101 (e.g., the processor 120 or 210 or the communication interface 170 or the communication module 220) may send identification information about the determined processing mode and the obtained data about the user utterance to the external server 600. In operation 607, the external server 600 (e.g., a processor included in the external server) may identify the user utterance processing mode based on the received identification information. In operation 609, the external server 600 (e.g., a processor included in the external server) may process the received data about the user utterance according to the identified processing mode. For example, in a case where the processing mode is a dictation mode, the external server 600 may obtain a text about the user utterance. For example, in a case where the processing mode is a command mode, the external server 600 may obtain a text about the user utterance, apply NLU to the obtained text to determine the meaning, and generate a command including a task from the determined meaning. According to another embodiment of the present invention, the electronic device 101 may designate a processing task, not the identification information about the user utterance processing mode, and send the designated processing task to the external server 600. For example, the electronic device 101 may obtain the user utterance without determining the user utterance processing mode and then designate ASR processing on the user utterance and send the same to the external server 600. Or, after obtaining the user utterance, the electronic device 101 may designate to perform both ASR processing and NLU processing on the user utterance and send the same to the external server 600. According to another embodiment of the present invention, the electronic device 101 may send information about the state of the electronic device 101, not the identification information about the user utterance processing mode, to the external server 600. For example, the electronic device 101 does not determine the user utterance processing mode but may obtain a user utterance and then send the state information indicating that the first user interface, such as a text box, is now being displayed to the external server 600. The external server 600 may determine whether to obtain a text for the data about the user utterance and return it or to even generate a command including a task and return them all using the state information about the electronic device 101. According to various embodiments of the present invention, the electronic device 101 may send information for identifying the task that the external server 600 is to process on the user utterance, along with the user utterance. The information for identifying a task the external server 600 is to process on the user utterance may be implemented as various pieces of information, such as identification information about the user utterance processing mode, processing task identification information, or state information about the electronic device.

In operation 611, the external server 600 (e.g., a processor or communication module included in the external server) may send a result of processing to the electronic device 101. In operation 613, the electronic device 101 (e.g., the processor 120 or 210) may be operated according to the received processing result. For example, in a case where the external server 600 sends a text, the electronic device 101 may display the received text on at least part of the screen. For example, in a case where the user utterance processing mode is determined to be the dictation mode, the electronic device 101 may be configured to reflect the received text on at least part of the screen. For example, in a case where the external server 600 sends a command including a task, the electronic device 101 may be operated according to the received command.

Figure 6B:
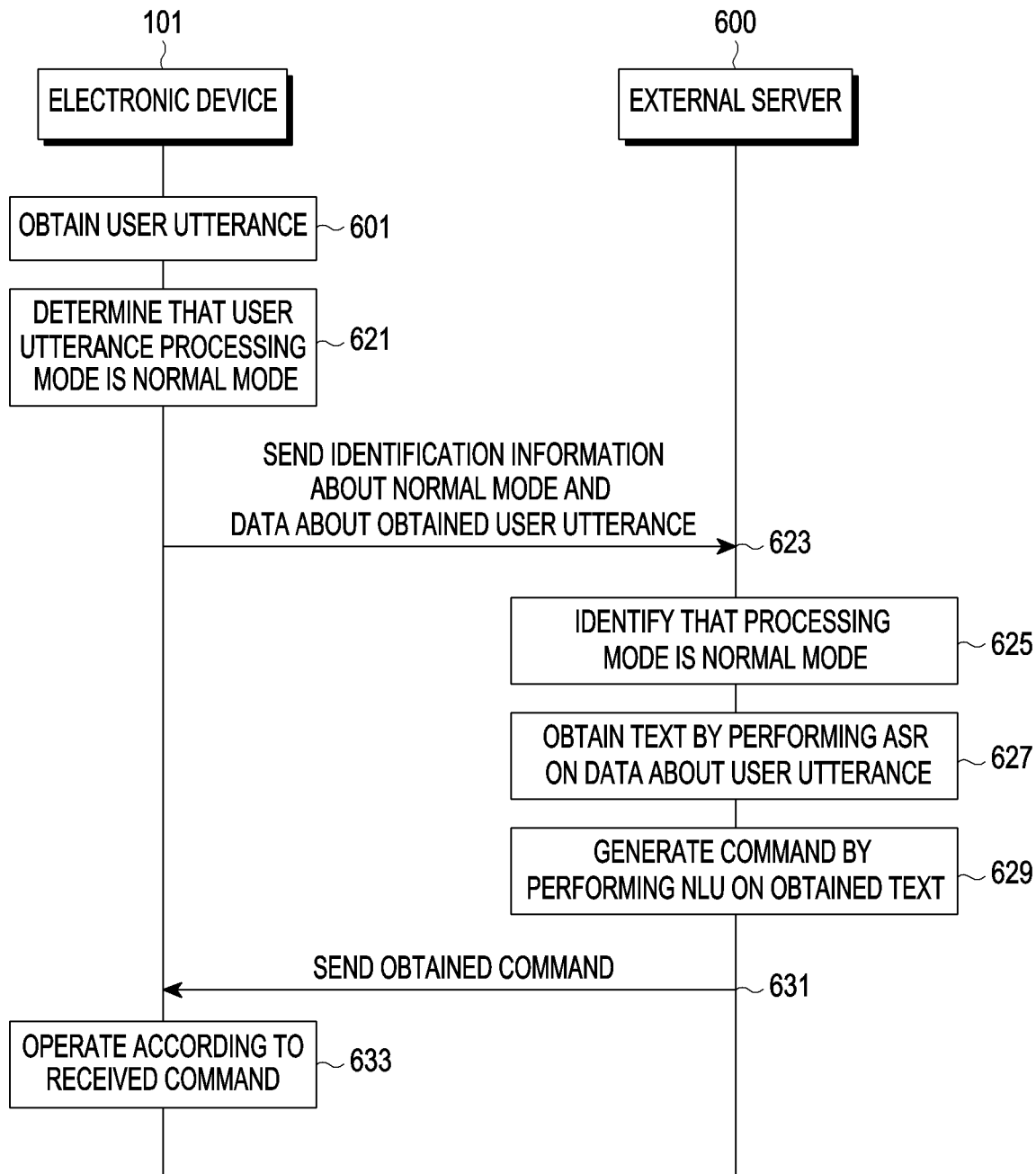

FIG. 6B is a flowchart illustrating operations of an electronic device and an external server according to various embodiments of the present invention.

In operation 601, the electronic device 101 (e.g., the processor 120 or 210) may obtain a user utterance. In operation 621, the electronic device 101 may determine that the user utterance processing mode is a command mode. According to various embodiments of the present invention, the electronic device 101 may determine that the user utterance processing mode is the command mode, corresponding to, e.g., no text box being displayed. According to various embodiments of the present invention, the electronic device 101 may determine that the user utterance processing mode is the command mode according to various other pieces of state information about the electronic device 101 or user input types. The process of determining the user utterance processing mode is described below in greater detail.

In operation 623, the electronic device 101 (e.g., the processor 120 or 210 or the communication interface 170 or the communication module 220) may send data about the obtained user utterance and identification information of command mode to the external server 600. In operation 625, the external server 600 (e.g., a processor included in the external server) may identify that the user utterance processing mode is the command mode. In operation 627, the external server 600 (e.g., a processor included in the external server) may perform ASR on the data about the user utterance, obtaining a text. In operation 629, the external server 600 (e.g., a processor included in the external server) may perform NLU on the obtained text to grasp the parameter related to the intent for the user's inquiry and generate at least one command including a task corresponding to the intent.

For example, the electronic device 101 may obtain the user utterance "Send mom photos recently taken in Hawaii" and send data about the user utterance to the external server 600. The electronic device 101 may detect the end point of the user utterance and send data about the user utterance received before the end point to the external server 600. For example, the electronic device 101 may detect the end point of the voice section based on the characteristics of the sound signal. Or, the electronic device 101 may detect the end point according to a command to indicate the time of the user's explicit input. For example, the user may press and hold a hardware button during which the user may issue a user utterance. If a desired user utterance ends, the user may release the press-and-hold of the hardware button. The electronic device 101 may determine that input of the user utterance is complete according to release of the press-and-hold of the hardware button. According to various embodiments of the present invention, although determining that the reception of the user utterance is complete via the button, the electronic device 101 may additionally perform end point extraction more precisely based on the characteristics of the voice signal.

According to various embodiments of the present invention, the external server 600 may apply ASR to the data about the received user utterance, thereby obtaining the text "send mom photos recently taken in Hawaii." The external server 600 generates the intent "SEND_PHOTO," the slots (or parameters) "Hawaii/#location," "Recently/#date," "mom/#contact_person," and determines an action sequence corresponding thereto by applying NLU to the obtained text. The action sequence is to sequentially represent operations that the electronic device 101 performs. The action sequence may include at least one, e.g., task. The determined action sequence may be, e.g., as shown in Table 1 below.

TABLE 1

GALLERY_launch-
GALLERY_search("Hawaii/#location", "Recently/#date")-
GALLERY_search_result - GALLERY_search_selected_view - SHARE
-MESSAGE_conversation_view("mom/#contact_person")-MESSAGE_send The action sequence shown in Table 1 may include the task of executing a Gallery application (GALLERY_launch), the task of searching the Gallery application for photos taken in Hawaii, as location, recently, as date, (GALLERY_search("Hawaii/#location","Recently/#date")), the task of identifying results of searching the Gallery application (GALLERY_search_result), the task of displaying the results of searching the Gallery application (GALLERY_search_selected_view), the task of sharing photos (SHARE), the task of displaying the contacts on the message chat window and the chat window with mom (MESSAGE_conversation_view("mom/#contact_person")), and the task of sending a message (MESSAGE_send), and their respective turns.

In operation 631, the external server 600 (e.g., a processor or communication module included in the external server) may send the obtained command to the electronic device 101. According to various embodiments of the present invention, the external server 600 may also send an obtained text along with the obtained command to the electronic device 101. In operation 633, the electronic device 101 (e.g., the processor 120 or 210) may be operated according to the received command. For example, the electronic device 101 may perform the tasks included in the received action sequence according to their respective turns. According to various embodiments of the present invention, the electronic device 101 may display the additionally received text on at least part of the screen so that the user may grasp whether the text the user intended has been properly processed.

Figure 6C:
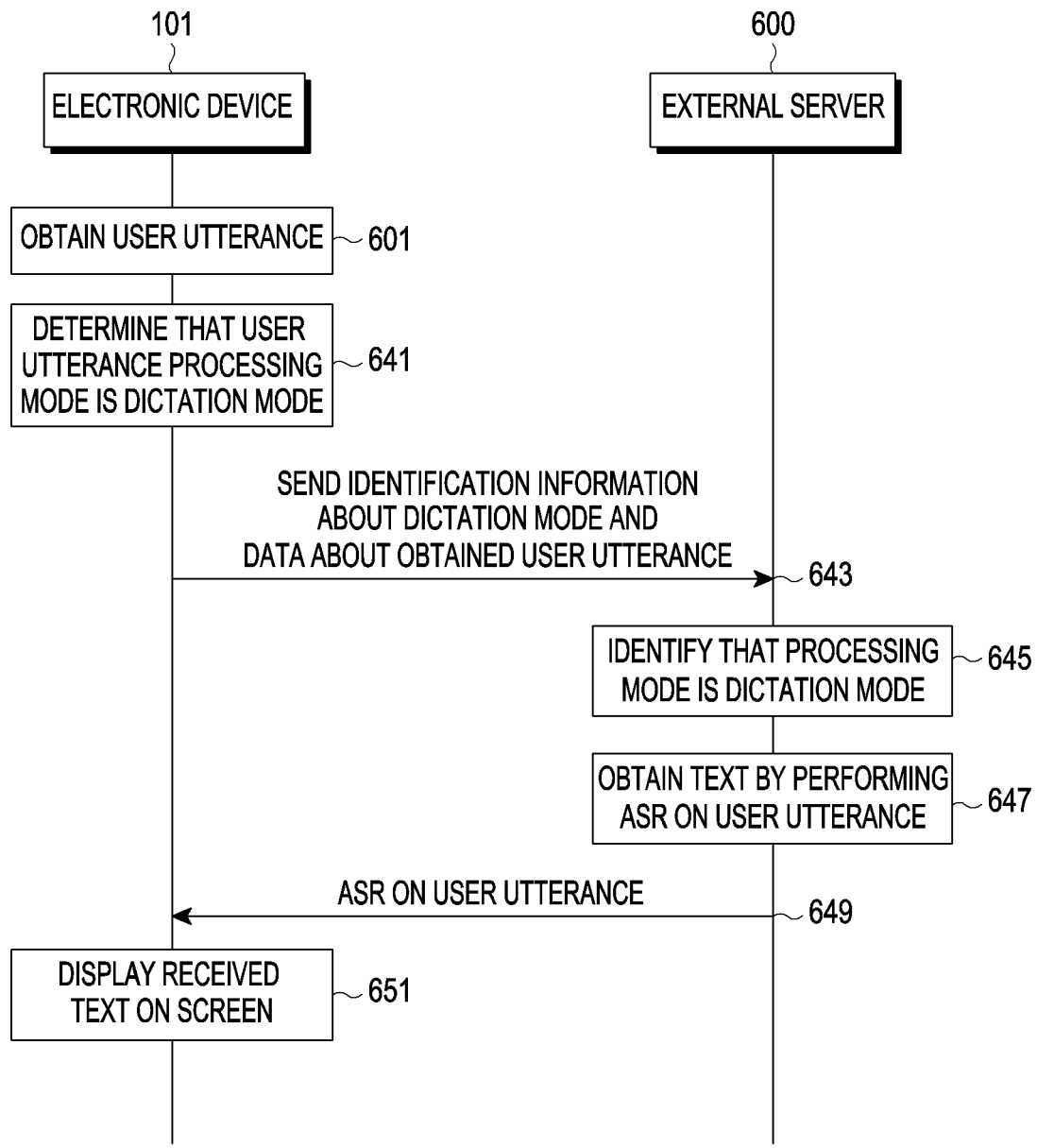

FIG. 6C is a flowchart illustrating operations of an electronic device and an external server according to various embodiments of the present invention.

In operation 601, the electronic device 101 (e.g., the processor 120 or 210) may obtain a user utterance. In operation 641, the electronic device 101 (e.g., the processor 120 or 210) may determine that the user utterance processing mode is the dictation mode.

According to various embodiments of the present invention, the electronic device 101 may determine that the user utterance processing mode is the dictation mode, corresponding to, e.g., a text box being displayed. According to various embodiments of the present invention, the electronic device 101 may determine that the user utterance processing mode is the dictation mode according to various other pieces of state information about the electronic device 101 or user input types. The process of determining the user utterance processing mode is described below in greater detail.

In operation 643, the electronic device 101 (e.g., the processor 120 or 210 or the communication interface 170 or the communication module 220) may send data about the obtained user utterance and identification information of dictation mode to the external server 600. In operation 645, the external server 600 (e.g., a processor included in the external server) may identify that the user utterance processing mode is the dictation mode based on the received identification information. In operation 647, the external server 600 (e.g., a processor included in the external server) may perform ASR on the data about the user utterance, obtaining a text.

For example, the electronic device 101 may obtain the user utterance "Send mom photos recently taken in Hawaii" via the microphone and send data about the user utterance to the external server 600. The external server 600 may apply ASR to the data about the received user utterance, thereby obtaining the text "send mom photos recently taken in Hawaii." In operation 649, the external server 600 (e.g., a processor or communication module included in the external server) may send the obtained text to the electronic device 101. In operation 651, the electronic device 101 (e.g., the processor 120 or 210) may display the received text on at least part of the screen, e.g., in a text box.

Figure 6D:
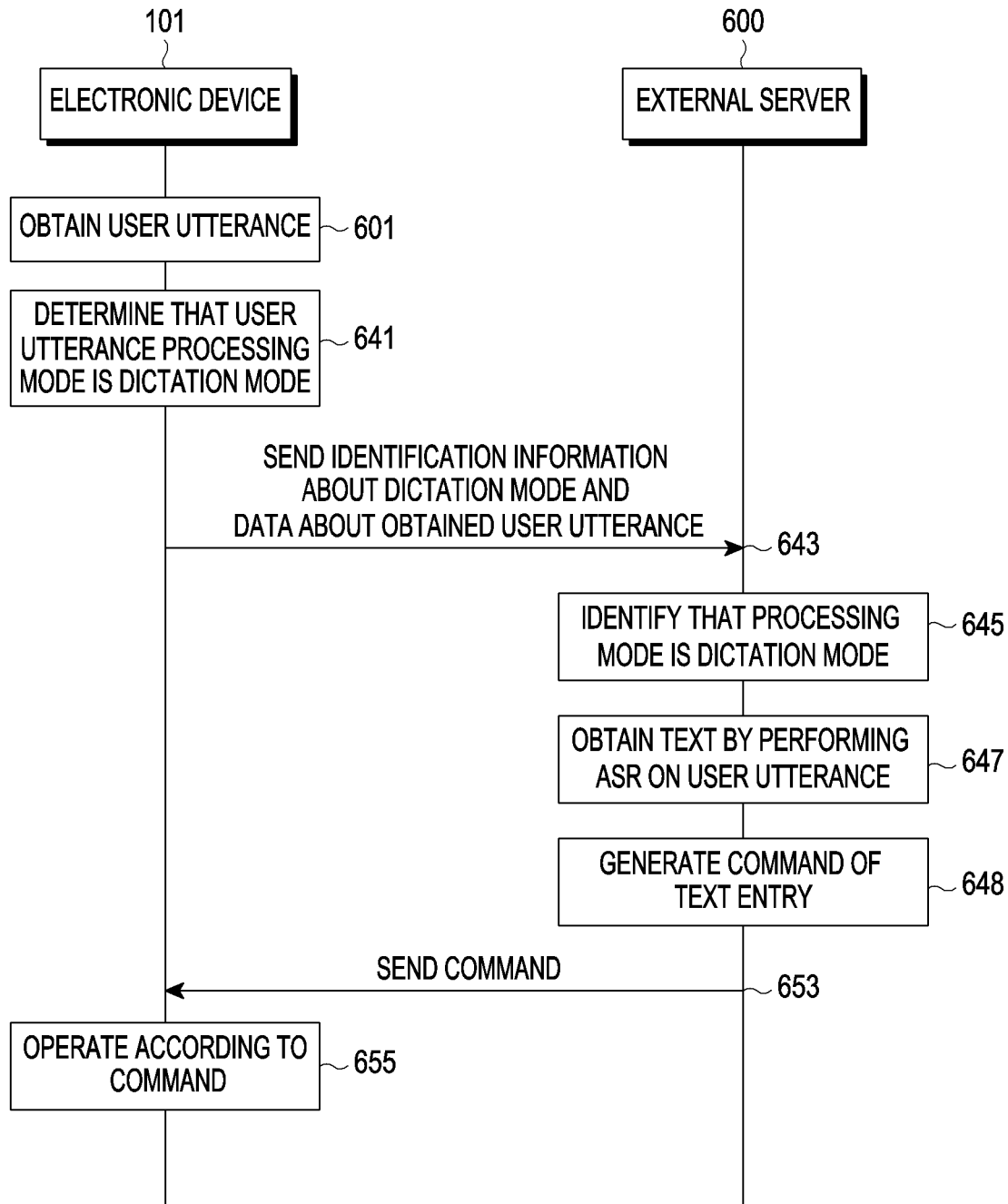

FIG. 6D is a flowchart illustrating operations of an electronic device and an external server according to various embodiments of the present invention. Operations 601 to 647 of FIG. 6D are the same as those of FIG. 6C and, thus, no detailed description is given below.

In operation 648, the external server 600 (e.g., a processor included in the external server) may generate a command to input a text. For example, the external server 600 may generate an action sequence including at least one task. According to various embodiments of the present invention, the external server 600 may generate the action sequence based on a default format without performing NLU by the intelligence system. For example, the external server 600 may generate an action sequence including a task to input the obtained text to a text box and display the obtained text. In other words, the external server 600 may generate commands even without performing NLU. In operation 653, the external server 600 (e.g., a processor or communication module included in the external server) may send a command including the generated action sequence to the electronic device 101. In operation 655, the electronic device 101 (e.g., the processor 120 or 210) may be operated according to the command. As described above in connection with FIGS. 6C and 6D, in the case of the dictation mode, the external server 600 may apply ASR to the user utterance commonly obtained, thereby obtaining the text. Further, the external server 600 may not apply NLU to the obtained text and, in the embodiment of FIG. 6C, send only the text to the electronic device 101 while, in the embodiment of FIG. 6D, sending a command to input the text to the electronic device 101. In other words, according to various embodiments of the present invention, the entity to determine the operation to input the obtained text as a result of ASR may be the electronic device 101 or both the electronic device 101 and the external server 600.

According to various embodiments of the present invention, the external server 600 may include a communication circuit capable of transmitting and receiving data to/from the electronic device 101. Further, the external server 600 may include at least one of a processor capable of performing ASR on the received user utterance data or NLU on the text or a memory storing instructions to enable the processor to perform ASR on the utterance data or NLU on the text. The communication circuit may receive identification information or data about the user utterance or send a text or command.

Figure 7:
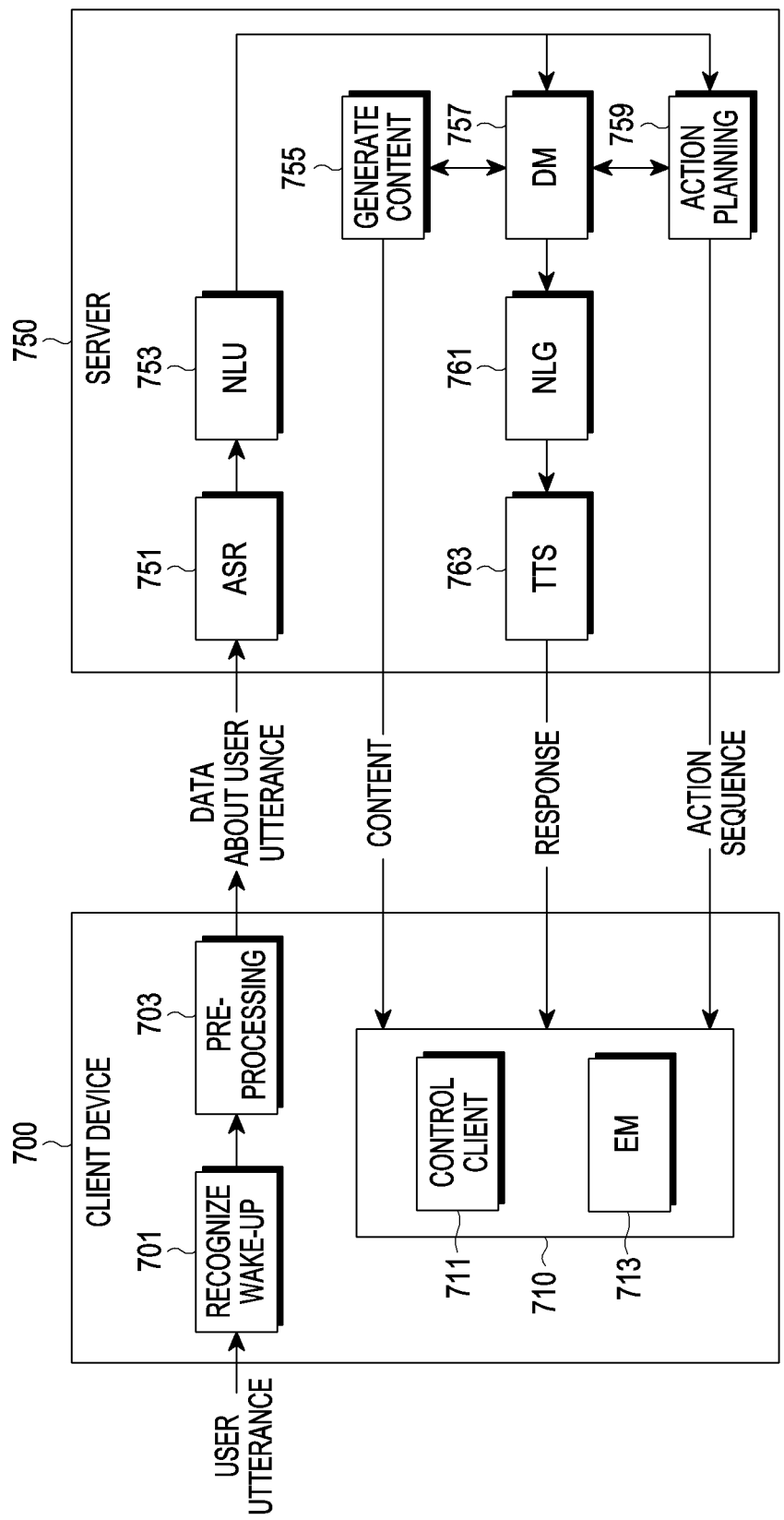
FIG. 7 is a concept view illustrating a process of operating a client device and a server according to various embodiments of the present invention.

FIG. 7 is a concept view illustrating a process of operating a client device and a server according to various embodiments of the present invention. The client device 700 of FIG. 7 may be, e.g., the electronic device 101, and the server 750 may be, e.g., the external server 600.

The client device 700 may include the wake-up recognition manager 701, a pre-processing manager 703, and a control manager 710. The control manager 710 may include a client control manager 711 and an executor manager (EM). The external server 750 may include an ASR module 751, an NLU module 753, a dialog manager (DM) 757, a natural language generation (NLG) manager 761, a text-to-speech (TTS) manager 763, a content generating manager 755, and an action planning manager 759. A system including at least one of the NLU module 753, the DM 757, the NLG manager 761, the TTS manager 763, the content generating manager 755, and the action planning manager 759 may be referred to as, e.g., an intelligence system.

The client device 700 may receive a user utterance through an integrated voice agent.

The wake-up recognition manager 701 may use a low-power processor to always receive a user input to execute the speech recognition application. For example, the microphone may remain always on by the low-power processor. Wake-up command recognition may be implemented in a micro-processor such as an audio codec connected with a microphone. Where a voice input matching a wake-up keyword is received, the client device 700 may recognize the user's intent to use the speech recognition service and deliver data about the user utterance to the server 750. The pre-processing manager 703 may process the user utterance into an electrical signal to generate data about the user utterance and deliver the data to the ASR module 751. For example, the pre-processing manager 703 may include an adaptive echo canceler (AEC) module, a noise suppression (NS) module, an end-point detection (EPD) module, and an automatic gain control (AGC) module.

The server 700 may receive data about the user utterance. The server 700 may include, e.g., a communication module capable of wirelessly transmitting and receiving data, a processor, and a memory, and these hardware components may be implemented to be the same or similar to the communication interface 170, processor 120, and memory 130 of FIG. 1. If data about the user utterance is input, the ASR module 751 may generate a text query corresponding to the utterance through the ASR module 751. The ASR module 751 may be called an ASR system. The text query may generate an intent and a keyword (slot) corresponding to the utterance based on predetermined rules or statistical features. The NLU manager 753 may determine a response to be provided to the user based on the intent or keyword. The response may be a dialog-type answer (in the form of a sentence), various types of content (multimedia material that may contain image, sound or text), or information indicating the function that the client device 700 is to perform. Or, the response may be a combination thereof. For example, the content generating manager 755 may gather, from the outside, or generate various types of content to be played on the client and provide the same to the client device 700. Where the function that the terminal is to perform is determined based on the intent or keyword, the action planning manager 759 may determine an action sequence that the client device 700 is to perform, corresponding to the intent or keyword. The action sequence may include one or more functions that applications are to perform in order and one or more parameters that are to be used for the functions.

Upon receiving at least one of the dialog-type answer, content, or action sequence, the client device 700 may output each response in an appropriate form. When the client device 700 receives the action sequence, the EM 713 performs the tasks step-by-step based on one or more functions and parameters contained in the action sequence and outputs a per-step execution status of performing the tasks. In each step, the EM 713 may request the application corresponding to each function to perform the function and receive a report for the result of executing the function from the application.

For example, the EM 713 sequentially sends requests for executing action to applications (e.g., the client control manager 711) corresponding to their respective step actions based on the action sequence. According to various embodiments of the present invention, action may also be referred to as a task. Upon receiving the request, the application executes the function corresponding to the action and delivers the result or status of execution to the EM 713. Table 2 represents an example of the request for executing action according to an embodiment of the present invention.

TABLE 2

Execute Gallery app: return NULL Execute photo search screen : return NULL
Display results of search for Hawaii : return ArrayList<>
Select photos displayed on search result window: return ArrayList<>
Execute send via screen: return ArrayList<>
Execute chat window with mom of message app: return NULL
Send message to mom: return NULL The action execution request shown in Table 2 may include an action execution request for executing the Gallery application, executing the photo search screen, displaying the results of searching for Hawaii, selecting photos displayed on the search result window, executing the screen of sending selected photos, executing the message application, and executing the chat window with mom who is the chat partner, or sending a message to the chat partner.

For example, the DM 757 may manage the user's chat history and manage the slot (task parameter). The DM 757 may determine an action based on the intent/slot grasped through the NLU module 753. For example, the DM 757 may determine whether the slot grasped through the NLU manager 753 is enough to perform a subsequent task while managing the slot (task parameter) included in the grasped intent. Where the slot to perform task is insufficient, it may send a request for information necessary for the slot. The DM 757 may manage the dialog history (dialog flow) and manage the dialog status of the current chat window. The DM 757 may determine whether to utilize information about the previous dialog or to make a new inquiry depending on the dialog status. Further, the DM 757 may send a request for necessary information to the user or exchange feedback for user inputs. The DM 757 may manage the task flow. The DM 757 may also determine what operations the system can perform by invoking an application or service.

The NLG module 761 may represent a user input, a result of natural language processing, a result of executing service, or such output in a natural language form that the user may appreciate. For example, the NLG module 761, where the user performs some natural language input, may perform paraphrasing on the user input. Further, the NLG module 761 may perform natural language processing on the user input and inform what the user intended and that it is identifying the same according to the grasped intent. As another example, the NLG module 761, after obtaining a service result from an actual service (app/CP) after the natural language processing, may show the result while generating and explaining brief information about the result. Information from the NLG module 761 may be provided to, e.g., the TTS module 763 and may be synthesized into a voice that may then be provided. Meanwhile, according to an embodiment of the present invention, as set forth above, the electronic device 101 alone may process a user utterance and generate an action (or task) in which case the electronic device 101 may include at least one of the components of the server 750.

Figure 8:
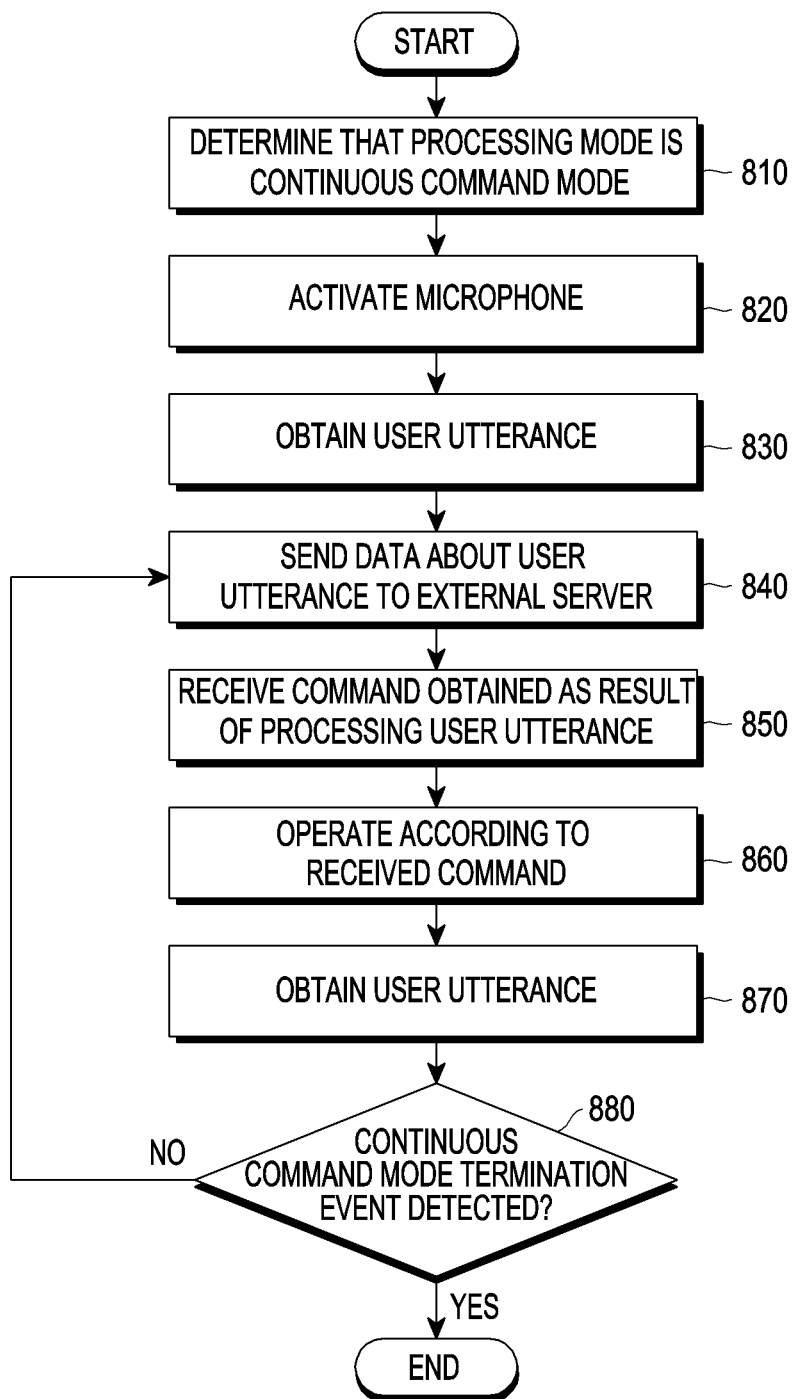
FIG. 8 is a flowchart illustrating a method of operating an electronic device in a continuous command mode according to various embodiments of the present invention.

FIG. 8 is a flowchart illustrating a method of operating an electronic device in a continuous command mode according to various embodiments of the present invention.

In operation 810, the electronic device 101 (e.g., the processor 120 or 210) may determine that the user utterance processing mode is the continuous command mode. The electronic device 101 may determine the user utterance processing mode based on various pieces of information, such as location information, state information (e.g., communication connection state or message reception information) about the electronic device 101, state information about the activated background application, type or state of the object displayed, or type of user input. The electronic device 101 may determine the user utterance processing mode based on, e.g., the application state, e.g., whether a text box or keyboard is displayed or whether the text box or keyboard is activated. The electronic device 101 may determine the user utterance processing mode depending on the type of the running application. Various embodiments of entry into the continuous command mode are described below in greater detail.

In operation 820, the electronic device 101 (e.g., the processor 120 or 210) may activate the microphone. In operation 830, the electronic device 101 (e.g., the processor 120 or 210) may obtain a user utterance through the activated microphone. In operation 840, the electronic device 101 (e.g., the processor 120 or 210 or the communication interface 170 or the communication module 220) may send data about the user utterance to an external server. For example, the electronic device 101 may determine the start time and end time of the utterance according to the user's explicit input. The electronic device 101 may detect the end time of a single command of user utterance from sound information input between the utterance start time and the utterance end time and send data about the user utterance corresponding to the single command to the external server. Further, the electronic device 101 may send an identifier for the continuous command mode along with the data about the user utterance to the external server.

The external server may apply ASR and NLU to the received data about the user utterance, thereby generating a command. In operation 850, the electronic device 101 (e.g., the processor 120 or 210 or the communication interface 170 or the communication module 220) may receive the command obtained as a result of processing the user utterance from the external server. In operation 860, the electronic device 101 (e.g., the processor 120 or 210) may be operated according to the received command. In operation 870, the electronic device 101 (e.g., the processor 120 or 210) may obtain a user utterance. In operation 880, the electronic device 101 (e.g., the processor 120 or 210) may determine whether a continuous command mode termination event is detected. If a continuous command mode termination event is detected, the electronic device may send the data about the user utterance to the external server and receive a command again and operate. If the continuous command mode termination event is detected, the electronic device 101 may stop obtaining a user utterance and deactivate, e.g., the microphone. The continuous command mode termination event may be set to, e.g., pressing a hardware button, but is not limited in type thereto. For example, if the user presses a hardware button twice, the microphone of the electronic device 101 may be activated and wait to receive a speech so that all voice commands issued later may be transferred to the external server until a user input corresponding to the continuous command mode termination is identified. Further, if the hardware button is pressed two times more, the electronic device 101 may deactivate the microphone. Or, in a case where the user utterance received in operation 870 indicates continuous command mode termination, the electronic device 101 (e.g., the processor 120 or 210) may terminate the continuous command mode corresponding thereto.

Figure 9:
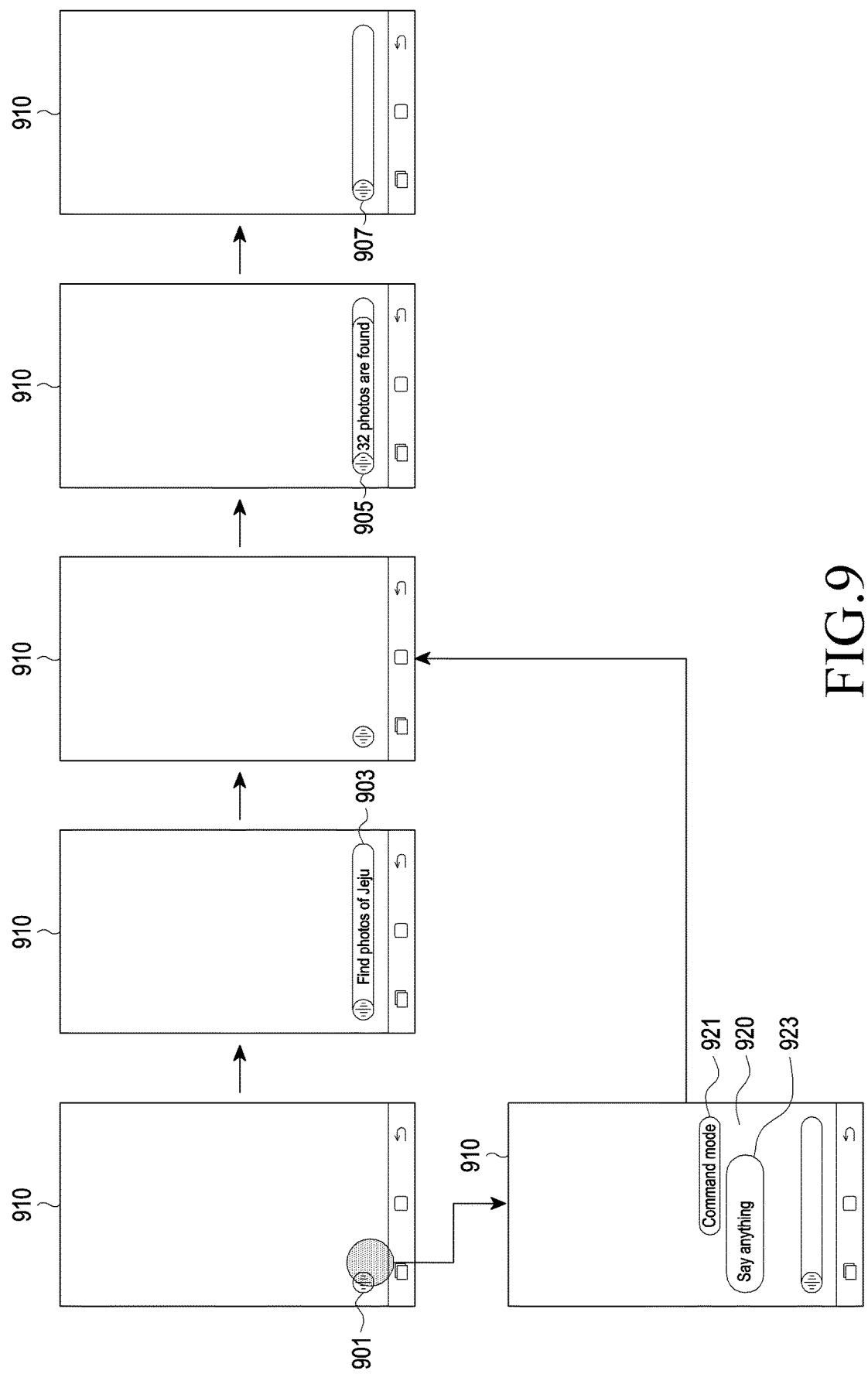
FIG. 9 is a concept view illustrating a method of operating an electronic device in a continuous command mode according to various embodiments of the present invention.

FIG. 9 is a concept view illustrating a method of operating an electronic device in a continuous command mode according to various embodiments of the present invention.

According to various embodiments of the present invention, the electronic device 101 may determine that the user utterance processing mode is the continuous command mode and activate the microphone. The electronic device 101 may display, e.g., a first application execution screen 910 and display an indicator 901 to indicate waiting for a user utterance, i.e., listening, on the first application execution screen 910. According to various embodiments of the present invention, the electronic device 101 may operate the indicator 901 with a speech recognition button. The first application may be, e.g., a user utterance processing application or an application different from a user utterance processing application. The electronic device 101 may send data about the user utterance in a single command unit to the external server. According to various embodiments of the present invention, if a command for a first user utterance is received, the electronic device 101 may display a text for the received command or a text 903 for the first user utterance on the first application execution screen 910. According to various embodiments of the present invention, if obtaining the first user utterance is complete, the electronic device 101 may keep the microphone active to obtain a second user utterance or may deactivate the microphone and, if performing the command corresponding to the first user utterance is complete, activate the microphone to obtain the second user utterance. In the embodiment of FIG. 9, the electronic device 101 may display a screen 920 including a current mode 921 and a message 923 to induce a user utterance and obtain a user utterance. In the continuous command mode, the electronic device 101 may display a result 905 of performing, then display an indicator 907 to indicate waiting, i.e., listening, and wait to obtain a second user utterance. According to various embodiments of the present invention, the electronic device 101 may operate the indicator 901 with a speech recognition button.

According to various embodiments of the present invention, the electronic device 101 may also enter into the continuous command mode via a voice command. For example, if a hardware button of the electronic device 101 is pressed, the electronic device 101 may enter into the command mode. After entry into the command mode, the electronic device 101 may obtain the user utterance "start continuous command mode" from the user. According to operation of the command mode, the electronic device 101 may send data about the obtained user utterance to the external server 600 and obtain a command corresponding to the user utterance from the external server. Here, the command may be, e.g., one to execute the continuous command mode. The electronic device 101 may enter into the continuous command mode, corresponding to the received command. Thereafter, the electronic device 101 may process a user utterance entered according to operation of the continuous command mode. A continuous command mode termination event may include a voice command, as well as manipulation of a hardware button, as described above. For example, the electronic device 101 may obtain the user utterance "finish continuous command mode" from the continuous command mode and send data about the user utterance to the external server 600. The electronic device 101 may receive a command corresponding to the user utterance from the external server 600 in which case the command may be termination of the continuous command mode. The electronic device 101 may terminate the continuous command mode corresponding to the received command.

According to various embodiments of the present invention, the electronic device 101 may send the voice signal where the end point of the user utterance has been extracted to the external server. The electronic device 101 may send together identification information about the continuous command mode to the external server. The external server may identify that the user utterance processing mode is the continuous command mode and operate in a similar manner to, e.g., that in the command mode. First, the external server may apply ASR to the data about the user utterance and convert it into a text. The external server may apply NLU to the converted text to determine the user's intent and relevant parameters (e.g., slots) and generate a command based thereupon. The external server may send the generated command to the electronic device 101, and the electronic device 101 may be operated according to the received command. The order of modules which need to be invoked or the data flow for a plurality of tasks in the command may be controlled by, e.g., a service orchestrator manager in the external server.

The electronic device 101 may display the information processed and generated by the external server. For example, the electronic device 101 may receive the text information generated through the ASR and display the text information or may not display the text information. According to various embodiments of the present invention, the electronic device 101 may receive response information corresponding to the user's intent generated by analyzing the text through the DM or action planning manager and visually display or audibly output pieces of information thereabout in a sequential manner. The electronic device 101 may sequentially output responses to a plurality of single commands entered during the utterance time.

Figure 10A:
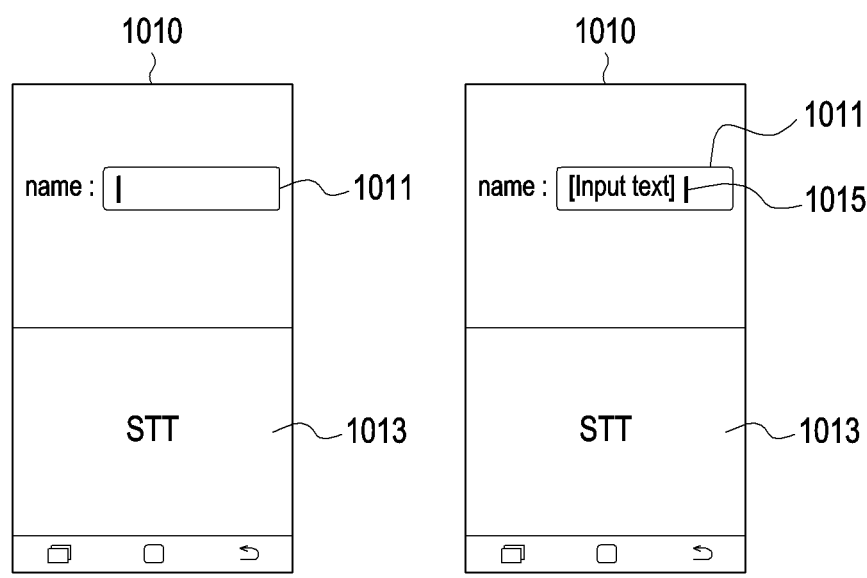
FIGS. 10A and 10B are concept views illustrating screens of an electronic device in a dictation mode according to various embodiments of the present invention.
Figure 10B:
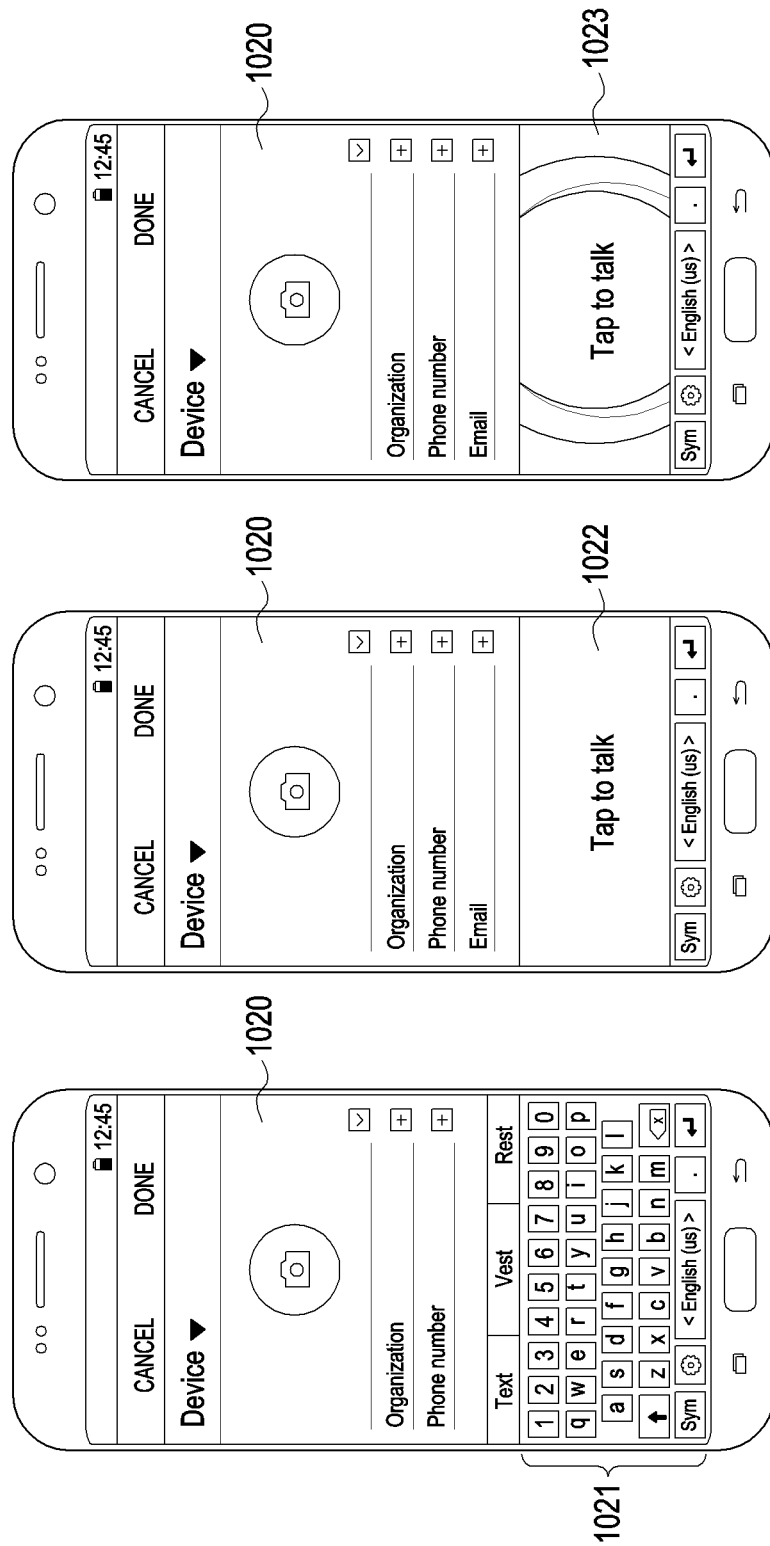

FIGS. 10A and 10B are concept views illustrating screens of an electronic device in a dictation mode according to various embodiments of the present invention.

Referring to FIG. 10A, according to various embodiments of the present invention, the electronic device 101 may display a screen 1010 including a text box 1011 and a speech-to-text (STT) activation button 1013. A cursor or such a focus may be displayed on the text box 1011 or, according to various embodiments of the present invention, no cursor may be displayed. If a predesignated user interface, such as the text box 1011, is displayed, the electronic device 101 may determine that the user utterance processing mode is the dictation mode. Or, upon detecting an additional user input, e.g., designation of the STT activation button 1013, the electronic device 101 may correspondingly determine that the user utterance processing mode is the dictation mode.

In the dictation mode, the electronic device 101 may detect the end point of the user utterance and send data about the user utterance, i.e., voice information corresponding to the user command to the external server. The electronic device 101 may send identification information about the dictation mode along with the data about the user utterance to the external server. The external server may determine the identification information about the dictation mode and perform ASR on the data about the user utterance received corresponding thereto, thereby obtaining a text. The external server may send the obtained text to the electronic device 101 in which case the command may not be sent from the external server to the electronic device 101. According to various embodiments of the present invention, the external server may perform NLU on the obtained text to determine the user's intent and relevant parameters and use them in grasping the context of the dialog, but no command corresponding thereto may be configured to be sent to the electronic device 101. In the dictation mode, the electronic device 101 may enter to the text box 1011 and display the received text 1015 as shown on the right side of FIG. 10.

Referring to FIG. 10B, the electronic device 101 may display a screen 1020 including a virtual keyboard 1021. The electronic device 101 may determine that the user utterance processing mode is the dictation mode based on, at least, the virtual keyboard 1021 being displayed. For example, if a hardware button is pressed or pressed-and-held while the virtual keyboard 1021 is displayed, the electronic device 101 may obtain a user utterance through the microphone and receive a text corresponding thereto from the external server. For example, if a hardware button is pressed with the virtual keyboard 1021 displayed, the electronic device 101 may display an indicator 1023 to indicate that speech recognition has been activated as shown on the right side of FIG. 10*b*. According to various embodiments of the present invention, the electronic device 101 may operate the indicator 901 with a speech recognition button. Or, the electronic device 101 may display the STT activation button 1022 as shown in the center of FIG. 10B. Upon detecting designation of the STT activation button 1022, the electronic device 101 may display an indicator 1023 to indicate that speech recognition has been activated as shown on the right side of FIG. 10B.

Figure 11A:
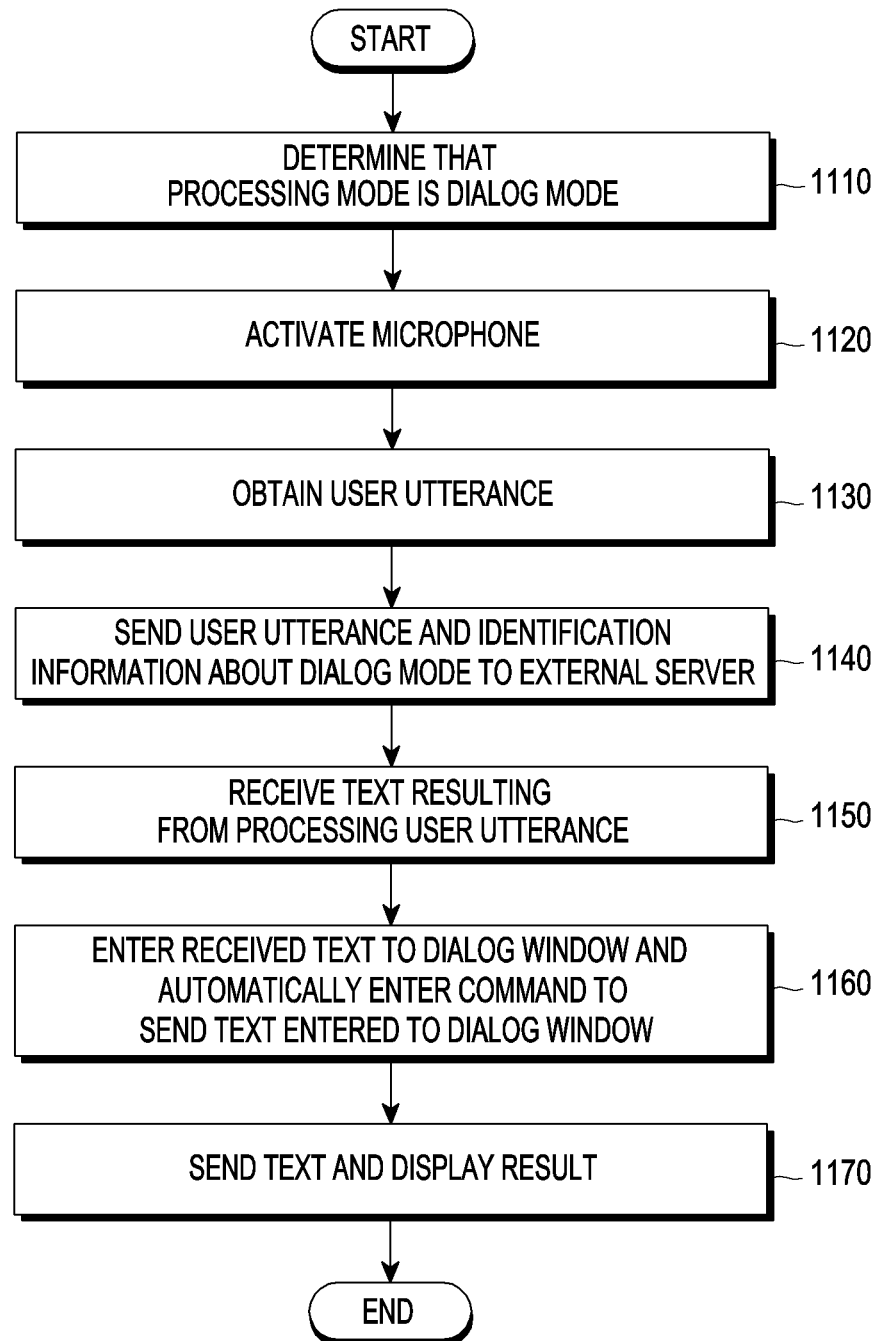
FIG. 11A is a flowchart illustrating a method of operating an electronic device in a dialog mode according to various embodiments of the present invention.

FIG. 11A is a flowchart illustrating a method of operating an electronic device in a dialog mode according to various embodiments of the present invention.

In operation 1110, the electronic device 101 (e.g., the processor 120 or 210) may determine that the user utterance processing mode is the dialog mode. In operation 1120, the electronic device 101 (e.g., the processor 120 or 210) may activate the microphone. According to various embodiments of the present invention, the electronic device 101 may activate the microphone upon recognizing the motion of the user to bring the electronic device 101 close to the user's mouth. Upon recognizing the motion of the user to put down the electronic device 101, the electronic device 101 may later deactivate the microphone during which the electronic device 101 may display the text processed by the external server or perform the generated command.

In operation 1130, the electronic device 101 (e.g., the processor 120 or 210) may obtain a user utterance through the activated microphone. In operation 1140, the electronic device 101 (e.g., the processor 120 or 210 or the communication interface 170 or the communication module 220) may send identification information about the dialog mode and the user utterance to the external server. Like in the command mode, the electronic device 101 may detect the end point of the user utterance and send data about the user utterance, i.e., voice information corresponding to the user command to the external server. The external server may identify that the user utterance processing mode is the dialog mode and may correspondingly apply ASR to the data about the received user utterance to thereby obtain the text. The external server may send the obtained text to the electronic device 101 but may send no command.

In operation 1150, the electronic device 101 (e.g., the processor 120 or 210 or the communication interface 170 or the communication module 220) may receive the text resulting from processing the user utterance. In operation 1160, the electronic device 101 (e.g., the processor 120 or 210) may enter the received text to the dialog window and automatically enter a command to send the entered text to the dialog window. In operation 1170, the electronic device 101 (e.g., the processor 120 or 210 or the communication interface 170 or the communication module 220) may send the text and display a result of sending. According to various embodiments of the present invention, in the dialog mode, the electronic device 101 may receive the text, enter the received text to the dialog window and display, and then additionally perform the transmission command.

Figure 11B:
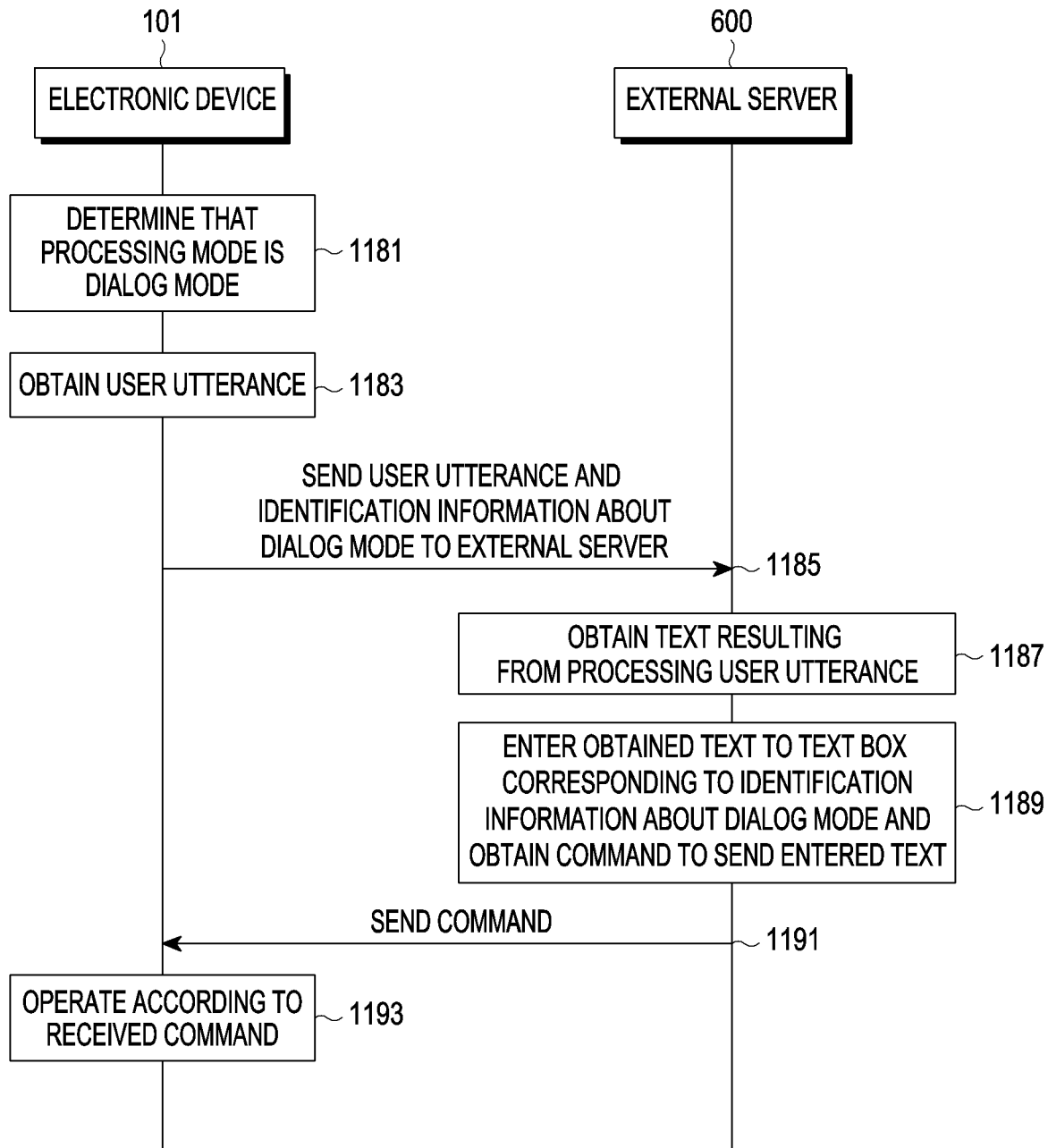
FIG. 11B is a flowchart illustrating operations of an electronic device and an external server according to various embodiments of the present invention.

FIG. 11B is a flowchart illustrating operations of an electronic device and an external server according to various embodiments of the present invention.

In operation 1181, the electronic device 101 (e.g., the processor 120 or 210) may determine that the user utterance processing mode is the dialog mode. In operation 1183, the electronic device 101 (e.g., the processor 120 or 210) may obtain a user utterance. In operation 1185, the electronic device 101 (e.g., the processor 120 or 210 or the communication interface 170 or the communication module 220) may send identification information about the dialog mode and the user utterance to the external server. In operation 1187, the external server 600 (e.g., a processor included in the external server) may identify that the user utterance processing mode is the dialog mode and may correspondingly apply ASR to the data about the received user utterance to thereby obtain the text. In operation 1189, the external server 600 (e.g., a processor included in the external server) may enter the obtained text to a text box, e.g., a dialog window, and generate a command to send the entered text. In operation 1191, the external server 600 (e.g., a processor or communication module included in the external server) may send the generated command to the electronic device 101. In operation 1193, the electronic device 101 (e.g., the processor 120 or 210) may be operated according to the received command, enter the text obtained thereby to a text box, e.g., the dialog window, and perform a task to send the entered text. According to another embodiment, the electronic device 101 may determine to send the text on its own as shown in FIG. 11A. In this case, the electronic device 101 may receive the text from the external server 600 and send the received text to the account of the other party in the dialog.

Figure 12A:
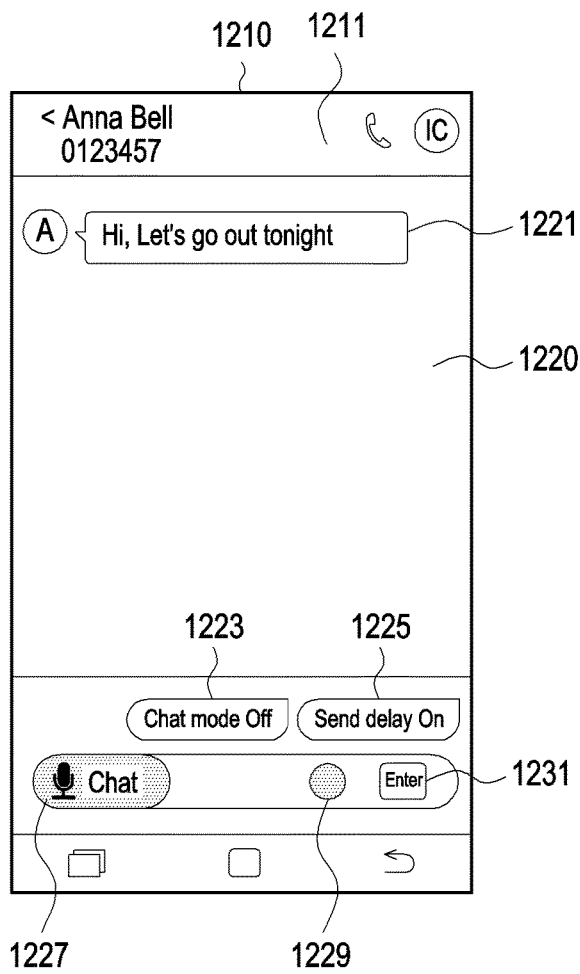
FIGS. 12A, 12B, and 12C are concept views illustrating display screens of an electronic device in a dialog mode according to various embodiments of the present invention.
Figure 12B:
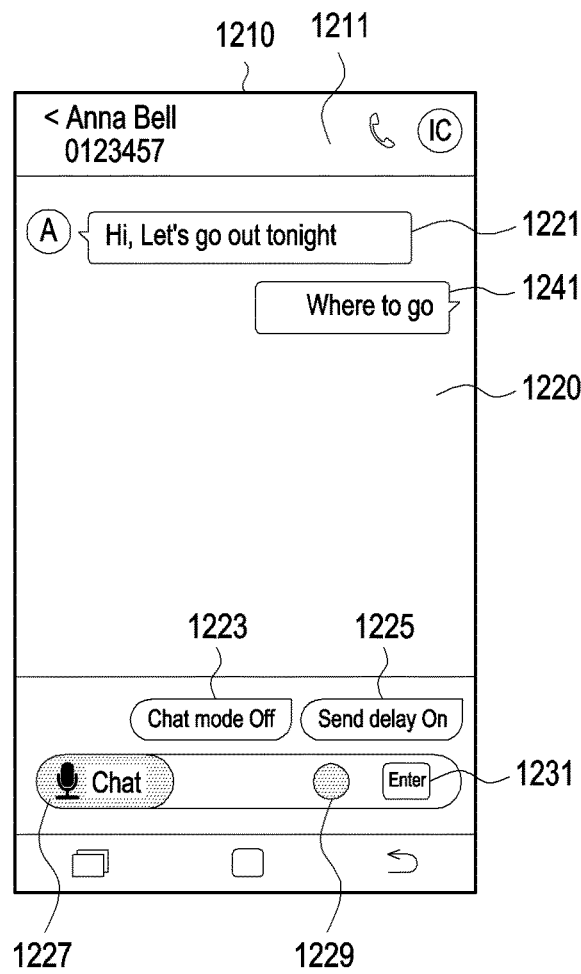
Figure 12C:
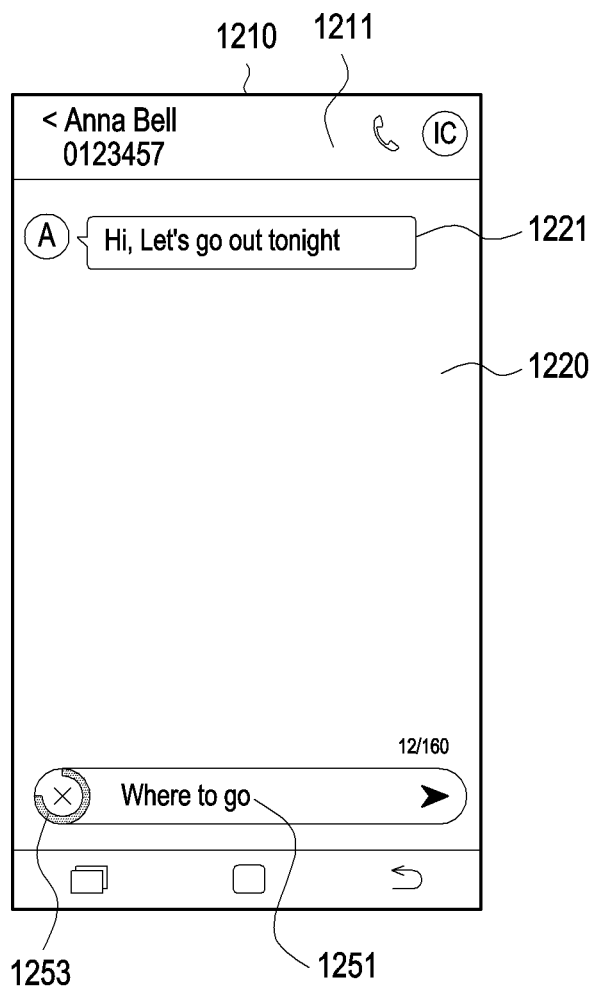

FIGS. 12A to 12C are concept views illustrating display screens of an electronic device in a dialog mode according to various embodiments of the present invention.

According to various embodiments of the present invention, the electronic device 101 may display a first screen 1210 including the other party 1211 to the dialog and a dialog content window 1220 as shown in FIG. 12A. For example, the electronic device 101 may execute a message application, and the first screen 1210 may be an execution screen of the message application. The dialog content window 1220 may display the messages 1221 which have been transmitted and received between the other party to the dialog and the user account logged into the electronic device 101 in the form of a balloon popup. According to various embodiments of the present invention, the electronic device 101 may display a dialog mode termination button 1223 and a message transmission delay button 1225 in the form of, e.g., a hint. The electronic device 101 may further display an indicator 1227 to identify the dialog mode, a text box 1229, and a message transmission button 1231. If the dialog mode termination button 1223 is designated, the electronic device 101 may terminate the dialog mode. If the indicator 1227 to identify the dialog mode is designated, the electronic device 101 may terminate the dialog mode. According to another embodiment, the electronic device 101 may activate the microphone upon recognizing the motion of the user to bring the electronic device 101 close to the user's mouth. Upon recognizing the user's motion to put down the electronic device 101, the electronic device 101 may terminate the dialog mode. The electronic device 101 may send data about the user utterance to the external server and obtain a text corresponding to the user utterance from the external server. The electronic device 101 may enter the obtained text to the text box 1229 and automatically send it. Or, when the obtained text is entered to the text box 1229 and the message transmission button 1231 is additionally designated, the electronic device 101 may send the entered message to another electronic device logged in with the account of the other party to the dialog through another electronic device, e.g., a message application management server. The electronic device 101 may additionally display the transmitted message 1241 on the dialog content window 1220, e.g., as shown in FIG. 12B.

If the transmission delay button 1225 is designated, the electronic device 101 may send the text received from the external server 600 to the other electronic device after a preset time elapses. For example, as shown in FIG. 12C, the electronic device 101 may display the text 1251 received from the external server in the text box 1229 and display the message transmission cancel button 1253. The message transmission cancel button 1253 may further include an indicator to indicate the remaining time to transmission of the message. For example, the indicator may be implemented in such a manner that the color or thickness of at least part of the edge progress bar of the message transmission cancel button 1253 is varied over time, and the user may designate the message transmission cancel button 1253 before the indicator indicates a preset time. Or, the electronic device 101 may display a countdown clock in such a manner that a preset number is reduced by one and, if reaching zero, the text is sent out. In this case, the electronic device 101 may cancel transmission of the text 1251 displayed in the text box 1229. If a preset time elapses without the message transmission cancel button 1253 designated, the electronic device 101 may send the text 1251 displayed in the text box 1229 and display, e.g., the message 1241 sent out as shown in FIG. 12B. According to various embodiments of the present invention, the electronic device 101 may display designated text processing-related information in addition to the text 1251. For example, the electronic device 101 may display information about "Bixby" which is the entity of the processing in addition to the text "Where to go" which is received from the external server, i.e., displaying the text "Where to go, by Bixby" in the text box. Bixby is an example of the application name or identification information about the entity of providing the service, and it may readily be appreciated by one of ordinary skill in the art that the information additionally displayed is not limited thereto.

Figure 13:
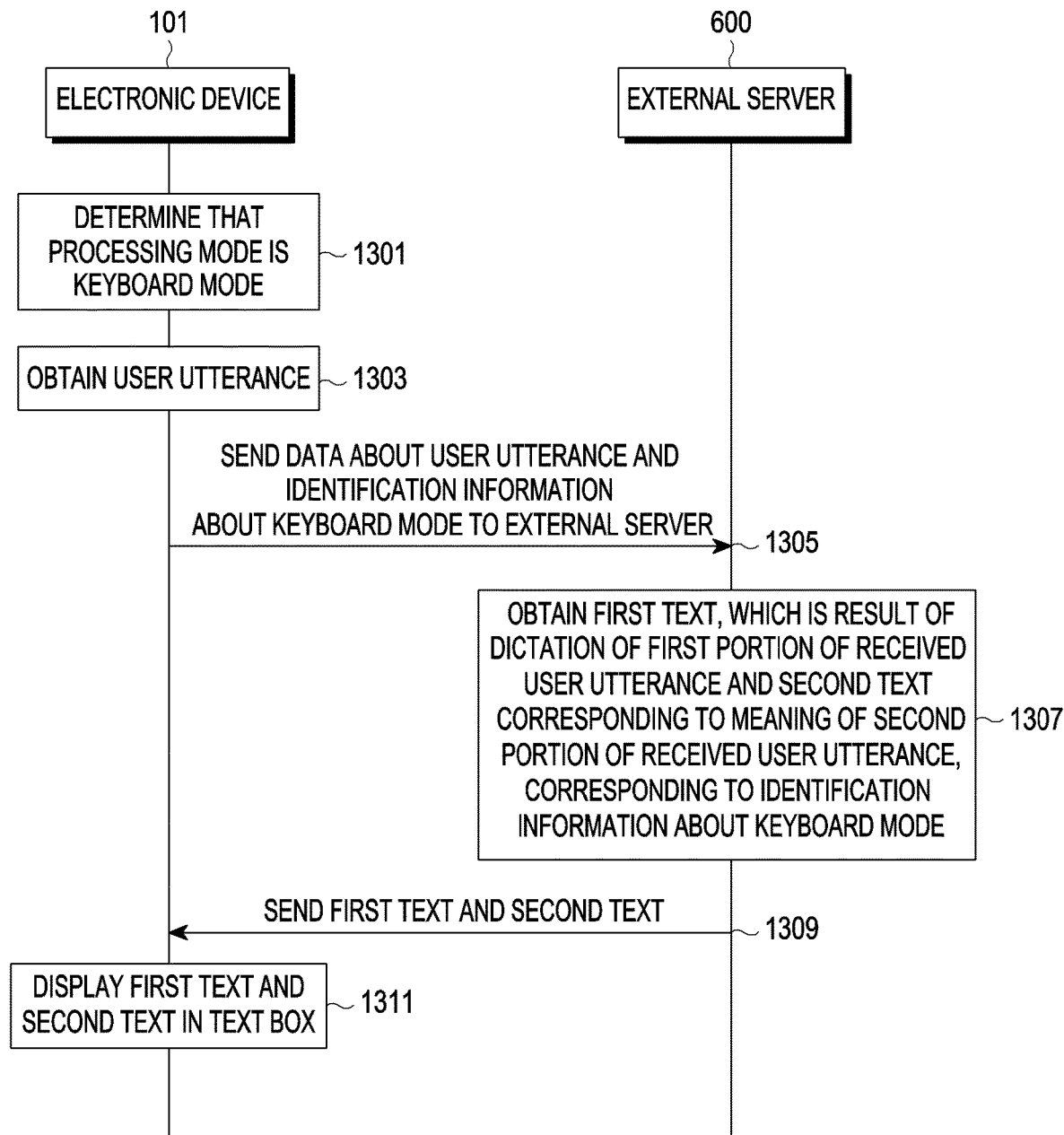
FIG. 13 is a flowchart illustrating operations of an electronic device and an external server according to various embodiments of the present invention.
Figure 14:
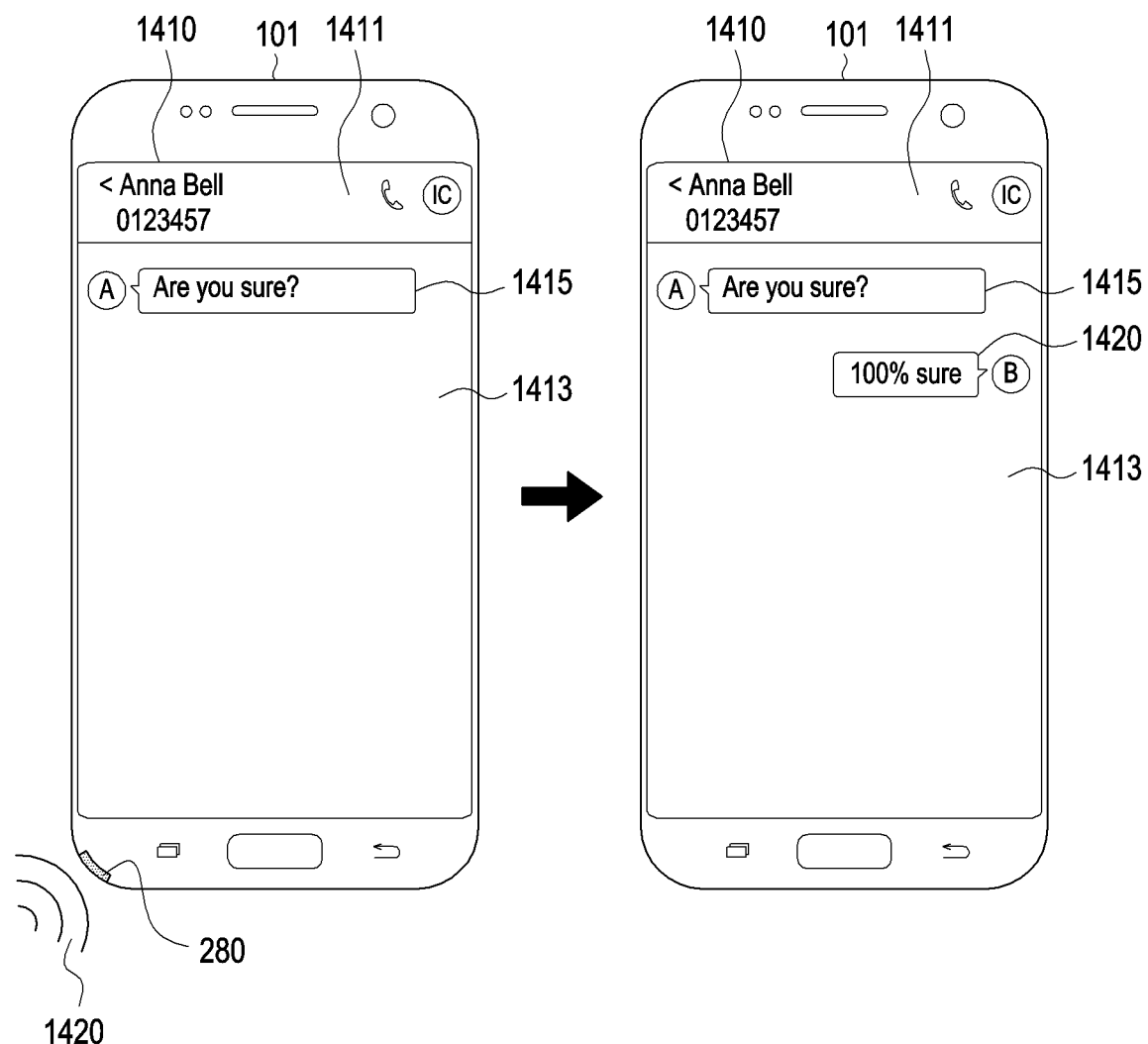
FIG. 14 is a concept view illustrating screens of an electronic device in a keyboard mode according to various embodiments of the present invention.

FIG. 13 is a flowchart illustrating operations of an electronic device and an external server according to various embodiments of the present invention. The embodiment related to FIG. 13 is described in greater detail with reference to FIG. 14. FIG. 14 is a concept view illustrating screens of an electronic device in a keyboard mode according to various embodiments of the present invention.

In operation 1301, the electronic device 101 (e.g., the processor 120 or 210) may determine that the user utterance processing mode is the keyboard mode. In operation 1303, the electronic device 101 (e.g., the processor 120 or 210) may obtain a user utterance. For example, as shown on the left side of FIG. 14, the electronic device 101 may obtain the user utterance 1420 "one hundred percent sure" via the microphone 280. The electronic device 101 may display a screen 1410 including the other party 1411 to the dialog and a dialog content window 1413. The dialog content window 1413 may include messages 1413 transmitted and received with the other party to the dialog.

In operation 1305, the electronic device 101 (e.g., the processor 120 or 210 or the communication interface 170 or the communication module 220) may send identification information about the keyboard mode and data about the user utterance to the external server. Corresponding to the identification information about the keyboard mode, the external server 600 may obtain a first text which is a result of dictation of a first portion of the received user utterance and a second text corresponding to the meaning of a second portion of the received user utterance. For example, the external server 600 may perform ASR on the received data about the user utterance, obtaining the text "one hundred percent sure." In operation 1307, the external server (e.g., a processor included in the external server) may obtain the text "100" corresponding to the meaning of "one hundred" and the text "%" corresponding to the meaning of "percent." The external server 600 may recognize a designated word set from the obtained text. The external server 600 may recognize a word set which indicates characters (letters, numbers, or symbols) on a keyboard from the obtained text. For example, the external server 600 may previously store the relationship between "percent" and "%" and, in a case where the obtained text has "percent" and the user utterance processing mode is the keyboard mode, the external server 600 may convert "percent" into "%." Not only can the external server 600 process texts of characters on a keyboard but also emoticons or spaces corresponding to emoticons or spaces as well. For example, in a case where the external server 600 obtains the text "I love you space heart emoticon" from the data about the user utterance, the external server 600 may process "space" to leave a space while converting "heart emoticon" into a corresponding emoticon.

The external server 600 may send the first text "sure" which is a result of dictation of the first portion of the received user utterance and the second text "100%" which corresponds to the meaning of the second portion to the electronic device 101. In operation 1309, the external server 600 (e.g., a processor or communication module included in the external server) may send the first text and the second text to the electronic device 101. In operation 11311, the electronic device 101 (e.g., the processor 120 or 210) may display the received first text and second text in a text box or dialog content window. For example, as shown on the right side of FIG. 14, the electronic device 101 may display the message 1420 "100% Sure" which is the first text and second text in the form of a popup balloon. According to various embodiments of the present invention, the electronic device 101 may display the first text and the second text in a text box and, after undergoing additional user verification, send the message to another electronic device. According to various embodiments of the present invention, the keyboard mode may belong to the dictation mode. In other words, according to various embodiments, the electronic device 101 or the external server 600 may not distinguish between the keyboard mode and the dictation mode and may process the obtained user utterance in the dictation mode to obtain a text of symbols. For example, the electronic device 101 may determine that the user utterance processing mode is the dictation mode to obtain the user utterance "one hundred percent sure." The electronic device 101 may send identification information and data about the user utterance to the external server 600, and the external server 600 may determine that user utterance processing mode is the dictation mode. Corresponding to the dictation processing mode, the external server 600 may ASR-process the received data about the user utterance, obtaining the text "one hundred percent sure." The external server 600 may change "one hundred" included in the received text into "100" and "percent" into "%," thereby obtaining the text "100% sure." Or, according to an implementation, the text "100% sure" may immediately be obtained from the data about the user utterance according to a result of applying ASR.

Figure 15:
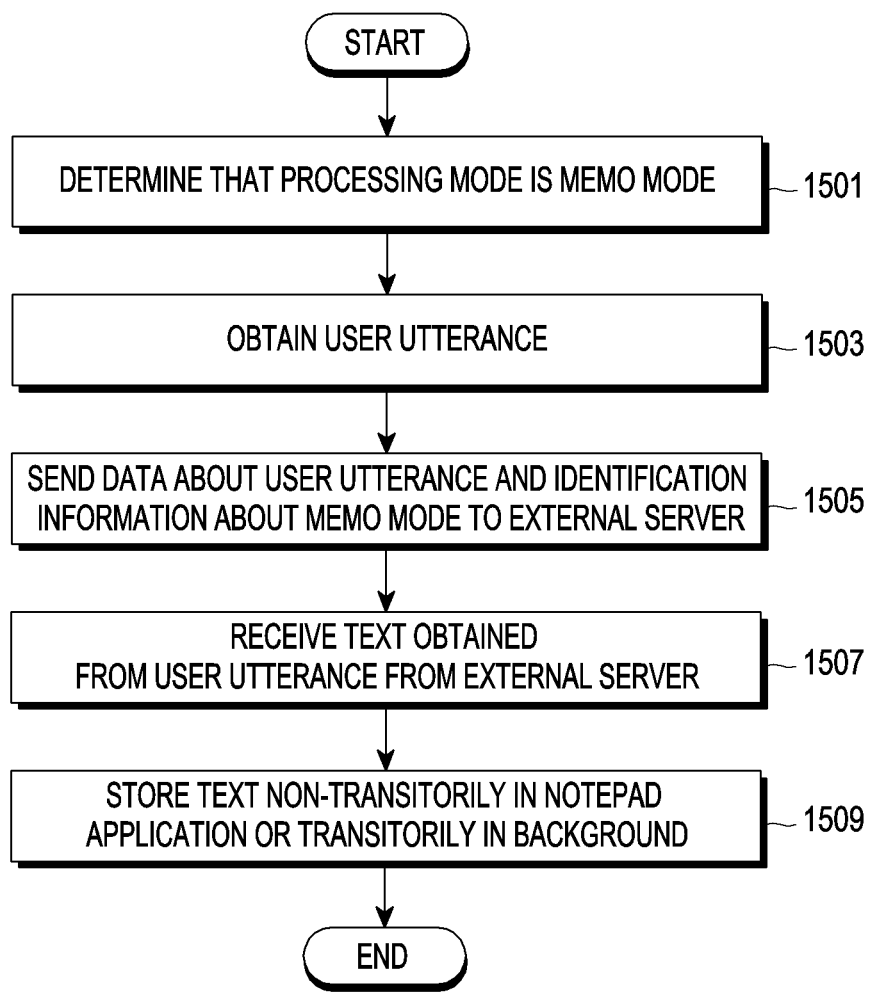
FIG. 15 is a flowchart illustrating a method of operating an electronic device in a memo mode according to various embodiments of the present invention.
Figure 16:
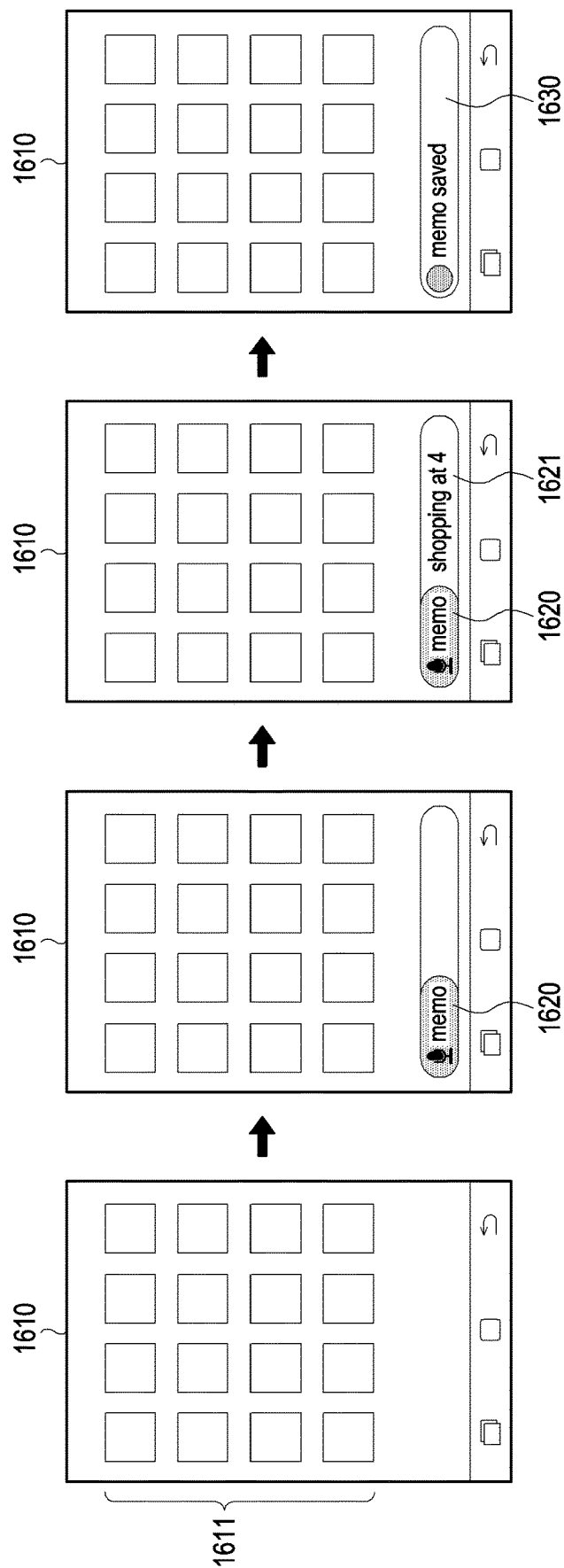
FIG. 16 is a concept view illustrating screens of an electronic device in a memo mode according to various embodiments of the present invention.

FIG. 15 is a flowchart illustrating a method of operating an electronic device in a memo mode according to various embodiments of the present invention. An embodiment is described in detail with reference to FIG. 15 along with FIG. 16. FIG. 16 is a concept view illustrating screens of an electronic device in a memo mode according to various embodiments of the present invention.

Referring to FIG. 15, the electronic device 101 (e.g., the processor 120 or 210) may determine that the user utterance processing mode is the memo mode in operation 1501. For example, as shown in FIG. 16, the electronic device 101 may display a screen 1610 including a plurality of objects 1611 and display an indicator 1620 to indicate the memo mode corresponding to entry into the memo mode. The electronic device 101 may activate the microphone. In operation 1503, the electronic device 101 (e.g., the processor 120 or 210) may obtain a user utterance. For example, the electronic device 101 may obtain the user utterance "shopping at 4." In operation 1505, the electronic device 101 (e.g., the processor 120 or 210 or the communication interface 170 or the communication module 220) may send identification information about the memo mode and data about the user utterance to the external server. In operation 1507, the electronic device 101 (e.g., the processor 120 or 210 or the communication interface 170 or the communication module 220) may receive the obtained text from the external server. In operation 1509, the electronic device 101 (e.g., the processor 120 or 210) may store the text non-transitorily in a notepad application or transitorily in the background. The electronic device 101 may register the text as, e.g., a schedule using the notepad application. Or, as shown in FIG. 16, the electronic device 101 may display the received text 1621 in a text box and display a text 1630 to indicate that the text has been stored. The electronic device 101 may transitorily store the text in the background and display the transitorily stored text later corresponding to a user command, e.g., paste. Or, the electronic device 101 may permanently store the text in the background and store the text until a designated command is entered or a designated time elapses.

Figure 17:
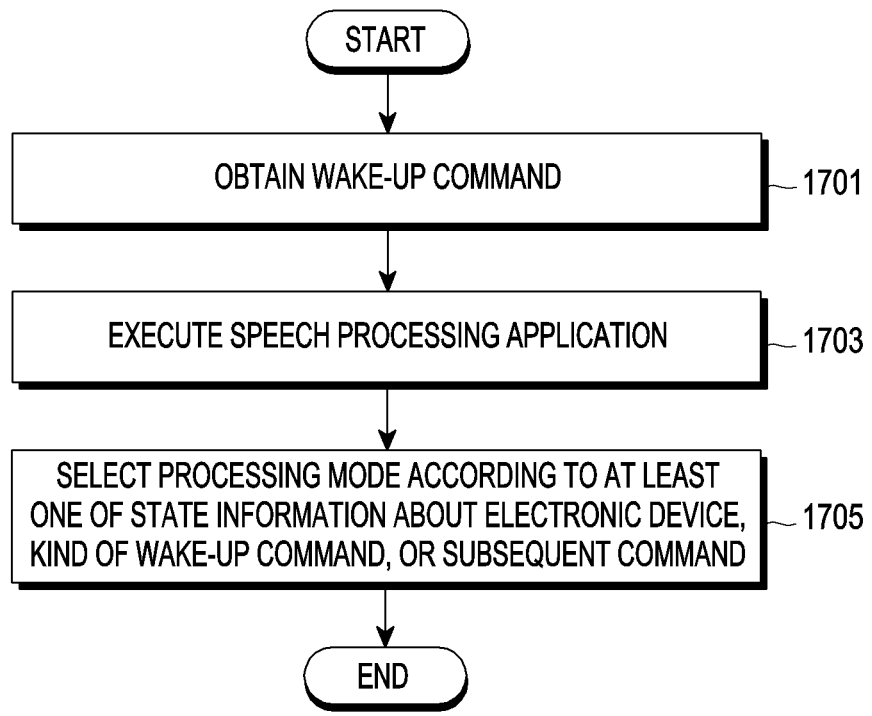
FIG. 17 is a flowchart illustrating a method of operating an electronic device according to various embodiments of the present invention.
Figure 18A:
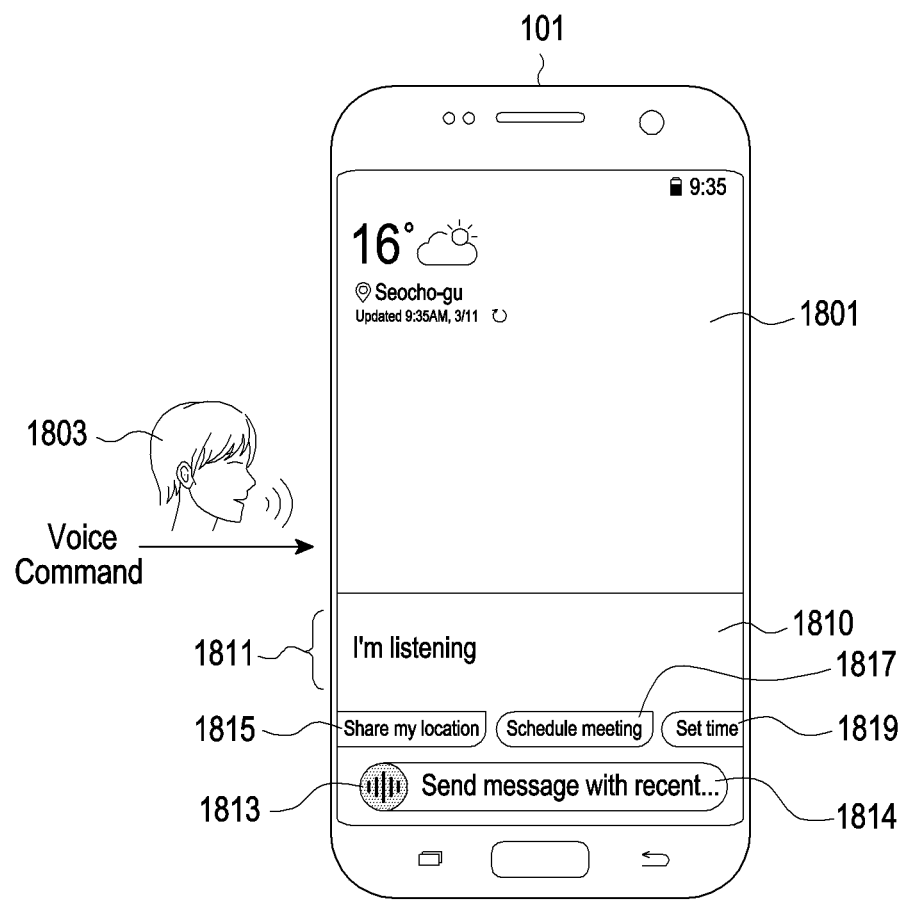
FIGS. 18A and 18B are concept views illustrating a wake-up command to execute a speech processing application according to various embodiments of the present invention.
Figure 18B:
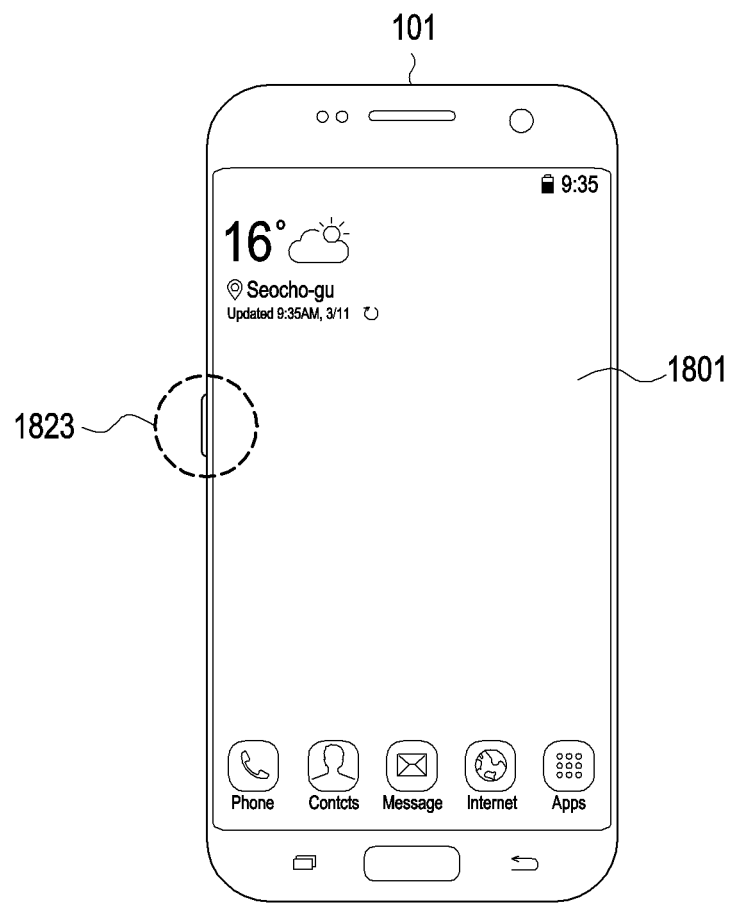
Figure 18C:
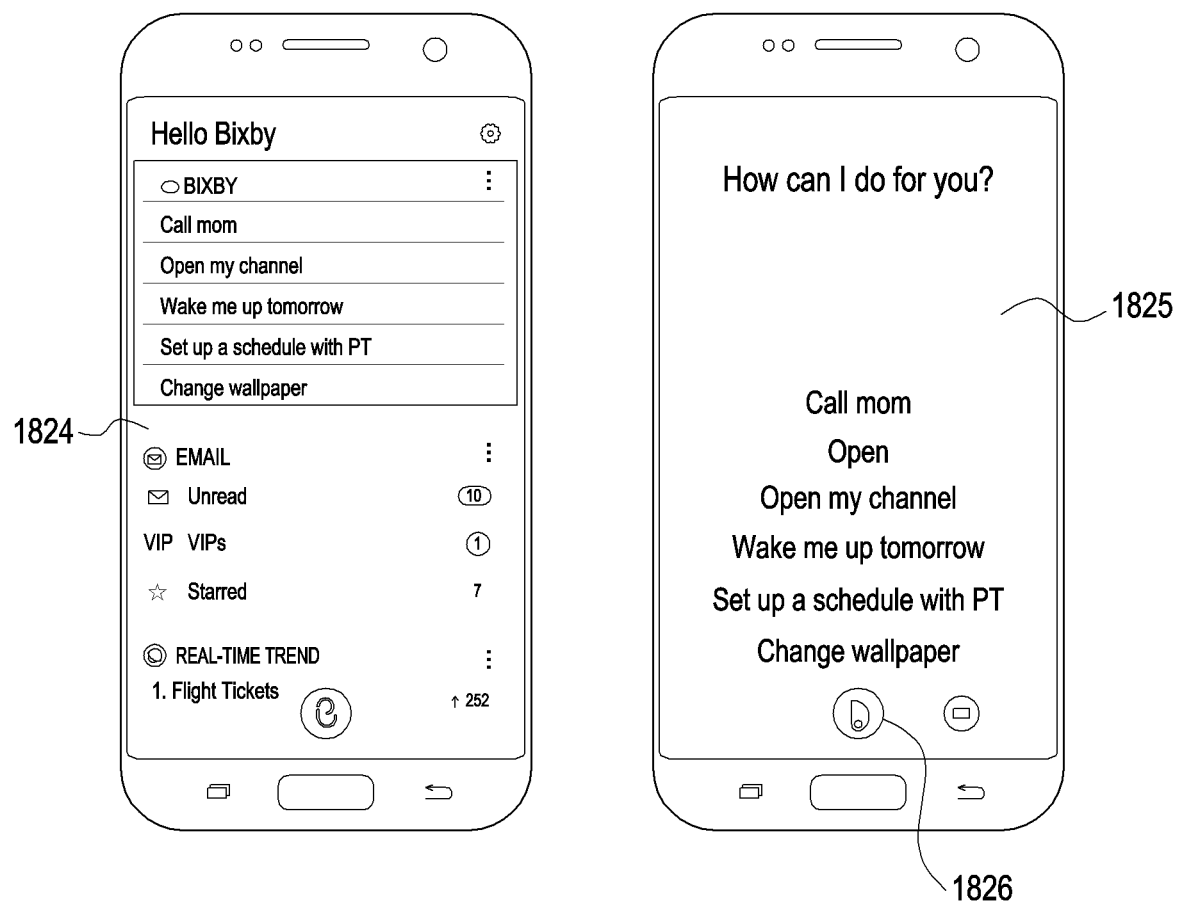
FIG. 18C illustrates execution screens of a speech processing application according to various embodiments of the present invention.

FIG. 17 is a flowchart illustrating a method of operating an electronic device according to various embodiments of the present invention. The embodiment of FIG. 17 is described in greater detail with reference to FIGS. 18A to 18C. FIGS. 18A to 18C are concept views illustrating a wake-up command to execute a speech processing application according to various embodiments of the present invention.

In operation 1701, the electronic device 101 (e.g., the processor 120 or 210) may obtain a wake-up command. In operation 1703, corresponding to the wake-up command, the electronic device 101 (e.g., the processor 120 or 210) may activate the application processor (120 or 210) which is in a dormant state or execute a speech processing application. According to various embodiments of the present invention, the audio codec included in the audio module 280 of the electronic device 101 may obtain the wake-up command to perform a wake-up corresponding operation. Or, a sensor hub included in the electronic device 101 may obtain the wake-up command and perform the wake-up corresponding operation. In operation 1705, the electronic device 101 (e.g., the processor 120 or 210) may determine the user utterance processing mode according to at least one of state information about the electronic device 101, the type of the wake-up command, or a subsequent command. According to various embodiments of the present invention, as shown in FIG. 18A, a background screen 1801 may be displayed which may include, e.g., weather information. The electronic device 101 may obtain a voice command 1803 as the wake-up command, thereby executing a speech processing application. The electronic device 101 may keep the microphone always on and thus obtain a predesignated voice command (e.g., Hi, Bixby) as the wake-up command. The electronic device 101 may display an execution screen 1810 of a speech processing application on at least a portion of the display. According to various embodiments of the present invention, the execution screen 1810 of the speech processing application may include, e.g., a text 1811 to indicate listening, an indicator 1813 to indicate listening, and a text box 1814 to display text or commands received from the external server. According to various embodiments of the present invention, the electronic device 101 may operate the indicator 1813 with a speech recognition button. According to various embodiments of the present invention, the execution screen 1810 of the speech processing application may include, e.g., a share my location button 1815, a schedule meeting button 1817, and a set time button 1819.

According to various embodiments of the present invention, the electronic device 101 may be configured to execute the speech processing application according to a single wake-up command. In this case, upon obtaining the wake-up command, the electronic device 101 may determine the user utterance processing mode based on the state information about the electronic device 101. For example, in a case where a wake-up command is entered, the electronic device 101 may, as default, determine that the user utterance processing mode is the default mode. For example, if an application, e.g., a messenger, is now being displayed, the electronic device 101 may determine that the user utterance processing mode is the dialog mode depending on the kind of the application. For example, if a text box or keyboard is displayed, the electronic device 101 may determine that the user utterance processing mode is the dictation mode depending on the type of object being displayed.

According to various embodiments of the present invention, the electronic device 101 may be configured to execute the speech processing application according to a plurality of wake-up commands. In this case, the electronic device 101 may previously store information about the relation between the plurality of wake-up commands and user utterance processing modes and determine the user utterance processing mode based on the stored relation information. For example, the electronic device 101 may store relation information resulting from mapping the voice command "dictation mode on" and the "dictation mode" and relation information resulting from the voice command "chat mode on" and the "dialog mode." Upon later obtaining the voice command "dictation mode on," the electronic device 101 may determine that the user utterance processing mode is the dictation mode based on the relation information previously stored.

According to various embodiments of the present invention, the electronic device 101 may be configured to determine the user utterance processing mode using a wake-up command and a subsequent command. The electronic device 101 may obtain a command to request along with a wake-up command to request to execute the speech processing application. For example, in a case where the voice command "Hi, Bixby" is set to the wake-up command, the electronic device 101 may obtain the voice command "Hi, Bixby, dictation mode." According to the command "dictation mode" subsequent to the wake-up command, the electronic device 101 may determine that the user utterance processing mode is the dictation mode. In this case, if a single wake-up command is obtained, the electronic device 101 may determine that the user utterance processing mode is the command mode.

According to various embodiments of the present invention, the electronic device 101 may obtain a designation of a hardware button 1823 as a wake-up command to execute the speech processing application, e.g., as shown in FIG. 18B. The hardware button 1823 may be positioned on a side surface of the housing of the electronic device 101 and may be referred to as a physical key. The electronic device 101 may include a hardware button 1823 assigned only to execute the speech processing application. If the hardware button 1823 is designated, the electronic device 101 may immediately execute the speech processing application on any screen or may execute the speech processing application in the background or display the execution screen of the speech processing application on at least a portion of the display. According to various embodiments of the present invention, the electronic device 101 may previously store information about the relation between the type of pressing the hardware button 1823 and the user utterance processing mode. The electronic device 101 may determine the user utterance processing mode depending on the type of pressing the hardware button 1823 using the relation information. For example, upon detecting one press on the hardware button 1823, the electronic device 101 may correspondingly determine that the user utterance processing mode is the command mode. For example, upon detecting two presses on the hardware button 1823, the electronic device 101 may correspondingly determine that the user utterance processing mode is the continuous command mode. According to various embodiments of the present invention, the electronic device may previously store information about the relations between various types of pressing the button, a single press, a double press, a triple press, a single press-and-hold, a double press-and-hold, and a long press, and the user utterance processing modes and determine the user utterance processing mode based on the detected type of pressing the hardware button 1823. Or, the electronic device 101 may further include a pressure sensor capable of detecting the pressure on the hardware button 1823. For example, in a case where the hardware button 1823 includes a capacitive touch button, the electronic device 101 may determine the user utterance processing mode corresponding to the pressure on the hardware button 1823. According to another embodiment, if pressing the hardware button 1823 is detected, the electronic device 101 may display a user interface to select the user utterance processing mode and, according to an additional user input, determine the user utterance processing mode. For example, upon detecting a pressing of the hardware button 1823 while the execution screen of a messenger application is being displayed, the electronic device 101 may display a user interface to select one of the command mode, continuous command mode, and dialog mode on at least a portion of the execution screen. The electronic device 101 may determine the user utterance processing mode included in the user interface according to at least one of information about the current state of the electronic device 101 or kind of application. FIG. 18C illustrates screens as the hardware button 1823 is pressed according to various embodiments of the present invention. Upon detecting a pressing of the hardware button 1823, the electronic device 101 may display a first execution screen 1824 of the speech recognition application as shown on the left side of FIG. 18C. The first execution screen 1824 may include, e.g., the service provider or application identifier (Bixby), speech processing recognition history or example user utterances (Call mom, Open my channel, Wake me up tomorrow, Set up a schedule with PT, Change wallpaper), email-related information (EMAIL, Unread, VIP, starred), and real-time information (REAL-TIME TREND). Or, upon detecting a pressing and press-and-hold of the hardware button 1823, the electronic device 101 may display a second execution screen 1825 of the speech recognition application as shown on the right side of FIG. 18C. The second execution screen 1825 may include, e.g., the speech processing recognition history or example user utterances (Call mom, Open my channel, Wake me up tomorrow, Set up a schedule with PT, Change wallpaper). The second execution screen 1825 may be a screen corresponding to, e.g., a speech recognition waiting state. The second screen 1825 may include an indicator 1826 to indicate waiting for speech recognition, i.e., listening. According to various embodiments of the present invention, the electronic device 101 may operate the indicator 1826 with a speech recognition button. Although screens according to pressing of the hardware button 1823 according to various embodiments of the present invention are shown, various feedback effects (e.g., vibration, haptic, or sound) according to pressing of the hardware button 1823 may be provided.

According to various embodiments of the present invention, the electronic device 101 may execute the speech processing application by software key entry or input to an icon. According to various embodiments of the present invention, the electronic device 101 may implement, e.g., a go back to home screen key, a back key, and a menu key as software keys in which case the user utterance processing mode may be determined based on at least one of the kind of the software key or entry type.

Figure 18D:
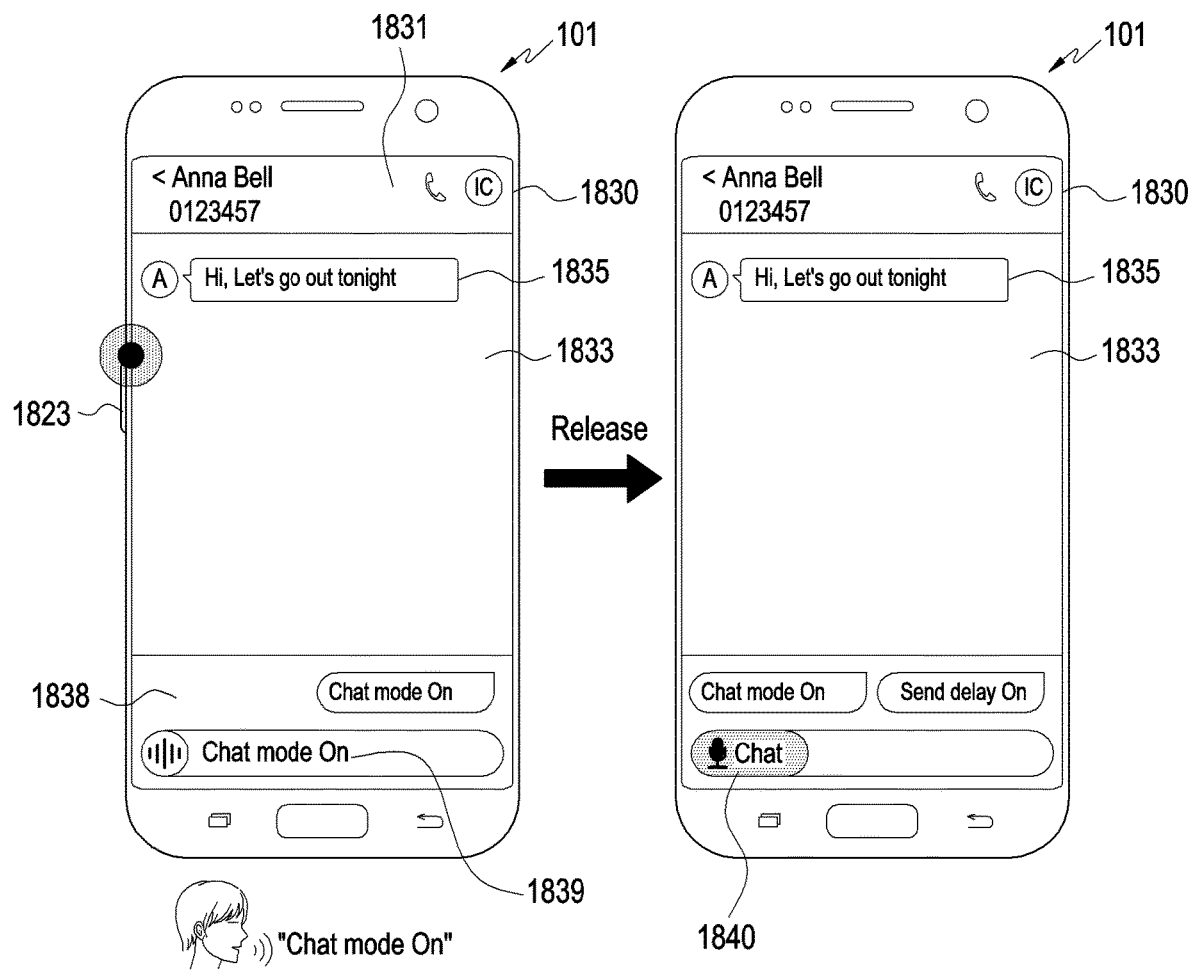
FIG. 18D illustrates concept views to describe a wake-up command to execute a speech processing application according to various embodiments of the present invention.

According to various embodiments of the present invention, the electronic device 101 may determine the user utterance processing mode based on a combination of entry of the hardware button 1823 and a voice command. For example, the electronic device may obtain a voice command while, before, or after the hardware button 1823 is pressed and, based on at least one of the obtained voice command or the type of pressing of the hardware button 1823, determine the user utterance processing mode. For example, as shown in FIG. 18D, the electronic device 101 may display an execution screen 1830 of a message application, and the execution screen 1830 of the message application may include the other party 1831 to the dialog and the dialog content window 1833. The dialog content window 1822 may display the messages 1835 transmitted and received thus far with the other party to the dialog in the form of a popup balloon. The electronic device 101 may detect a pressing of the hardware button 1823 and may additionally obtain a voice command (e.g., "Chat mode on"). The electronic device 101 may correspondingly display the execution screen 1838 of the speech processing application and display the text 1839 of the obtained voice. Thereafter, the electronic device 101 may run the dialog mode and display an indicator 1840 for the current user utterance processing mode, i.e., the dialog mode.

According to various embodiments of the present invention, the electronic device 101 may determine the user utterance processing mode based on at least one of the kind or state of the application being executed or displayed. For example, the electronic device 101 may determine the user utterance processing mode at least one of the kind or state of the application being displayed at the time of detecting a wake-up command. For example, in a case where the electronic device 101 is displaying, e.g., a messenger application or text message application, the electronic device 101 may determine that the user utterance processing mode is the dialog mode depending on the kind of the application. The electronic device 101 may store information about the relation between at least one of the kind or state of the application or the kind or state of the object being displayed and the user utterance processing mode and determine the user utterance processing mode using the relation information. For example, in a case where the electronic device 101 is displaying a keyboard or text box, the electronic device 101 may determine that the user utterance processing mode is the dictation mode corresponding to the kind of the application or the kind or state of the object being displayed. For example, in a case where a notepad application in which the electronic device 101 does not support other menus or functions than the input window is displayed, the electronic device 101 may determine that the user utterance processing mode is the dictation mode corresponding to the kind or state of the application being displayed or the kind or state of the object being displayed.

Figure 19:
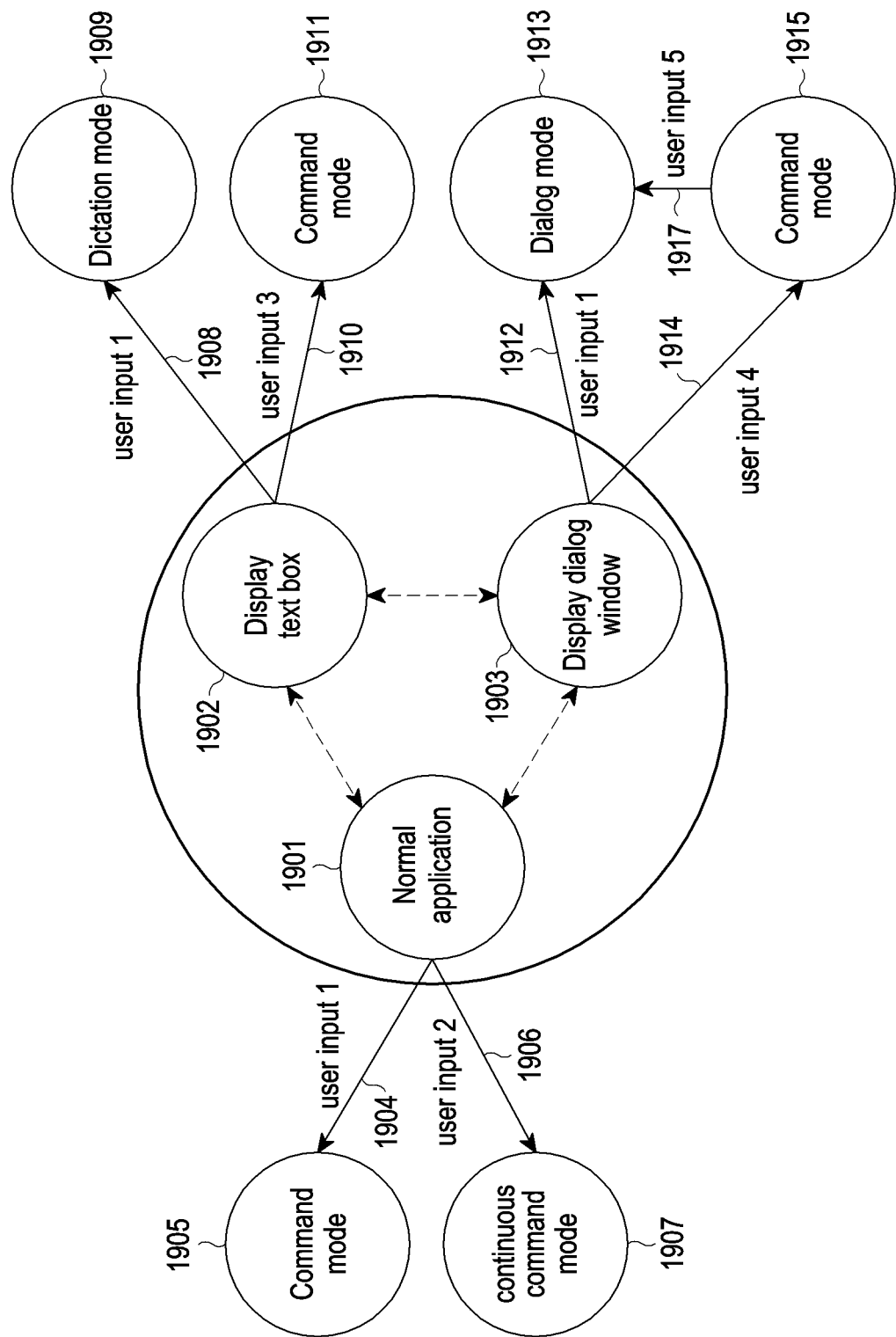
FIG. 19 is a concept view illustrating a user utterance processing mode initial selection or switch according to various embodiments of the present invention.

FIG. 19 is a concept view illustrating a user utterance processing mode initial selection or switch according to various embodiments of the present invention.

According to various embodiments of the present invention, the electronic device 101 may switch a first user utterance processing mode to a second user utterance processing mode. For example, in the first user utterance processing mode, the electronic device 101 may activate the microphone and obtain a voice command. The electronic device 101 may switch the mode into the second user utterance processing mode corresponding to the obtained voice command. For example, in the first user utterance processing mode, the electronic device 101 may detect entry of a hardware button. The electronic device 101 may temporarily switch the mode into the second user utterance processing mode corresponding to a pressing of the hardware button and may then turn back to the first user utterance processing mode. For example, upon detecting a predesignated type of pressing, e.g., press-and-hold, of the hardware button, the electronic device 101 may correspondingly make a temporary mode switch to the second user utterance processing mode and go back to the previous mode. According to various embodiments of the present invention, corresponding to a pressing of the hardware button, the electronic device 101 may switch the mode into the second user utterance processing mode and maintain the second user utterance processing mode. For example, the electronic device 101 may switch the mode into the second user utterance processing mode corresponding to the current state based on, e.g., state information about the electronic device 101. Or, the electronic device 101 may switch user utterance processing modes according to a preset order. For example, the electronic device 101 may be configured to switch modes in the order of the command mode, continuous command mode, and dictation mode according to mode switch commands and, upon detecting a pressing of the hardware button in the continuous command mode, switch to the dictation mode.

According to various embodiments of the present invention, the electronic device 101 may determine the user utterance processing mode based on at least one of the kind or state or input of the application being displayed. For example, as shown in FIG. 19, the electronic device 101 may divide the kinds or states of the application being displayed into a normal application state 1901, a text box display state 1902, or a dialog window display state 1903. The electronic device 101 may determine the mode into which it enters depending on an input detected in any one state and may enter into a different mode depending on the kind of input detected although one state, i.e., one application, is being displayed. If the kind or state of the application being currently displayed differs although the same input is detected, the electronic device 101 may enter into a different mode. According to various embodiments of the present invention, the normal application state 1901, the text box display state 1902, or the dialog window display state 1903 may have a priority. For example, if a text box is being displayed in the dialog window, the electronic device 101 may determine that the state of the application is the text box display state 1902 depending on the priority.

According to various embodiments of the present invention, the electronic device 101 may determine that the current state of the electronic device 101 is the text box display state 1902. For example, in a case where the screen being displayed includes at least one of a text box for text entry or a keyboard for text entry, the electronic device 101 may determine that the state is the text box display state 1902. Upon detecting a first user input 1908, the electronic device 101 may determine that the user utterance processing mode is the dictation mode 1909. For example, upon detecting a press-and-hold of the hardware button or a designation of the microphone activation button being displayed, the electronic device 101 may enter into the dictation mode 1909. In a case where a third user input 1910 different from the first user input 1908 is entered, the electronic device 101 may determine that the user utterance processing mode is the command mode 1911. For example, in a case where the electronic device 101 obtains a wake-up voice command, e.g., "Bixby," and a pressing of the hardware button, the electronic device 101 may enter into the command mode 1911.

According to various embodiments of the present invention, the electronic device 101 may determine that the current state of the electronic device 101 is the dialog window display state 1903. For example, in a case where a screen being displayed includes a dialog window, the electronic device 101 may determine that the state is the dialog window display state 1903. Upon detecting a first user input 1912, the electronic device 101 may determine that the user utterance processing mode is the dialog mode 1913. For example, upon detecting a press-and-hold of the hardware button or a designation of the microphone activation button or obtaining a wake-up voice command, e.g., "Bixby," the electronic device 101 may enter into the dialog mode 1913. According to various embodiments of the present invention, in the case of activating the dialog mode, the electronic device 101 may be configured to enter into the dialog mode 1913 corresponding to detection of the first user input 1912. Upon detecting a fourth user input 1914 different from the first user input 1912, the electronic device 101 may determine that the user utterance processing mode is the command mode 1915. Meanwhile, according to various embodiments of the present invention, in the case of not activating the dialog mode, upon detecting a press-and-hold of the hardware button, a designation of the microphone activation button or obtaining a wake-up voice command, e.g., "Bixby," the electronic device 101 may be configured to enter into the command mode 1915. If a fifth user input 1917 is detected in the command mode 1915, the electronic device 101 may switch the mode from the command mode 1915 to the dialog mode 1913.

According to various embodiments of the present invention, the electronic device 101 may determine that the current state of the electronic device 101 is the normal application state 1901. For example, in a case where the electronic device 101 is in neither the text box display state 1902 nor the dialog window display state 1903, the electronic device 101 may determine that the state is the normal application state 1901. Upon detecting a first user input 1904, the electronic device 101 may determine that the user utterance processing mode is the command mode 1905. For example, in a case where a press-and-hold of the hardware button is detected, the microphone activation button is designated, or a wake-up voice command, e.g., "Bixby," is obtained, the electronic device 101 may enter into the command mode 1905. In a case where a second user input 1906 different from the first user input 1904 is detected, the electronic device 101 may determine that the user utterance processing mode is the continuous command mode 1907. For example, the electronic device 101 may enter into the continuous command mode 1907 corresponding to a user input, such as a simultaneous pressing of the emergency button and the end button or obtaining a voice command including a text by which the mode may be identified, such as "Bixby, Command mode on." Meanwhile, upon detecting a pressing of the dialog mode start button or obtaining a voice command including a text by which the mode may be identified, such as "Chat mode on" in the normal application state 1901, the electronic device 101 may enter into the dialog mode 1913.

Figure 20:
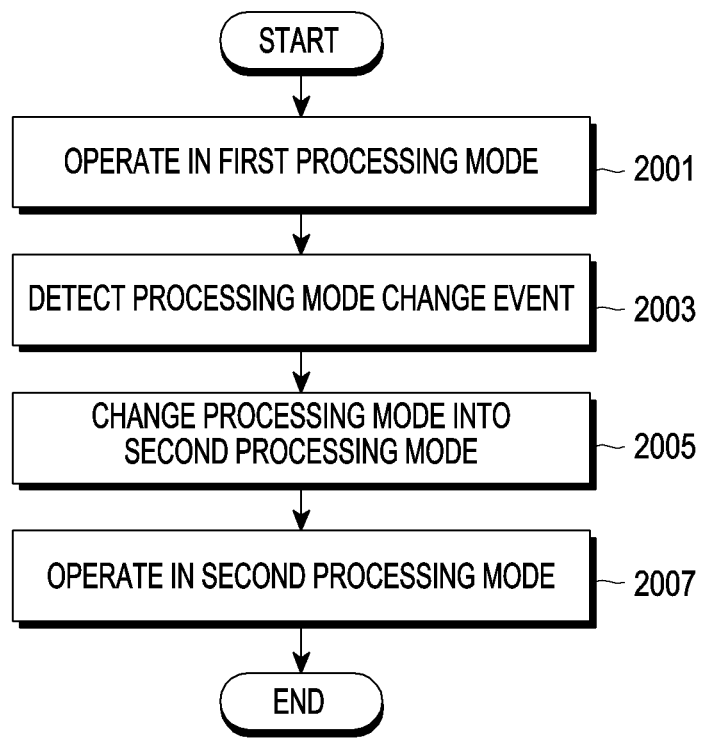
FIG. 20 is a flowchart illustrating a method of operating an electronic device according to various embodiments of the present invention.
Figure 21:
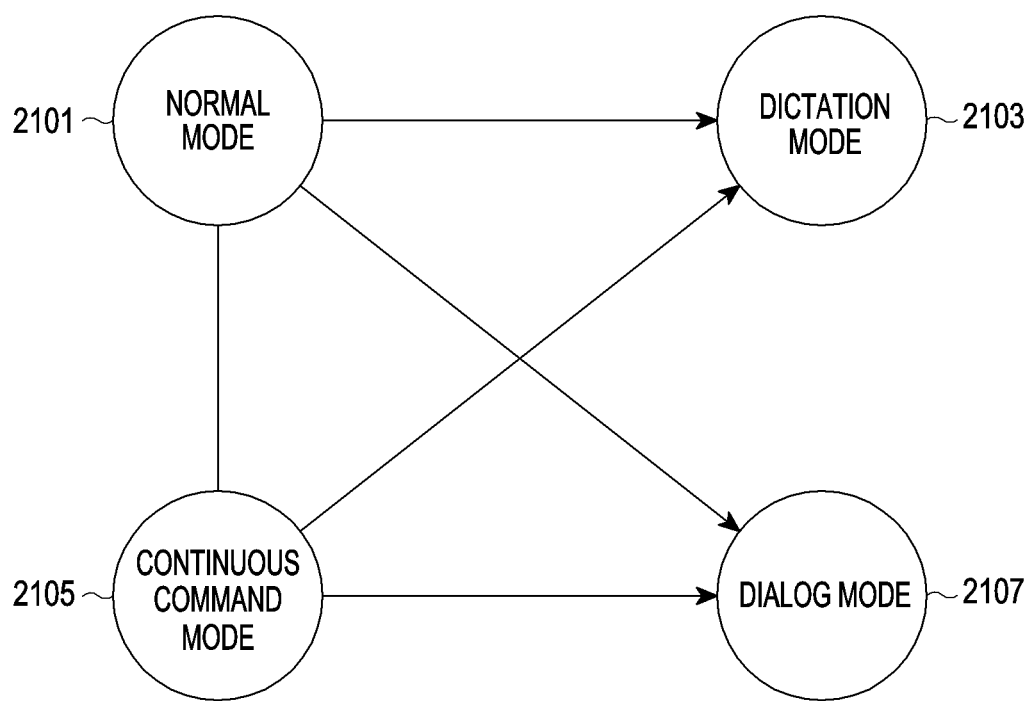
FIG. 21 is a concept view illustrating a mode change according to various embodiments of the present invention.

FIG. 20 is a flowchart illustrating a method of operating an electronic device according to various embodiments of the present invention. The embodiment of FIG. 20 is described in greater detail with reference to FIG. 21. FIG. 21 is a concept view illustrating a mode change according to various embodiments of the present invention.

In operation 2001, the electronic device 101 (e.g., the processor 120 or 210) may operate in a first processing mode. In operation 2003, the electronic device 101 (e.g., the processor 120 or 210) may detect a processing mode change event. In operation 2005, the electronic device 101 (e.g., the processor 120 or 210) may change the processing mode into a second processing mode. In operation 2007, the electronic device 101 (e.g., the processor 120 or 210) may operate in the second processing mode. For example, the electronic device 101 may obtain the voice command "Dictation mode on" in the command mode 2101. Corresponding thereto, the electronic device 101 may change the user utterance processing mode into the dictation mode 2103. For example, in the command mode 2101, the electronic device 101 may obtain the voice command "Chat mode on" or detect a designation of the dialog mode start button or a designation of the dialog mode start button at the hint. Corresponding thereto, the electronic device 101 may change the user utterance processing mode into the dialog mode 2107. The hint is described below in greater detail. According to various embodiments of the present invention, the electronic device 101 may change the mode from the command mode 2101 to the continuous command mode 2105 and from the continuous command mode 2105 to the dictation mode 2103 or dialog mode 2107 and it may readily be appreciated by one of ordinary skill in the art that the modes before and after the mode change are not limited to specific ones.

Figure 22:
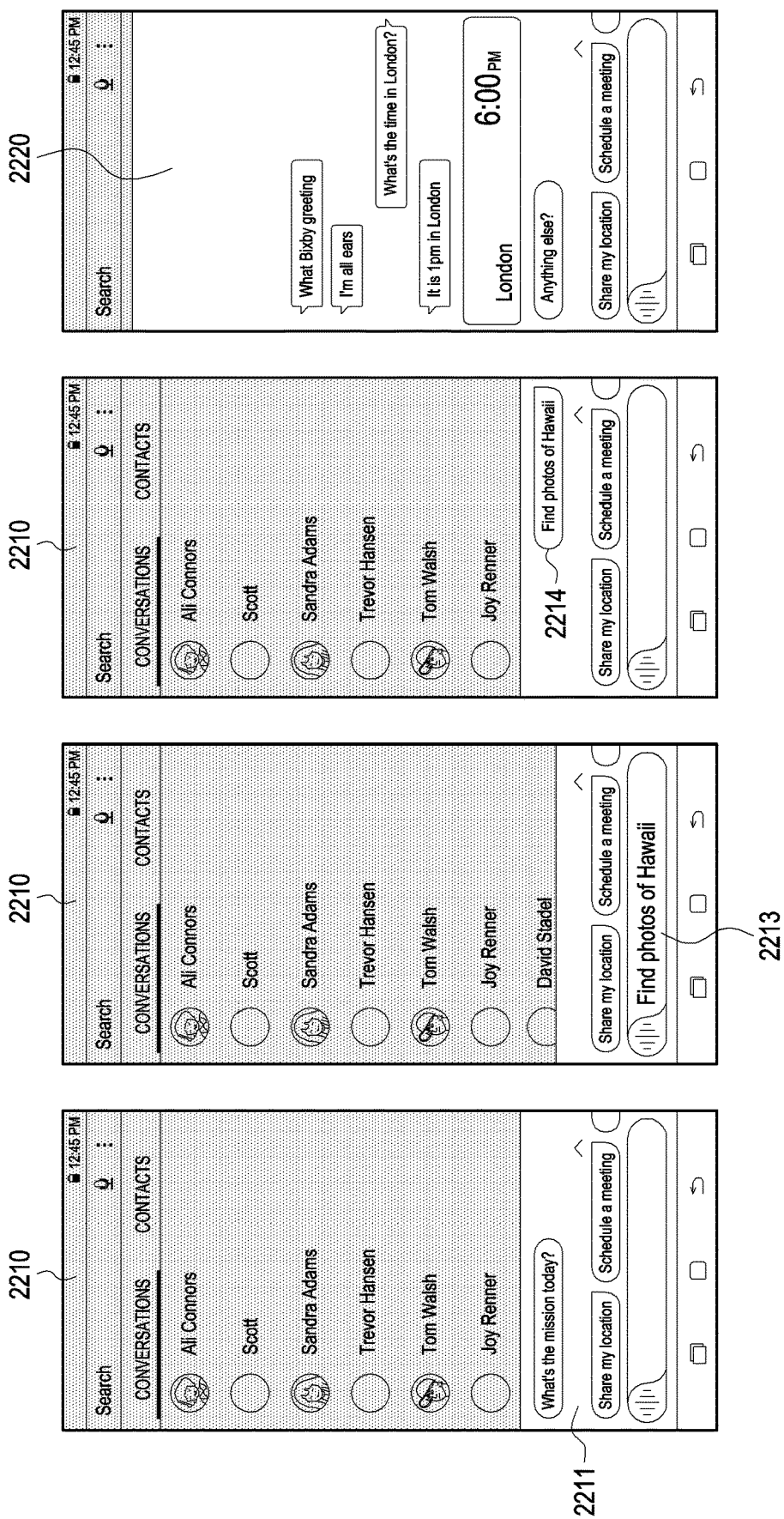
FIG. 22 is a concept view illustrating screens of an electronic device in a command mode according to various embodiments of the present invention.

FIG. 22 is a concept view illustrating screens of an electronic device in a command mode according to various embodiments of the present invention.

According to various embodiments of the present invention, the electronic device 101 may execute a speech processing application while executing any application. As shown in FIG. 22, upon detecting a wake-up command while displaying the execution screen 2210 of any application, the electronic device 101 may execute the speech processing application and display the execution screen 2211 of the speech processing application on at least a portion of the display. According to various embodiments of the present invention, the electronic device 101 may darken the execution screen 2210 of the application which is being displayed. For example, upon detecting a press-and-hold of a hardware button, the electronic device 101 may determine that the user utterance processing mode is the command mode. According to various embodiments of the present invention, the execution screen 2211 of the speech processing application may include a message indicating that voice listening is currently in progress or an indicator to indicate listening. According to various embodiments of the present invention, the electronic device 101 may operate the indicator as a speech recognition button.

If obtaining a user utterance, the electronic device 101 may send identification information about the command mode and data about the user utterance to the external server. For example, if the press-and-hold of the hardware button is released, the electronic device may correspondingly send the identification information about the command mode and the data about the user utterance to the external server. According to various embodiments of the present invention, the electronic device 101 may receive at least one of a command or a text from the external server and may perform the received command while displaying the text 2213. For example, the electronic device 101 may perform a search task for photos taken in Hawaii while displaying the text 2213 "Find Photos of Hawaii" which corresponds to the user utterance. The electronic device 101 may display a recognition result text 2214 per speech recognition unit (e.g., in each unit recognized according to the EPD time). According to various embodiments of the present invention, the electronic device 101 may display the speech recognition result and the result of performing the task through a dialog window 2220 configured as if messages have been transmitted and received. The dialog window 2220 may include the results in the form of a widget.

Figure 23A:
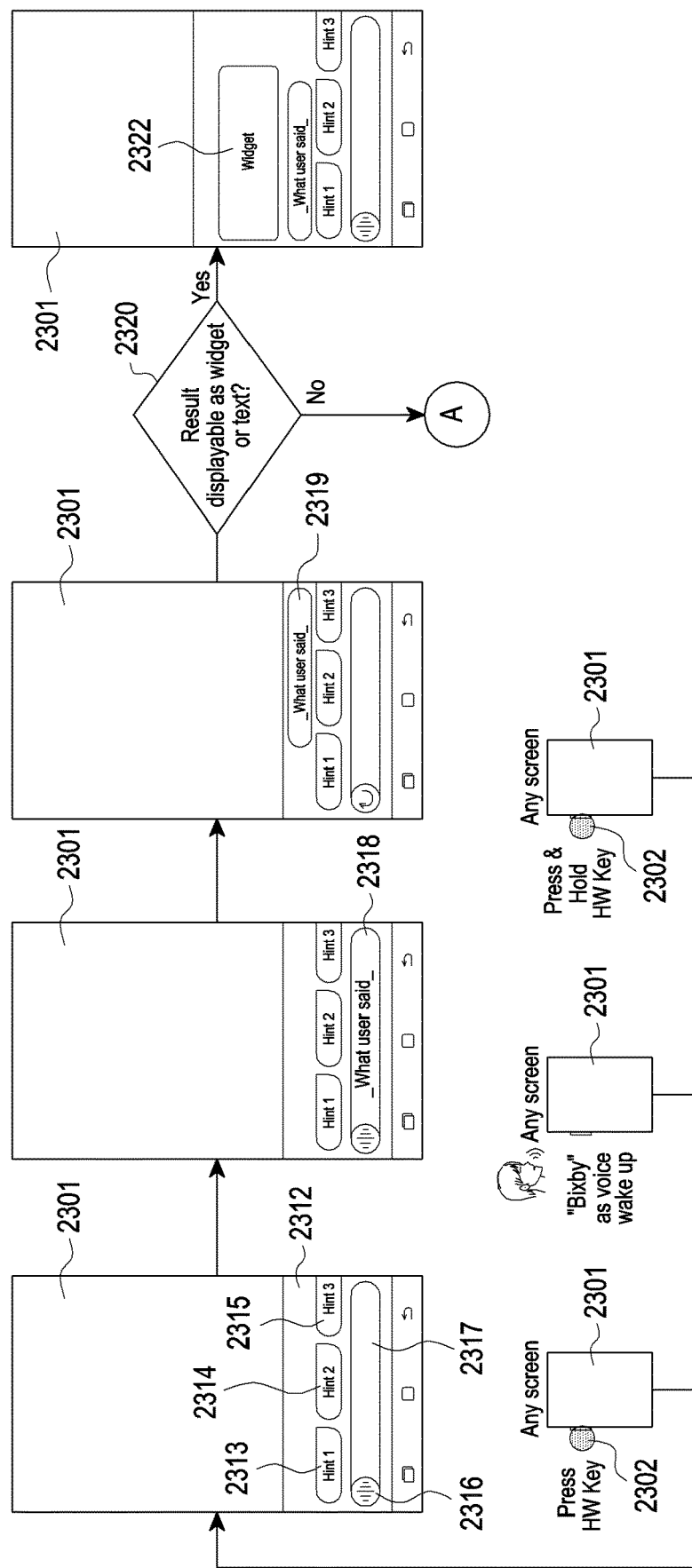
FIGS. 23A and 23B are concept views illustrating a standby screen switch according to various embodiments of the present invention.
Figure 23B:
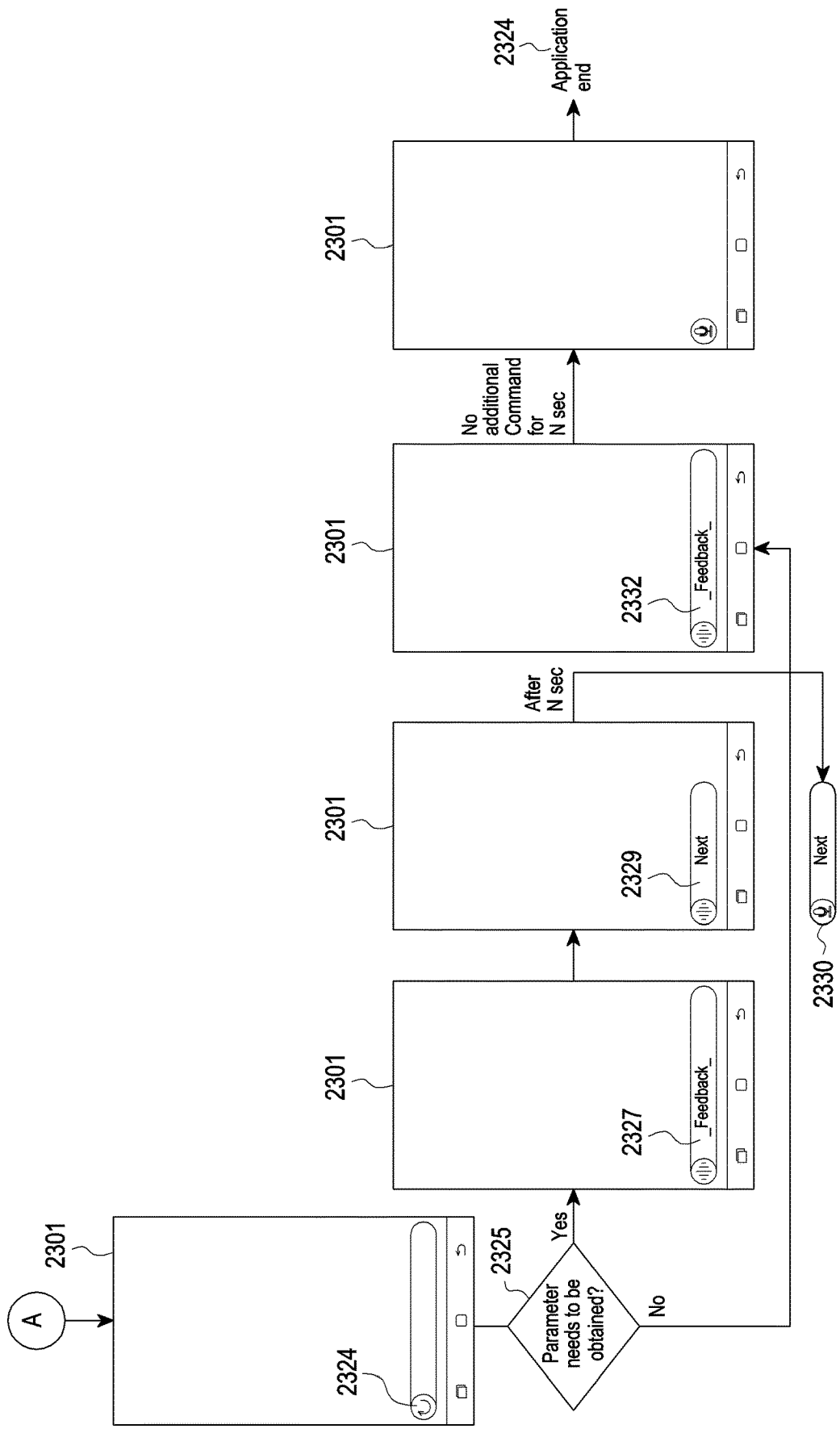

FIGS. 23A and 23B are concept views illustrating a standby screen switch according to various embodiments of the present invention.

Referring to FIG. 23A, according to various embodiments of the present invention, the electronic device 101 may display any screen 2301. Upon detecting a press on the hardware button 2302 or a press-and-hold on the hardware button 2302, the electronic device 101 may execute a speech processing application. Upon obtaining a voice command, e.g., "Bixby," the electronic device 101 may execute the speech processing application. The electronic device 101 may display an execution screen 2312 of the speech processing application on any screen 2301. The execution screen 2312 of the speech processing application may include a plurality of hints 2313, 2314, and 2315, an indicator 2316 to indicate listening, and a text input window 2317. According to various embodiments of the present invention, the electronic device 101 may operate the indicator 2316 with a speech recognition button. The text input window 2317 may display a text 2318 corresponding to the user utterance. The electronic device 101 may display the text 2319 in the form of a balloon popup. The electronic device 101 (e.g., the processor 120 or 210) may determine whether the processing result may be displayed as a widget or text in operation 2320. Upon determining that it is possible, the electronic device 101 may display the processing result in the form of a widget 2322. Upon determining that display is impossible, the electronic device 101 may display an indicator 2324 to indicate processing as shown in FIG. 28B. In operation 2325, the electronic device 101 (e.g., the processor 120 or 210) may determine whether parameters (e.g., slots) are required. For example, there may be parameters corresponding to the intent in the action sequence, but no parameters may be set corresponding to some intent in which case the electronic device 101 need obtain additional parameters to additionally perform the task. In a case where parameters need to be obtained, the electronic device 101 (e.g., the processor 120 or 210) may display, e.g., a feedback result 2327 indicating that parameters need to be obtained in operation 2327. Thereafter, the electronic device 101 may obtain and display a next user utterance 2329 and, after a preset time (e.g., N sec), display the microphone activation button 2330 and perform an operation corresponding to, e.g., the user utterance additionally entered. In a case where no parameter needs to be obtained, the electronic device 101 (e.g., the processor 120 or 210) may display the feedback result 2332 and, if no additional command is made within a preset time (e.g., N sec), stop displaying the speech processing application screen and terminate the speech processing application in operation 2423.

Figure 24:
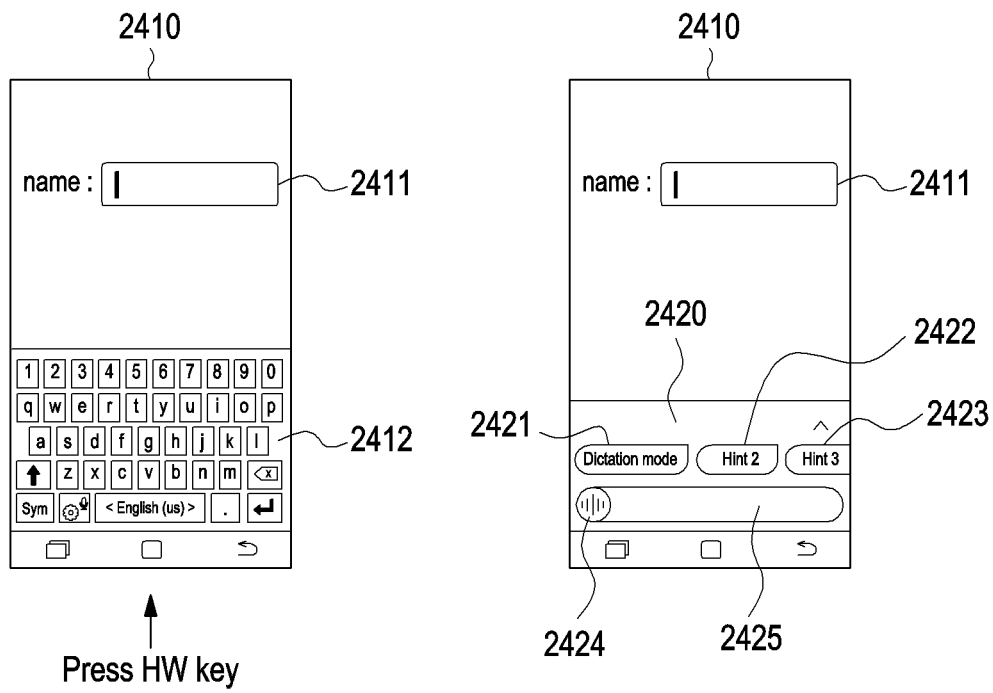
FIG. 24 illustrates screens to describe entry into a command mode according to various embodiments of the present invention.

FIG. 24 illustrates screens to describe entry into a command mode according to various embodiments of the present invention.

According to various embodiments of the present invention, the electronic device 101 may display a screen 2410 including a text box 2411 and a keyboard 2412 for text entry. In this case, upon detecting a pressing of a hardware button or a wake-up voice command such as "Bixby," the electronic device 101 may enter not into the dictation mode but into the command mode. In this case, the electronic device 101 may include a speech processing application execution screen 2420. The speech processing application execution screen 2420 may include a plurality of hints 2421, 2422, and 2423 (e.g., a mode switch hint 2421), an indicator 2424 to indicate listening, and a window 2425 to display text. According to various embodiments of the present invention, the electronic device 101 may operate the indicator 2424 with a speech recognition button.

Figure 25:
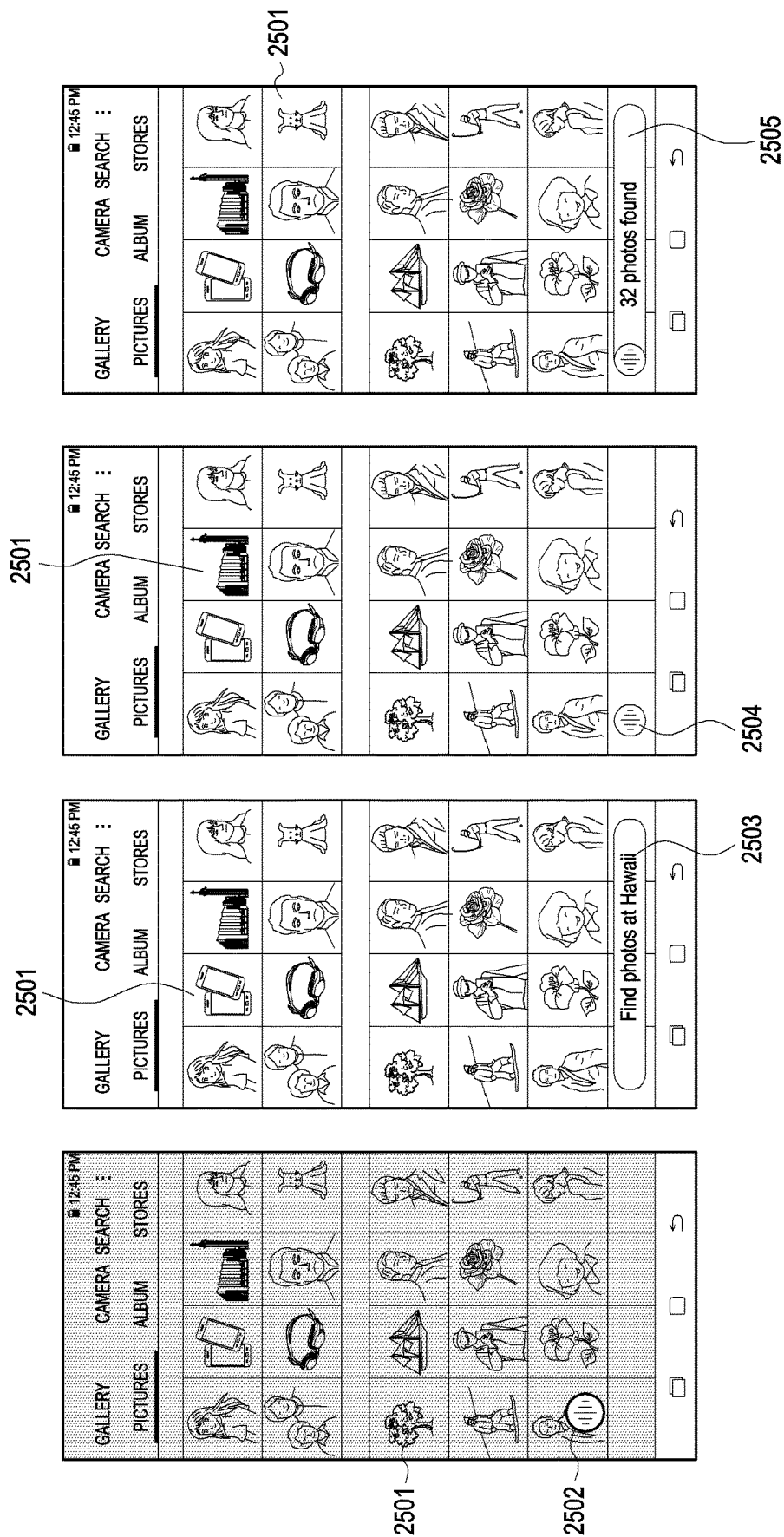
FIG. 25 is a concept view illustrating screens in a continuous command mode according to various embodiments of the present invention.

FIG. 25 is a concept view illustrating screens in a continuous command mode according to various embodiments of the present invention.

According to various embodiments of the present invention, if entering into the continuous command mode, the electronic device 101 may display an indicator 2502 to indicate listening on any application execution screen 2501. According to various embodiments of the present invention, the electronic device 101 may operate the indicator 2502 with a speech recognition button. The electronic device 101 may send identification information about the continuous command mode and the received data about the user utterance to the external server. For example, the electronic device 101 may send the units of the user utterance to an external server via EDP recognition. The external server may apply ASR and NLU to the data about the user utterance and generate a command. For example, the electronic device 101 may display the indicator to indicate processing until a processing result is received from the external server. After receiving a command from the external server and performing the task, the electronic device 101 may display the command or text 2503. Thereafter, the electronic device 101 may display an indicator 2504 to indicate listening. According to various embodiments of the present invention, the electronic device 101 may operate the indicator 2504 with a speech recognition button. The electronic device may additionally obtain a user utterance and receive, from the external server, a command or text corresponding thereto and display the received text or command 2505. If a continuous command mode termination event is detected, e.g., if the voice command "command mode off" is obtained, the electronic device 101 may terminate the continuous command mode. The electronic device 101 may stop displaying the speech recognition application execution screen and display the prior screen.

Figure 26:
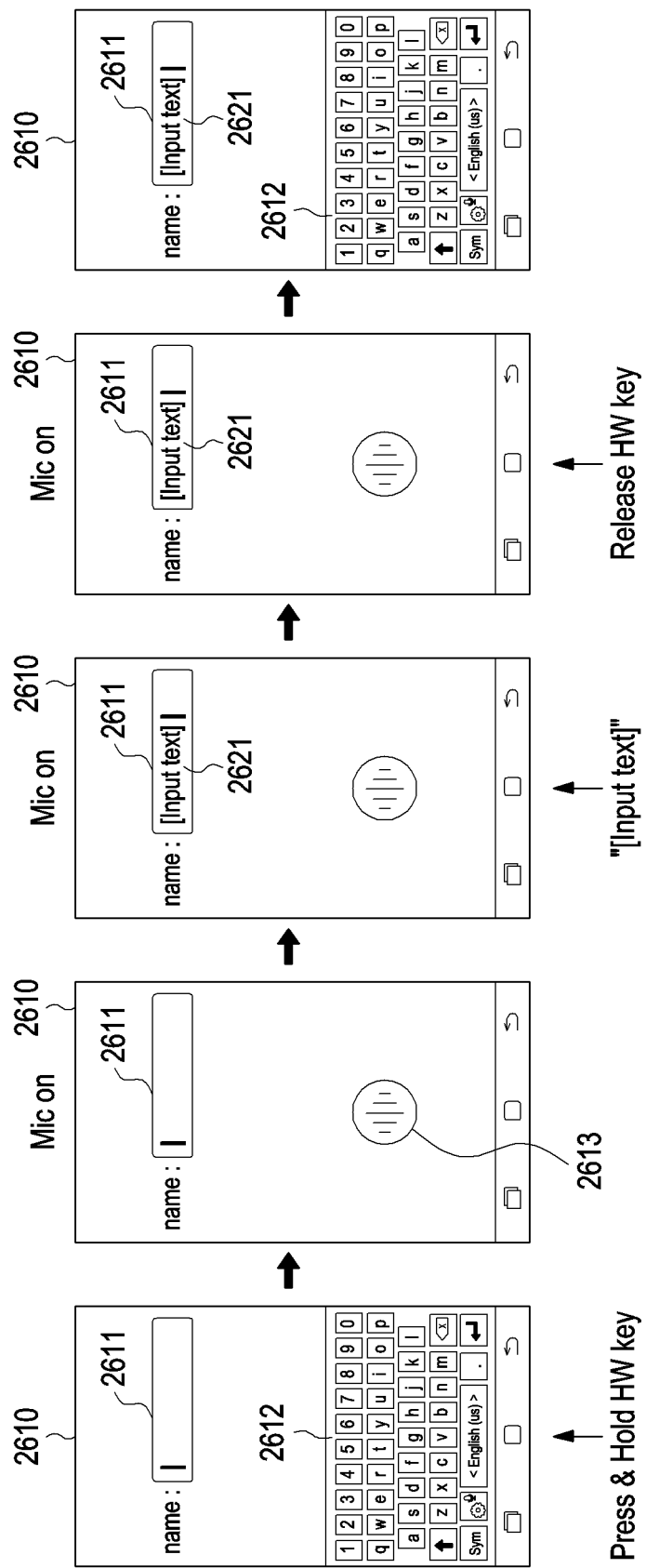
FIG. 26 illustrates screens to describe entry into a dictation mode according to various embodiments of the present invention.

FIG. 26 illustrates screens to describe entry into a dictation mode according to various embodiments of the present invention.

According to various embodiments of the present invention, the electronic device 101 may display a screen 2610 including a text box 2611 and a keyboard 2612. The electronic device 101 may detect a press-and-hold of a hardware button while the text box 2611 or the keyboard 2612 is displayed. The electronic device 101 may enter into the dictation mode and display an indicator 2613 to indicate listening. According to various embodiments of the present invention, the electronic device 101 may operate the indicator 2613 with a speech recognition button. The electronic device 101 may obtain a user utterance and send identification information about the dictation mode and data about the user utterance to the external server. The external server may apply ASR to the data about the user utterance based on the identification information about the dictation mode and send an obtained text to the electronic device 101. The electronic device 101 may enter the received text 2621 to the text box 2611 and display the same. The electronic device 101 may detect a releasing of the hardware button (release HW key) and may correspondingly display the keyboard 2612 again.

Figure 27:
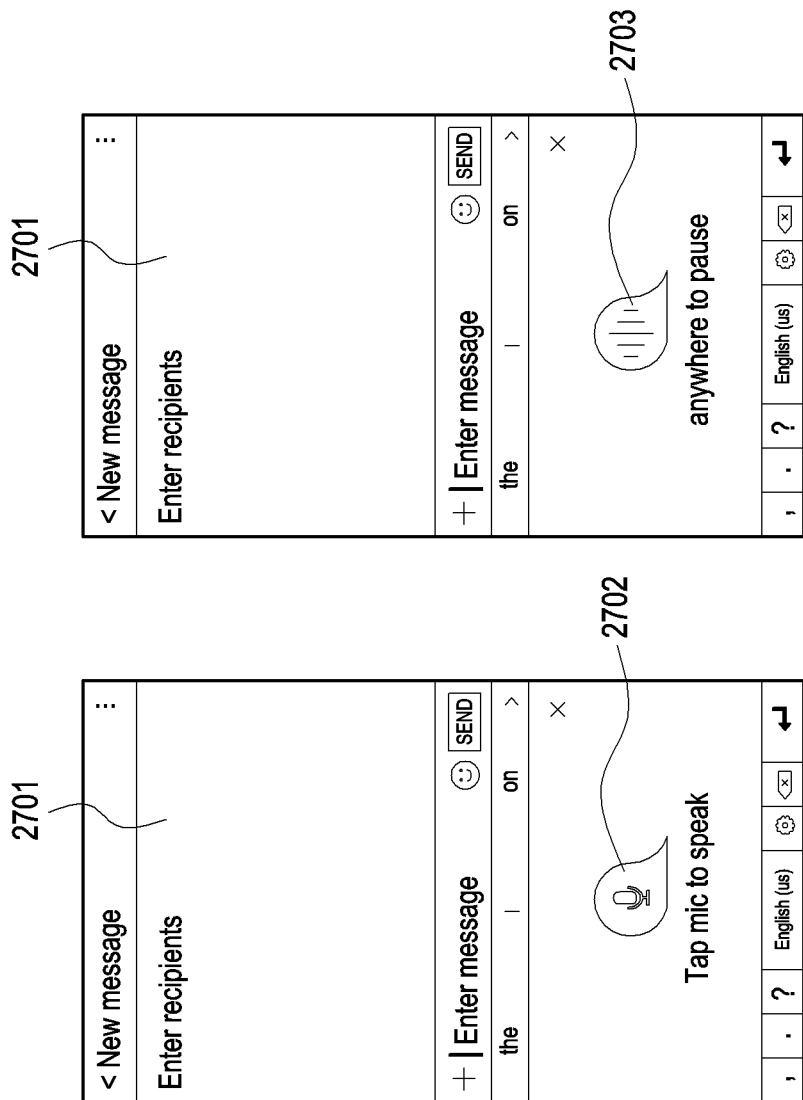
FIG. 27 illustrates screens to describe entry into a dictation mode according to various embodiments of the present invention.

FIG. 27 illustrates screens to describe entry into a dictation mode according to various embodiments of the present invention.

According to various embodiments of the present invention, the electronic device 101 may display a message application execution screen 2701. The electronic device 101 may execute a speech recognition application and display the microphone activation button 2702 while the press-and-hold of the hardware key is maintained. According to another embodiment, if the microphone activation button 2702 is additionally designated, the electronic device 101 may obtain a user utterance. If a user utterance is entered, the electronic device 101 may send the user utterance to the external server and receive a text corresponding to the user utterance from the external server. The electronic device 101 may display an indicator 2703 to indicate listening and, if the indicator 2703 is designated, speech recognition may be stopped. According to various embodiments of the present invention, the electronic device 101 may operate the indicator 2703 with a speech recognition button. The electronic device 101 may display the received text and, given additional entry, display a cursor behind the displayed text.

Figure 28:
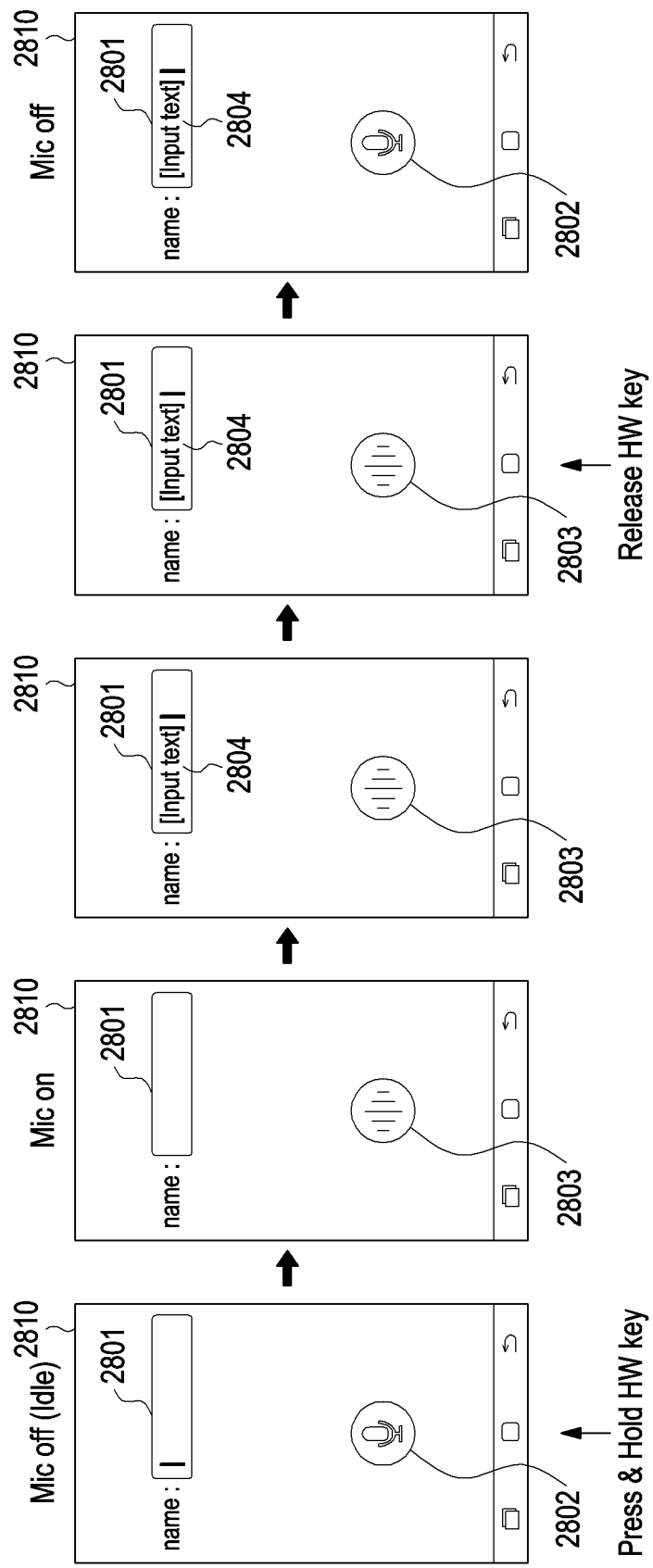
FIG. 28 illustrates screens of an electronic device in a dictation mode according to various embodiments of the present invention.

FIG. 28 illustrates screens of an electronic device in a dictation mode according to various embodiments of the present invention.

According to various embodiments of the present invention, the electronic device 101 may display a screen 2810 including a text box 2801. In this case, the electronic device 101 may keep the microphone in the turned-off state or idle state. The electronic device 101 may display the microphone activation button 2802. Upon detecting a press-and-hold of a hardware button, the electronic device 101 may activate the microphone and display an icon 2803 to indicate that the state is the waiting state. The electronic device 101 may obtain a user utterance through the activated microphone, send data about the user utterance to the external server, and receive a text corresponding thereto. The electronic device 101 may enter the received text 2804 to the text box 2801 and display the same. The electronic device 101 may detect a releasing of the pressed hardware button (release HW key) and may correspondingly turn off the microphone and display the microphone activation icon 2802.

Figure 29A:
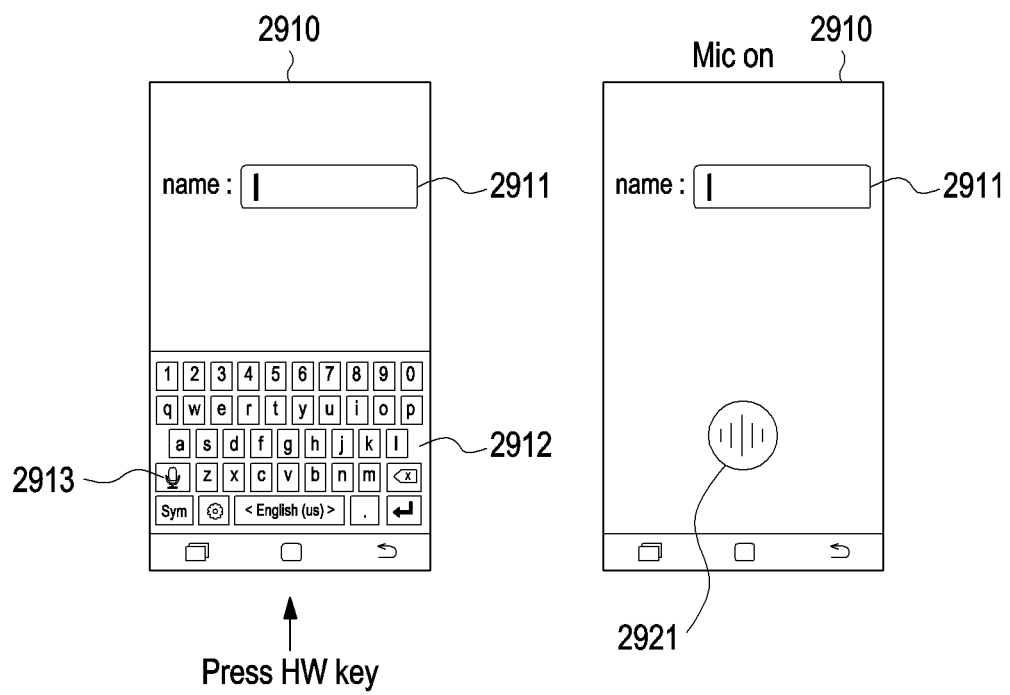
FIG. 29A illustrates screens of an electronic device in a dictation mode according to various embodiments of the present invention.
Figure 29B:
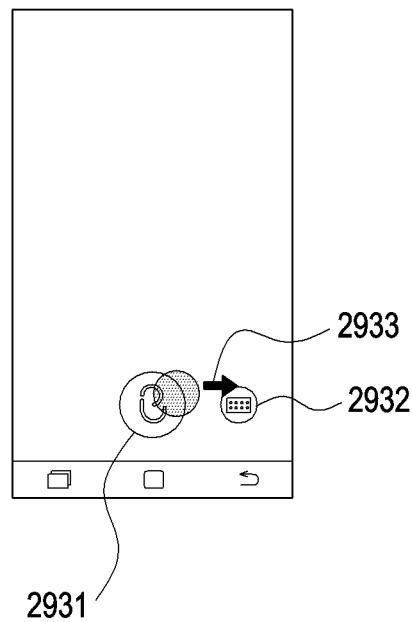
FIG. 29B is a concept view illustrating entry into a dictation mode according to various embodiments of the present invention.

FIGS. 29A and 29B illustrate screens of an electronic device in a dictation mode according to various embodiments of the present invention.

Referring to FIG. 29A, according to various embodiments of the present invention, the electronic device 101 may display a screen 2910 including a text box 2911 and a keyboard 2912. In the electronic device 101, the keyboard 2912 may include the microphone activation icon 2913. If the microphone activation icon 2913 is designated, the electronic device 101 may activate the microphone and wait to obtain a user utterance. The electronic device may display an icon 2921 to indicate listening and operate in the dictation mode.

Referring to FIG. 29B, according to various embodiments of the present invention, the electronic device 101 may display a first icon 2931 which may be floated by press-and-drag 2933 and a second icon 2932 to release drag-and-drop. If a designation (i.e., pressing) of the first icon 2931 is detected and then a drag is detected, the electronic device 101 may reposition the first icon 2931 according to the position of the drag and display the same. If the drag is released on the second icon 2932, the electronic device 101 may enter into the dictation mode.

Figure 30:
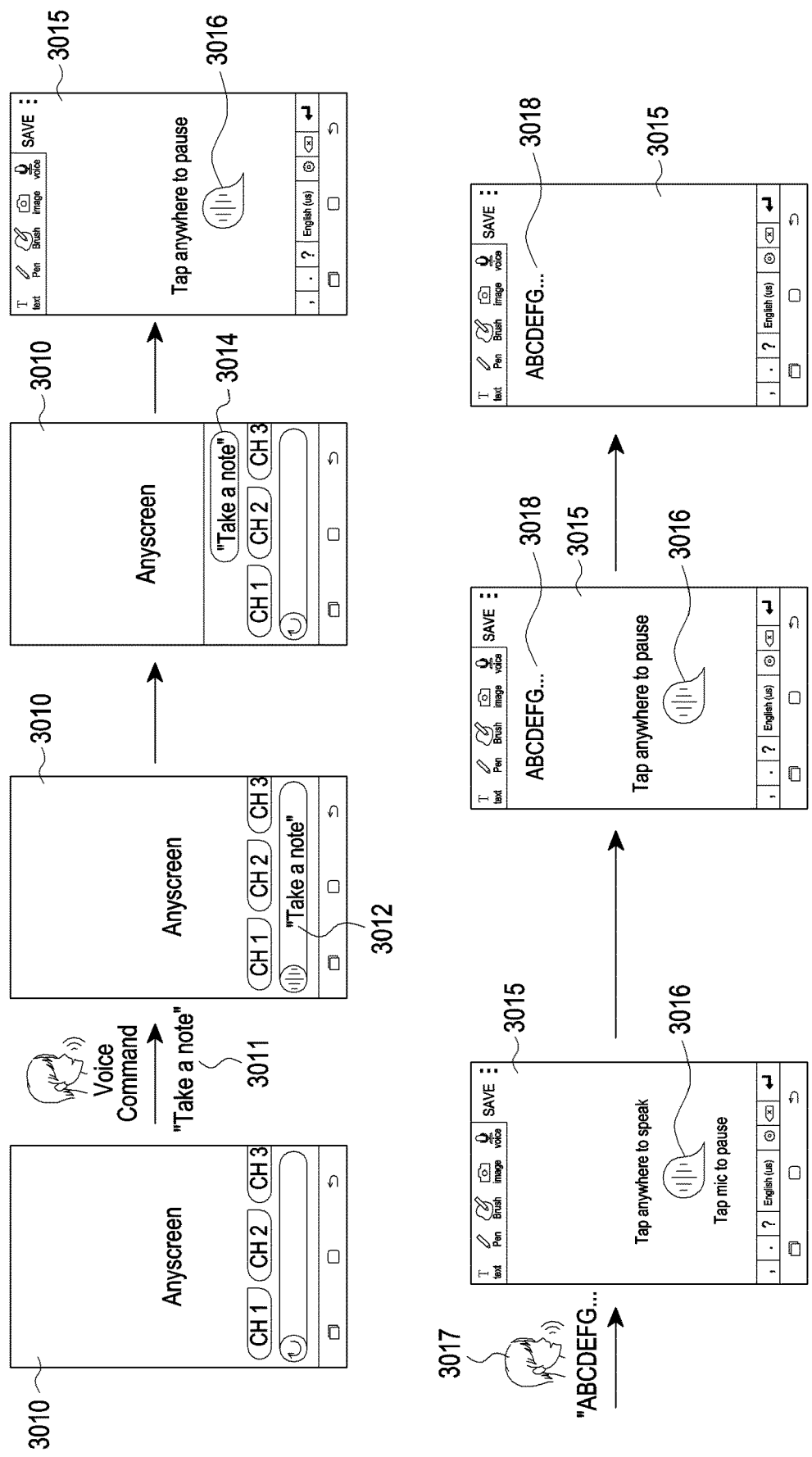
FIG. 30 illustrates screens of an electronic device in a dictation mode according to various embodiments of the present invention.

FIG. 30 illustrates screens of an electronic device in a dictation mode according to various embodiments of the present invention.

According to various embodiments of the present invention, the electronic device 101 may display any screen 3010. The electronic device 101 may obtain the user utterance 3011 "Take a note" from the user. The electronic device 101 may initially operate in the command mode. The electronic device 101 may send data about the received user utterance to the external server, receive a command corresponding thereto, and display a text 3012 associated with the received command on the screen. The electronic device 101 may display the received text 3014 in the form of a balloon popup window. The electronic device 101 may perform the received command. For example, the electronic device 101 may change the user utterance processing mode into the dictation mode. Accordingly, the electronic device 101 may display a screen 3015 corresponding to the dictation mode. The screen 3015 corresponding to the dictation mode may include an indicator 3016 to indicate waiting for voice input, i.e., listening. According to various embodiments of the present invention, the electronic device 101 may operate the indicator 3016 with a speech recognition button. The electronic device 101 may obtain a user utterance 3017 in the dictation mode. The electronic device 101 may send identification information about the dictation mode and data about the received user utterance to the external server. The electronic device 101 may receive a text corresponding to the user utterance from the external server and display the received text 3018 on at least a portion of the screen 3015. According to various embodiments of the present invention, if the indicator 3016 is designated, the electronic device 101 may turn off, e.g., the microphone, stop awaiting speech recognition, and accordingly stop displaying the indicator 3016 indicating listening.

Figure 31A:
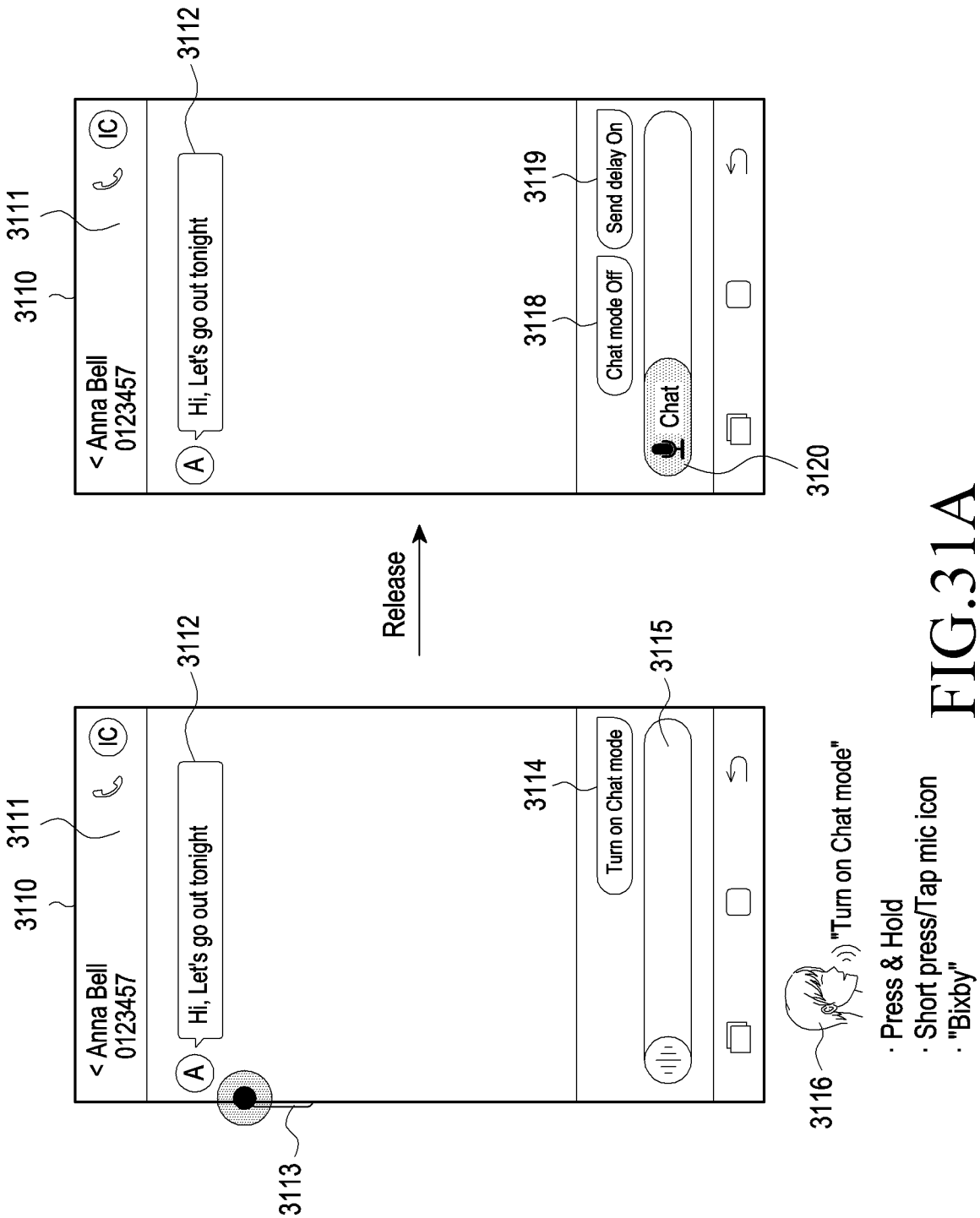
FIGS. 31A and 31B are concept views illustrating screens of a dialog mode according to various embodiments of the present invention.
Figure 31B:
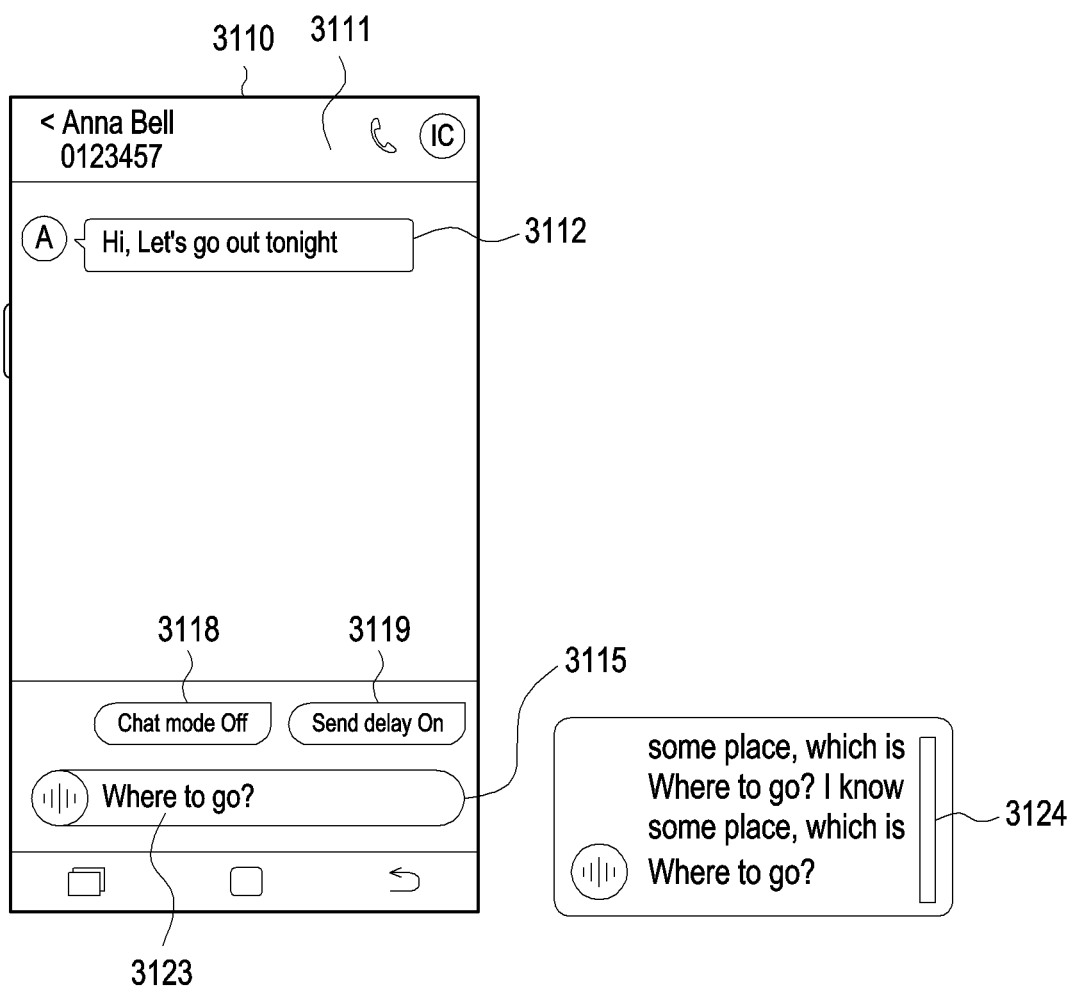

FIGS. 31A and 31B are concept views illustrating screens of a dialog mode according to various embodiments of the present invention.

Referring to FIG. 31A, according to various embodiments of the present invention, the electronic device 101 may display a message application execution screen 3010. The message application execution screen 3110 may include the other party 3111 to the dialog and messages 3112 transmitted and received with the other party. Upon detecting a press-and-hold of the hardware button 3113, a short press, a designation of the microphone activation button (Tap mic icon), or a voice command (e.g., "Bixby"), the electronic device 101 may enter first into the command mode. Then, if a designated voice 3116 for entry into the dialog mode, such as "Turn on Chat mode," is entered, the electronic device 101 may enter into the dialog mode. Or, if a designation of the dialog mode entry icon 3114 which is one of the hints is detected, the electronic device 101 may enter into the dialog mode. The electronic device 101 may display a window 3115 to display text. For example, if the hardware button 3113 which used to be in the press-and-hold state is released from being pressed, the electronic device 101 may enter into the dialog mode. If entering into the dialog mode, the electronic device 101 may display, e.g., the dialog mode termination icon 3118 or delayed message transmission activation icon 3119 which is one of the hints. Further, the electronic device 101 may display an indicator to indicate the dialog mode. Referring to FIG. 31B, the electronic device 101 may enter the text 3123 received from the external server according to the dialog mode to the window 3115 and automatically send the entered text. According to various embodiments of the present invention, the electronic device 101 may change the display of the message type, such as SMS/MMS, depending on the length of the entered text and display the same, and the electronic device 101 may further display, e.g., a scroll bar 3124. If a command to manipulate the scroll bar 3124 is received, the electronic device 101 may scroll and display the text.

Figure 32:
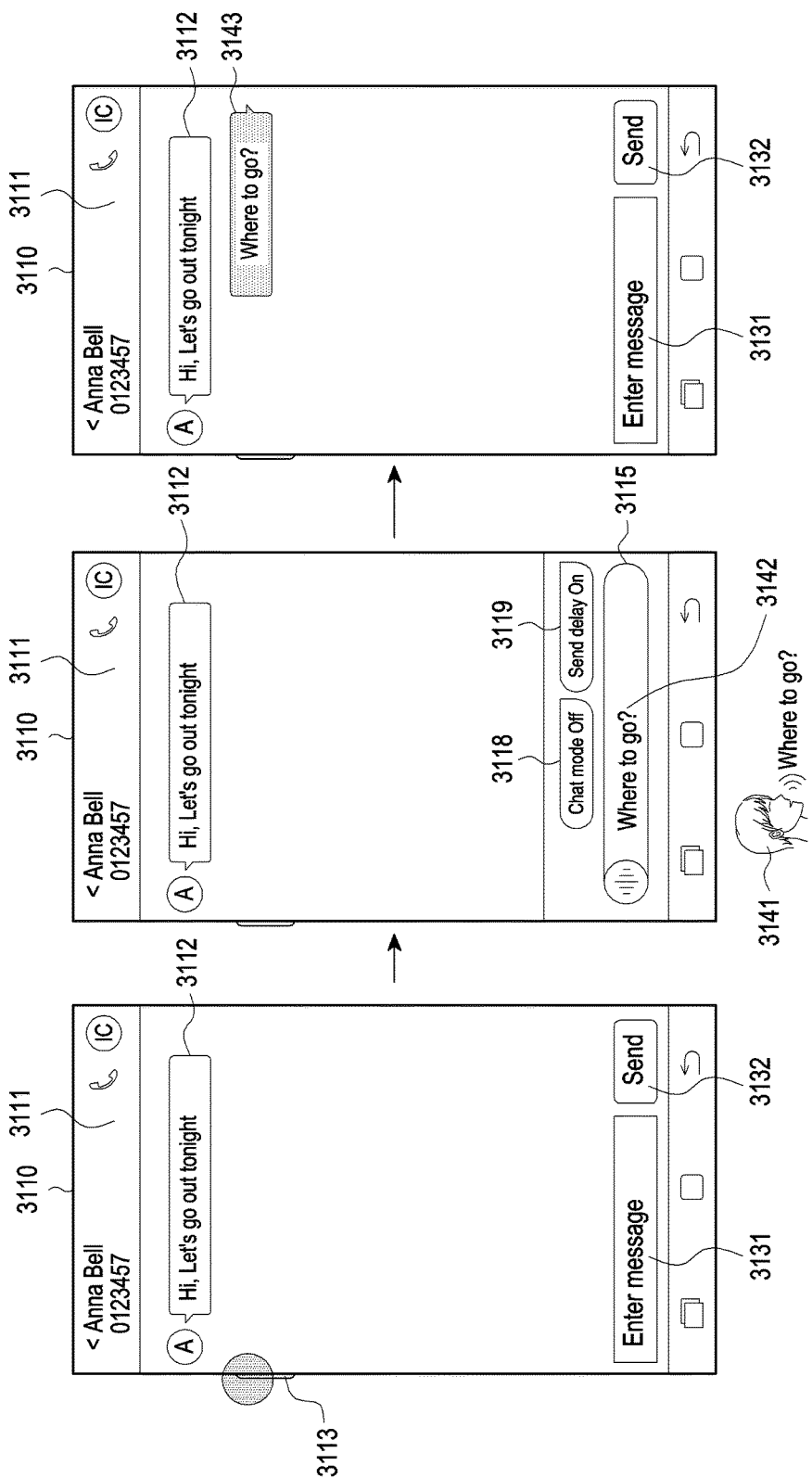
FIGS. 32 and 33 illustrate screens to describe entry into a dialog mode according to various embodiments of the present invention.
Figure 33:
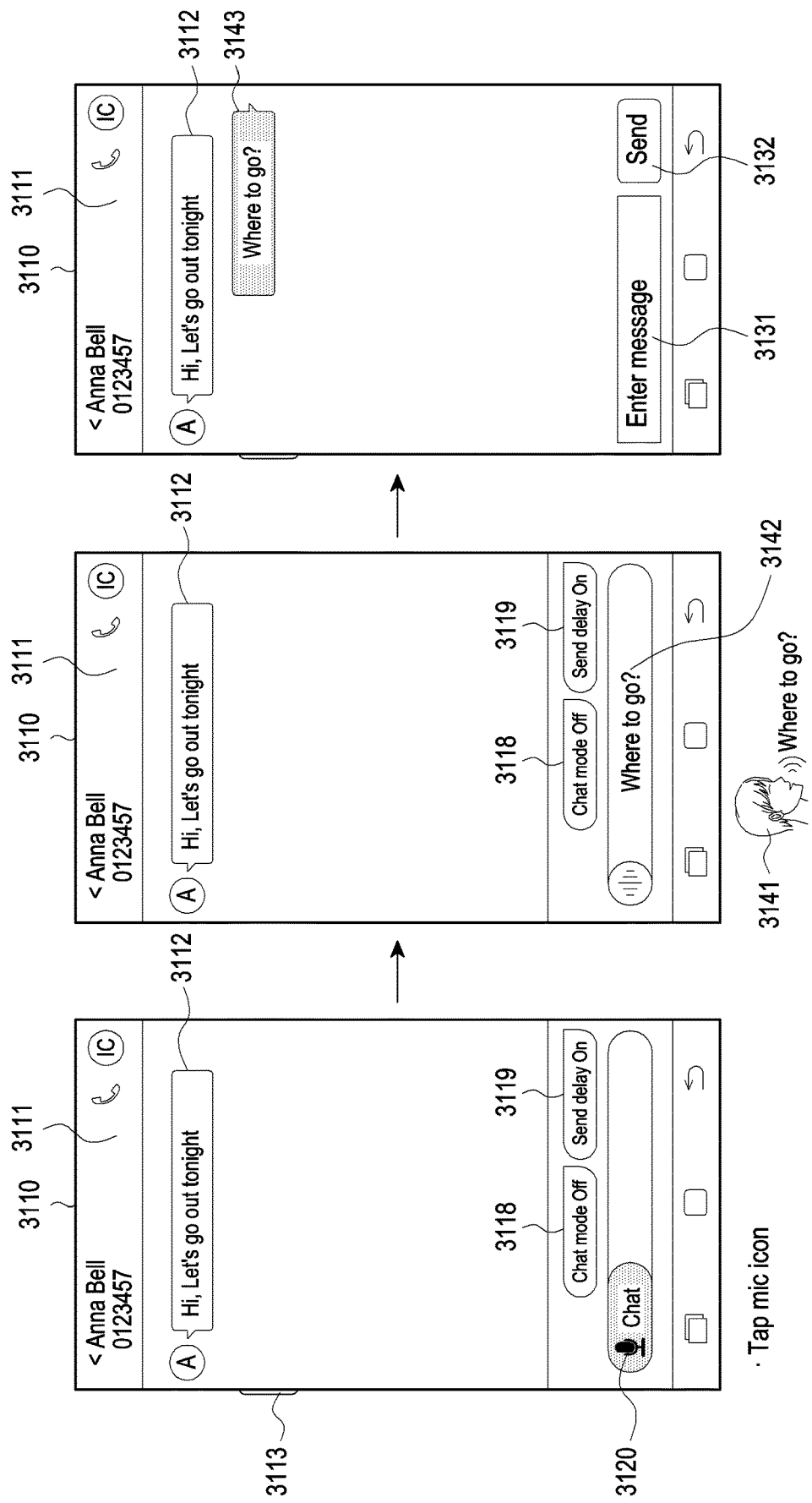

FIGS. 32 and 33 illustrate screens to describe entry into a dialog mode according to various embodiments of the present invention.

As shown in FIG. 32, according to various embodiments of the present invention, the electronic device 101 may display an execution screen 3110 of the message application and display a message input window 3131 and a send button 3132. According to various embodiments of the present invention, the electronic device 101 may immediately enter into the dialog mode in response to a pressing of the hardware button 3113. After entering into the dialog mode, the electronic device 101 may obtain a user utterance 3141, send data about the received user utterance to the external server, and receive a text corresponding to the user utterance from the external server. The electronic device 101 may display the text 3142 corresponding to the received user utterance on the window 3115. The electronic device 101 may automatically send the received text to another electronic device which gains access at the account of the other party to the dialog and display the transmitted message 3143 in the form of a balloon popup. According to another embodiment, if a software key, such as an indicator 3120 to indicate the dialog mode is designated as shown in FIG. 33, the electronic device 101 may enter into the dialog mode. According to another embodiment, the electronic device 101 may activate the dialog mode in the speech recognition application settings in which case if the same interaction as entry into the command mode is detected, the electronic device 101 may enter into the dialog mode.

Figure 34:
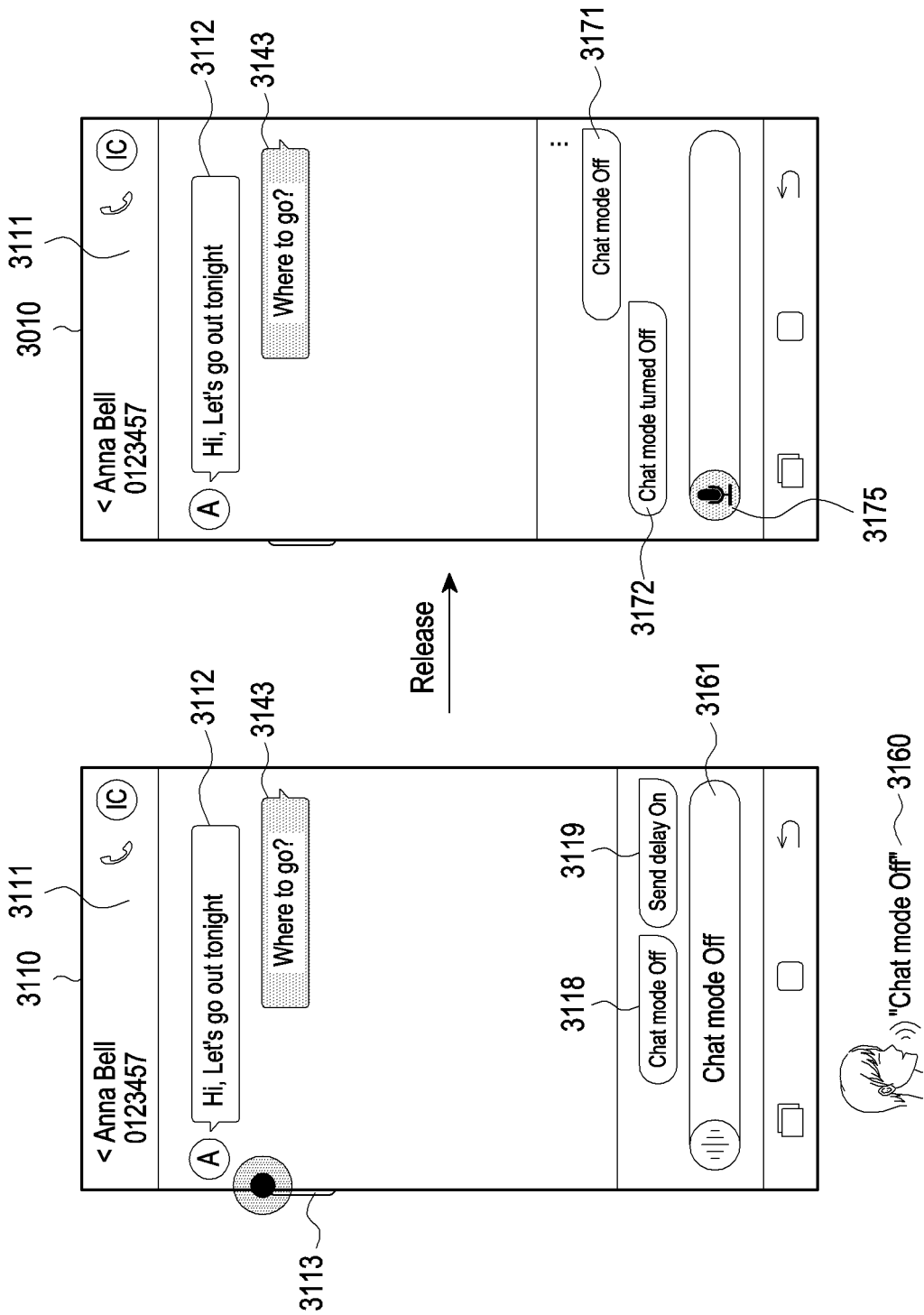
FIG. 34 illustrates screens to describe termination of a dialog mode according to various embodiments of the present invention.

FIG. 34 illustrates screens to describe termination of a dialog mode according to various embodiments of the present invention.

According to various embodiments of the present invention, the electronic device 101 may obtain a user utterance 3160 with the hardware button 3113 pressed. The electronic device 101 may send data about the obtained user utterance to the external server and receive and display a text 3161 corresponding thereto. In a case where a text designated to terminate the dialog mode, such as "Chat mode Off," is received, the electronic device 101 may terminate the dialog mode corresponding to releasing the press of the hardware button 3113. The electronic device 101 may display the microphone activation button 3175. The electronic device 101 may display the tasks performed for the dialog mode termination 3172 and the dialog mode termination command 3171 in the form of a balloon popup.

Figure 35:
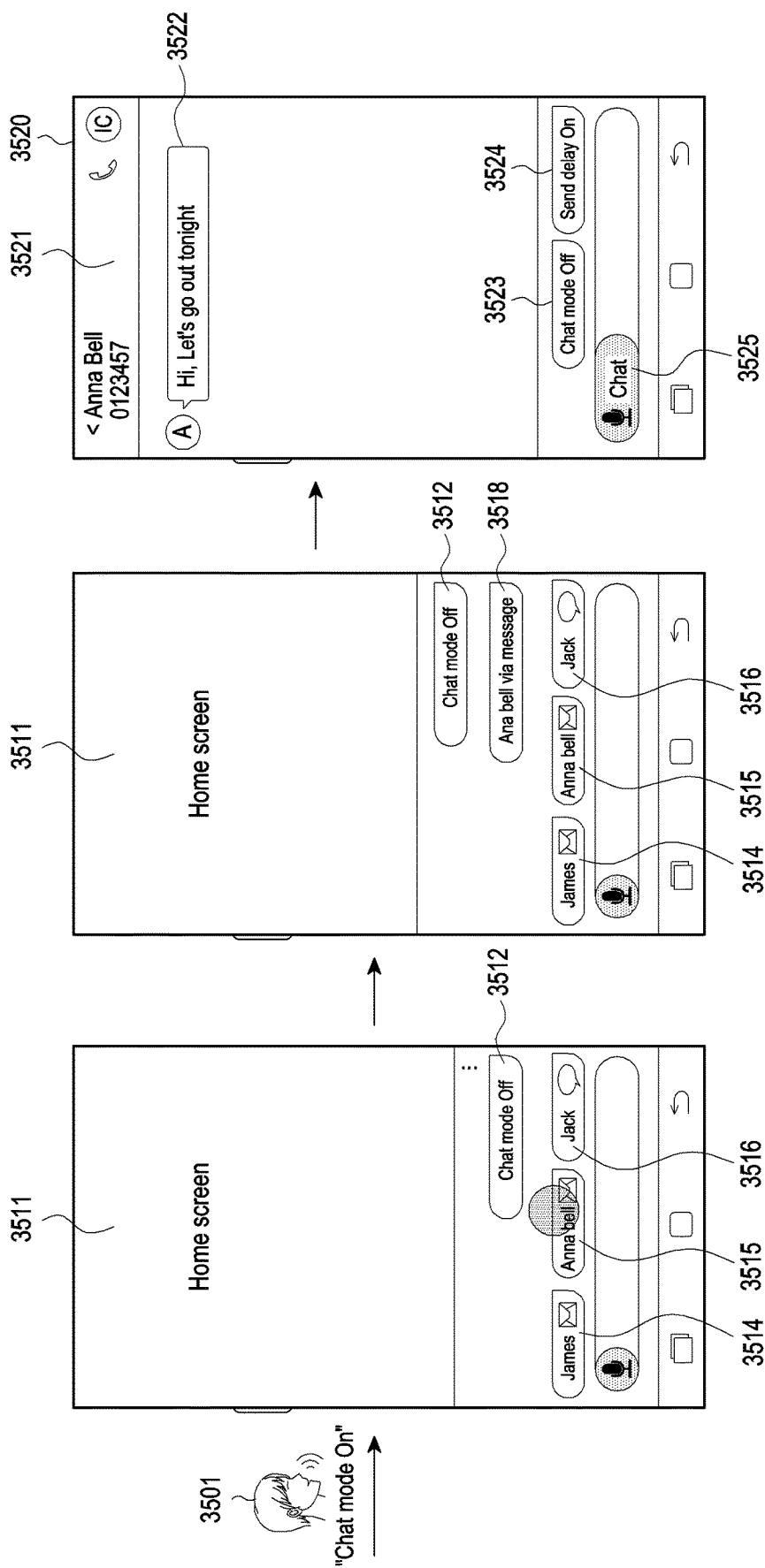
FIG. 35 illustrates screens to describe entry into a dialog mode according to various embodiments of the present invention.

FIG. 35 illustrates screens to describe entry into a dialog mode according to various embodiments of the present invention.

According to various embodiments of the present invention, the electronic device 101 may display an execution screen of a launcher application, such as a home screen 3511, but not the message application. The electronic device 101 may obtain the voice command 3501 "Chat mode on" while displaying the home screen 3511 and, corresponding thereto, enter into the dialog mode. The electronic device 101 may display the dialog mode termination icon 3512 and icons 3514, 3515, and 3515 for the contacts recently reached. According to various embodiments of the present invention, the electronic device 101 may display the application which has performed contact along with the contacts reached. For example, the electronic device 101 may display an icon 3514 indicating that the message application has been used to contact James and an icon 3516 indicating that the messenger application has been used to contact Jack. The electronic device 101 may operate in the dialog mode while executing the application (e.g., the message application) corresponding to the designated icon (e.g., 3515). The electronic device 101 may display the performed task 3518 in the form of a balloon popup. The electronic device 101 may display a message application execution screen 3520. The message application execution screen 3520 may include the other party 3521 to the dialog corresponding to the designated icon (e.g., 3515) and the messages 3522 transmitted and received with the other party to the dialog. The electronic device 101 may display the dialog mode termination icon 3523, the delay transmission icon 3524, and the indicator 3525 to indicate the dialog mode on the message application execution screen 3520.

Figure 36:
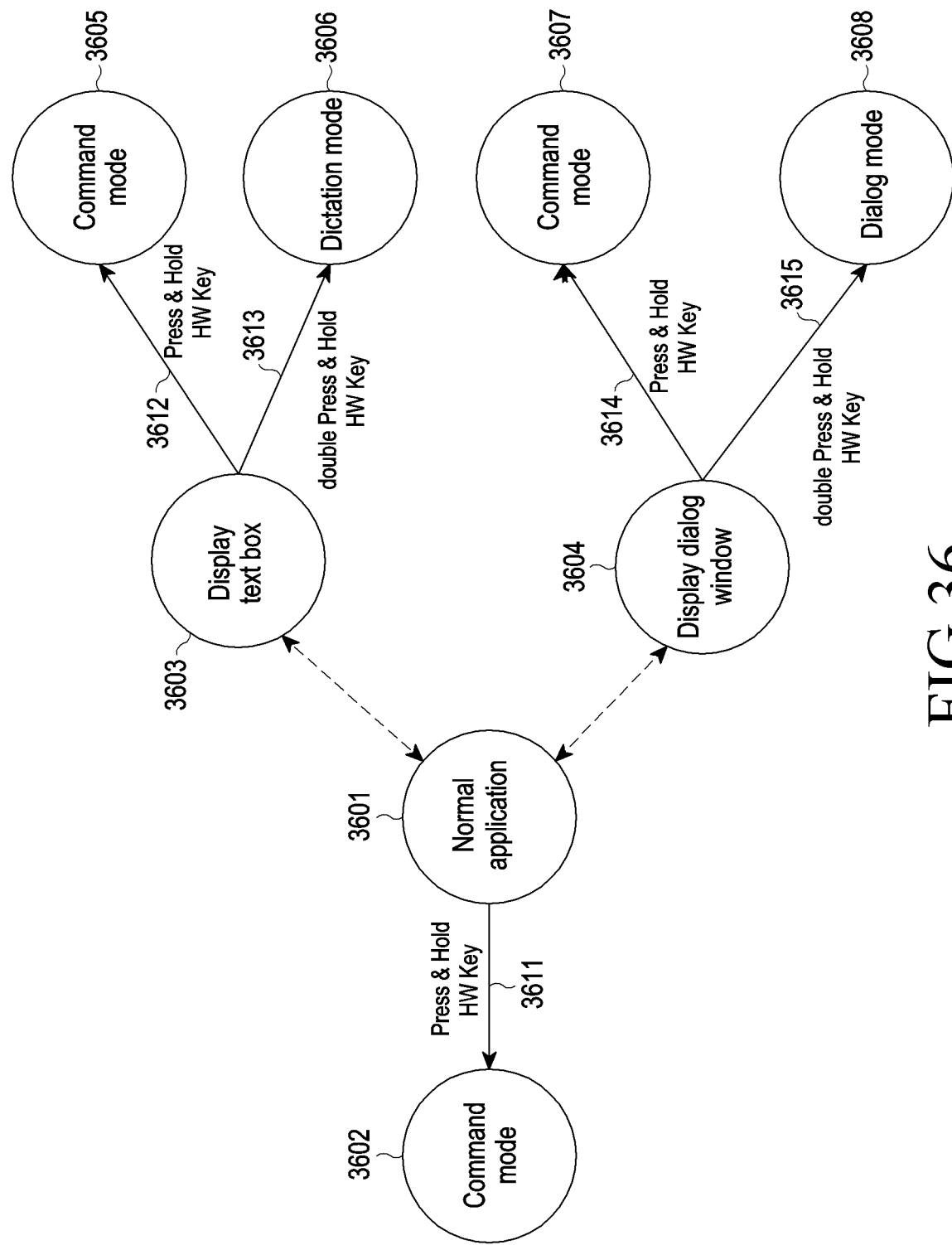
FIG. 36 is a concept view illustrating a user utterance processing mode initial selection or switch of an electronic device according to various embodiments of the present invention.

FIG. 36 is a concept view illustrating a user utterance processing mode initial selection or switch of an electronic device according to various embodiments of the present invention.

According to various embodiments of the present invention, the electronic device 101 may determine that the state of the electronic device 101 is any one of a normal application state 3601, a text box display state 3603, or a dialog window display state 3604. According to various embodiments of the present invention, the electronic device 101 may permit entry into only one user utterance processing mode in a designated state. For example, in the normal application state 3601, the electronic device 101 may allow entry into only one user utterance processing mode (e.g., the command mode 3602) corresponding to a user input (e.g., a press-and-hold 3611 of a hardware button).

According to various embodiments of the present invention, in a state different from the designated state, the electronic device 101 may permit entry into a plurality of user utterance processing modes according to user inputs. For example, in the text box display state 3603, the electronic device 101 may enter into the command mode 3605 corresponding to a first-type user input (e.g., a press-and-hold 3612 of a hardware button). For example, in the text box display state 3603, the electronic device 101 may enter into the dictation mode 3606 corresponding to a second-type user input (e.g., a double press-and-hold 3613 of a hardware button). For example, in the dialog window display state 3604, the electronic device 101 may enter into the command mode 3607 corresponding to a first-type user input (e.g., a press-and-hold 3614 of a hardware button). For example, in the dialog window display state 3604, the electronic device 101 may enter into the dialog mode 3608 corresponding to a second-type user input (e.g., a double press-and-hold 3615 of a hardware button).

Figure 37:
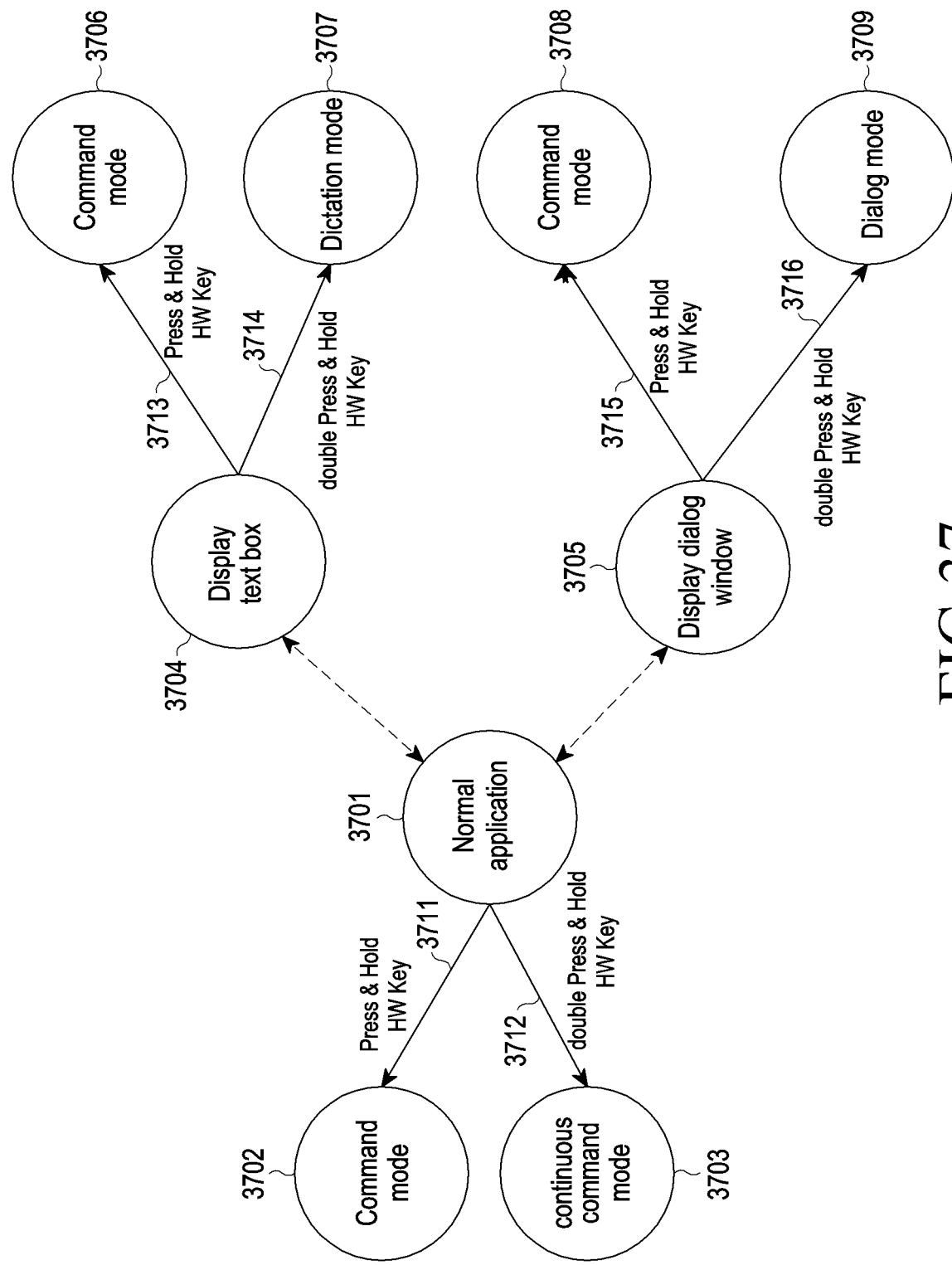
FIG. 37 is a concept view illustrating a user utterance processing mode initial selection or switch of an electronic device according to various embodiments of the present invention.

FIG. 37 is a concept view illustrating a user utterance processing mode initial selection or switch of an electronic device according to various embodiments of the present invention.

According to various embodiments of the present invention, the electronic device 101 may determine that the state of the electronic device 101 is any one of a normal application state 3701, a text box display state 3703, or a dialog window display state 3704. The electronic device 101 may enter into the command mode 3602, 3605, or 3607 corresponding to a first-type user input, e.g., a press-and-hold 3711, 3713, or 3715 of a hardware button. Upon detecting the first-type user input, the electronic device 101 may enter into a fixed, designated, particular user utterance processing mode, e.g., the command mode 3602, 3605, or 3607 regardless of the current state. Upon detecting a second-type user input, e.g., a double press-and-hold 3712, 3714, or 3716 of the hardware button, the electronic device 101 may enter into various user utterance processing modes such as the continuous command mode 3703, dictation mode 3707, or dialog mode 3709 according to the state of the electronic device 101. According to various embodiments of the present invention, a user utterance processing mode to request the external server to do ASR alone but not NLU may be selected corresponding to the second-type user input, e.g., a double press-and-hold 3712, 3714, or 3716 of the hardware button. According to various embodiments of the present invention, upon detecting a double press-and-hold 3712 in the normal application state 3701, the electronic device 101 may enter not into the continuous command mode 3707 but into the memo mode.

Figure 38:
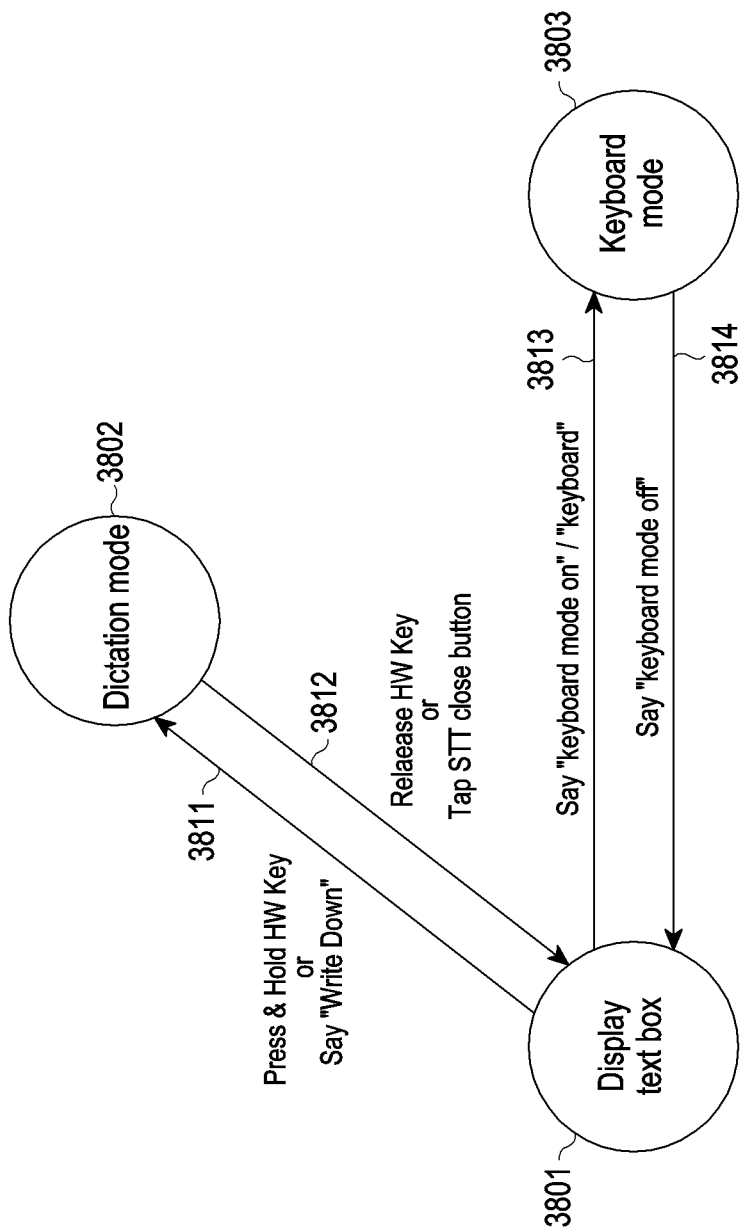
FIG. 38 is a concept view illustrating a user utterance processing mode change of an electronic device according to various embodiments of the present invention.

FIG. 38 is a concept view illustrating a user utterance processing mode change of an electronic device according to various embodiments of the present invention.

According to various embodiments of the present invention, upon detecting a press-and-hold of a hardware button or obtaining a voice command 3811, e.g., "Write Down," in the text box display state 3801, the electronic device 101 may correspondingly enter into the dictation mode 3802. Upon detecting a release of the pressing of the hardware button or a designation 3812 of the STT close button in the dictation mode 3802, the electronic device 101 may go back to the text box display state 3801. Upon obtaining a voice command 3813, such as "keyboard mode on" or "keyboard," in the text box display state 3801, the electronic device 101 may correspondingly enter into the keyboard mode 3803. Upon obtaining a voice command 3814, e.g., "keyboard mode off," in the keyboard mode 3803, the electronic device 101 may return to the text box display state 3801.

Figure 39:
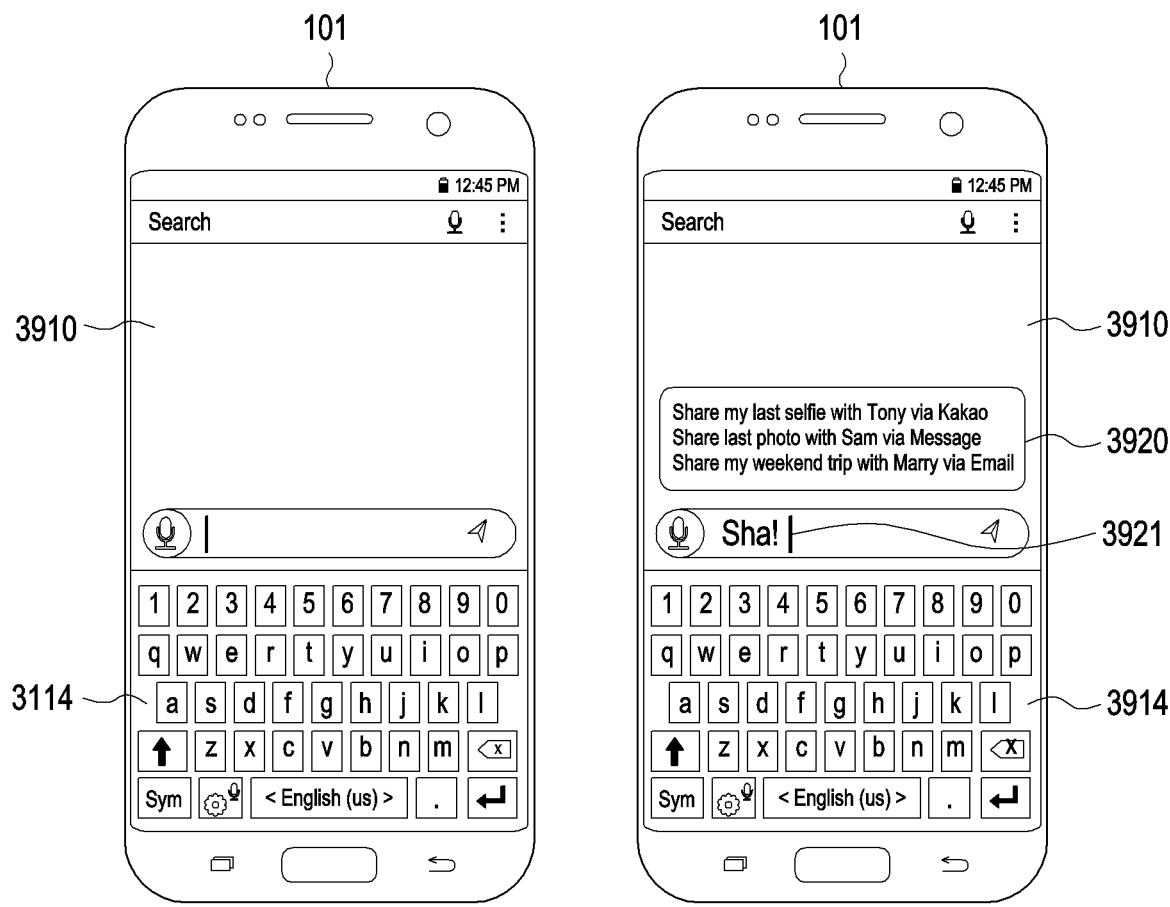
FIG. 39 is a concept view illustrating screens in a keyboard mode according to various embodiments of the present invention.

FIG. 39 is a concept view illustrating screens in a keyboard mode according to various embodiments of the present invention.

According to various embodiments of the present invention, the electronic device 101 may display a screen 3110 including a keyboard 3114. The electronic device 101 may obtain a predesignated voice command (e.g., "keyboard mode on" or "keyboard") with the keyboard 3114 displayed and may correspondingly enter into the keyboard mode.

The electronic device 101 may obtain a user utterance in the keyboard mode and send data about the user utterance to the external server. The external server may obtain a first text which is a result of dictation of a first portion of the received user utterance and a second text which corresponds to the meaning of a second portion of the received user utterance and send them to the electronic device 101. The electronic device 101 may display the received first text and second text 3921 and may thus display the transmitted message 3920 as well. Upon obtaining a designated voice command (e.g., "keyboard mode off"), e.g., as the keyboard mode ends, the electronic device 101 may correspondingly terminate the keyboard mode.

Figure 40:
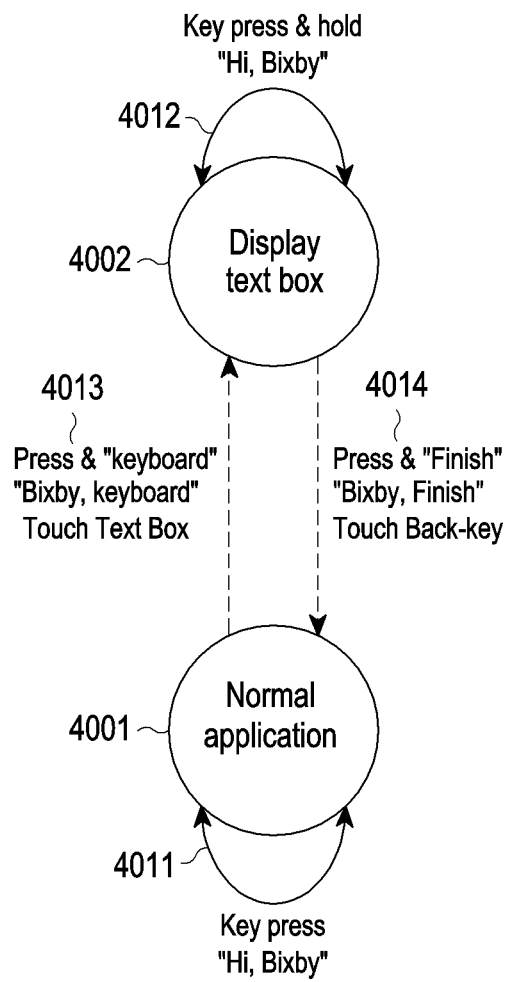
FIG. 40 is a concept view illustrating a switch between states of an electronic device according to various embodiments of the present invention.

FIG. 40 is a concept view illustrating a switch between states of an electronic device according to various embodiments of the present invention.

According to various embodiments of the present invention, the electronic device 101 may switch the state of the electronic device 101 between a text box display state 4002 and a normal application state 4001. For example, upon obtaining a press of a hardware button or a voice command, such as "keyboard" or "Bixby, keyboard," or a touch 4013 on a text box in the normal application state 4001, the electronic device 101 may enter into the text box display state 4002. Upon obtaining a press of a hardware button, a voice command, such as "Finish" or "Bixby, Finish," or a touch 4014 on the back key in the text box display state 4002, the electronic device 101 may enter into the normal application state 4001. For example, in the normal application state 4001, the electronic device 101 may execute a speech processing application corresponding to a press of a hardware button or a voice command 4011, such as "Hi, Bixby." The electronic device 101 may enter into various user utterance processing modes and, if the speech processing application ends, go back to the normal application state 4001. For example, the electronic device 101 may execute the speech processing application corresponding to a voice command 4012, such as "Hi, Bixby," and a press-and-hold of a hardware button in the text box display state 4002. The electronic device 101 may enter into various user utterance processing modes and, if the speech processing application ends, go back to the text box display state 4002 or the normal application state 4001.

Figure 41A:
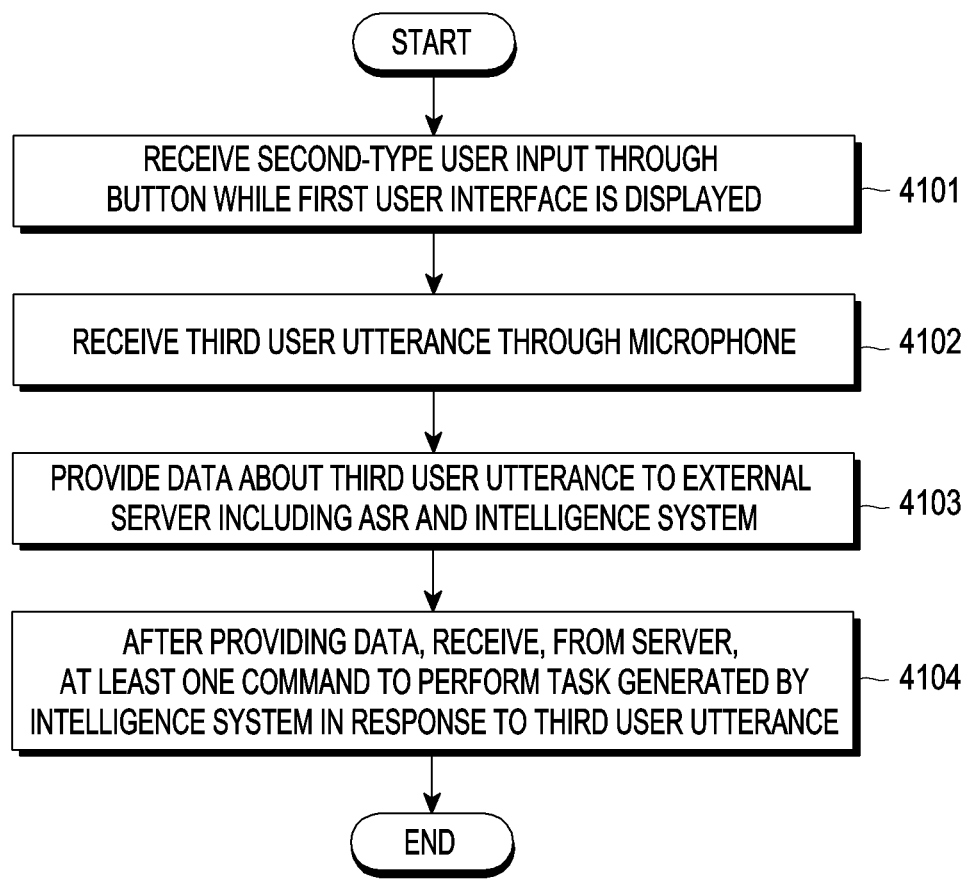
FIGS. 41A, 41B, and 41C are flowcharts illustrating a method of operating an electronic device according to various embodiments of the present invention.

FIG. 41A is a flowchart illustrating a third operation of a first application program according to various embodiments of the present invention. For example, the first application may be an application including the first user interface described above in connection with FIGS. 4A to 4C.

In operation 4101, the electronic device 101 (e.g., the processor 120 or 210) may receive a second-type user input through the button while displaying the first user interface on the touchscreen display.

In operation 4102, the electronic device 101 (e.g., the processor 120 or 210) may receive a third user utterance through the microphone. In operation 4103, the electronic device 101 (e.g., the processor 120 or 210) may provide third data about the third user utterance to the external server. In operation 4104, after providing the third data, the electronic device 101 (e.g., the processor 120 or 210 or the communication interface 170 or the communication module 220) may receive, from the external server, at least one command to perform a task generated by the intelligence system in response to the third user utterance. In other words, the electronic device 101 may enter not into the dictation mode but into the command mode although displaying the first user interface such as a text box. The electronic device 101 may enter into the dictation mode if receiving the first-type user input and into the command mode if receiving the second-type user input different from the first-type user input. In the command mode, the electronic device 101 may thus send identification information about the command mode and data about the received third user utterance to the external server. The external server may apply ASR to the received data about the user utterance corresponding to the identification information about the command mode to thereby obtain a text and apply NLU to the text to thereby generate a command, and send the command to the electronic device 101.

Figure 41B:
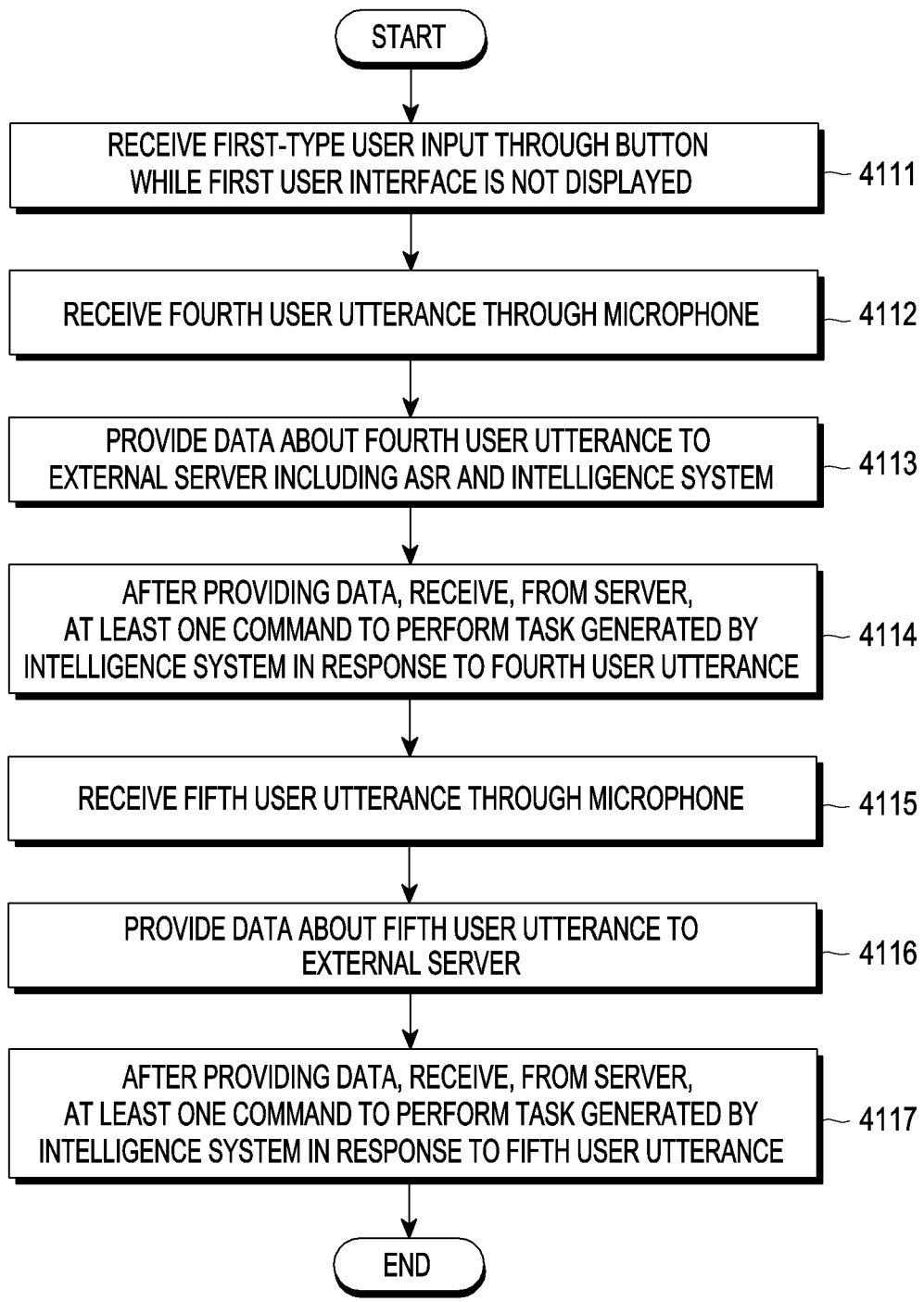

FIG. 41B is a flowchart illustrating a fourth operation of a first application program according to various embodiments of the present invention. For example, the first application may be an application including the first user interface described above in connection with FIGS. 4A to 4C.

In operation 4111, the electronic device 101 (e.g., the processor 120 or 210) may receive a second-type user input through a button while not displaying a first user interface. For example, the electronic device 101 may enter into the continuous command mode according to the second-type user input. In operation 4112, the electronic device 101 (e.g., the processor 120 or 210) may receive a fourth user utterance through the microphone. In operation 4113, the electronic device 101 (e.g., the processor 120 or 210 or the communication interface 170 or the communication module 220) may provide fourth data about the fourth user utterance to the external server. In operation 4114, after providing the fourth data, the electronic device 101 (e.g., the processor 120 or 210 or the communication interface 170 or the communication module 220) may receive, from the external server, at least one command to perform a task generated by the intelligence system in response to the fourth user utterance. In the continuous command mode, the electronic device may continuously keep the microphone in the on state. Or, the electronic device 101 may temporarily turn off the microphone and, after receiving and performing a command corresponding to the fourth data, turn the microphone back on. In operation 4115, the electronic device 101 (e.g., the processor 120 or 210) may receive a fifth user utterance through the microphone. In operation 4116, the electronic device 101 (e.g., the processor 120 or 210 or the communication interface 170 or the communication module 220) may provide fifth data about the fifth user utterance to the external server. In operation 4117, after providing the fifth data, the electronic device 101 (e.g., the processor 120 or 210 or the communication interface 170 or the communication module 220) may receive, from the external server, at least one command to perform a task generated by the intelligence system in response to the fifth user utterance.

Figure 41C:
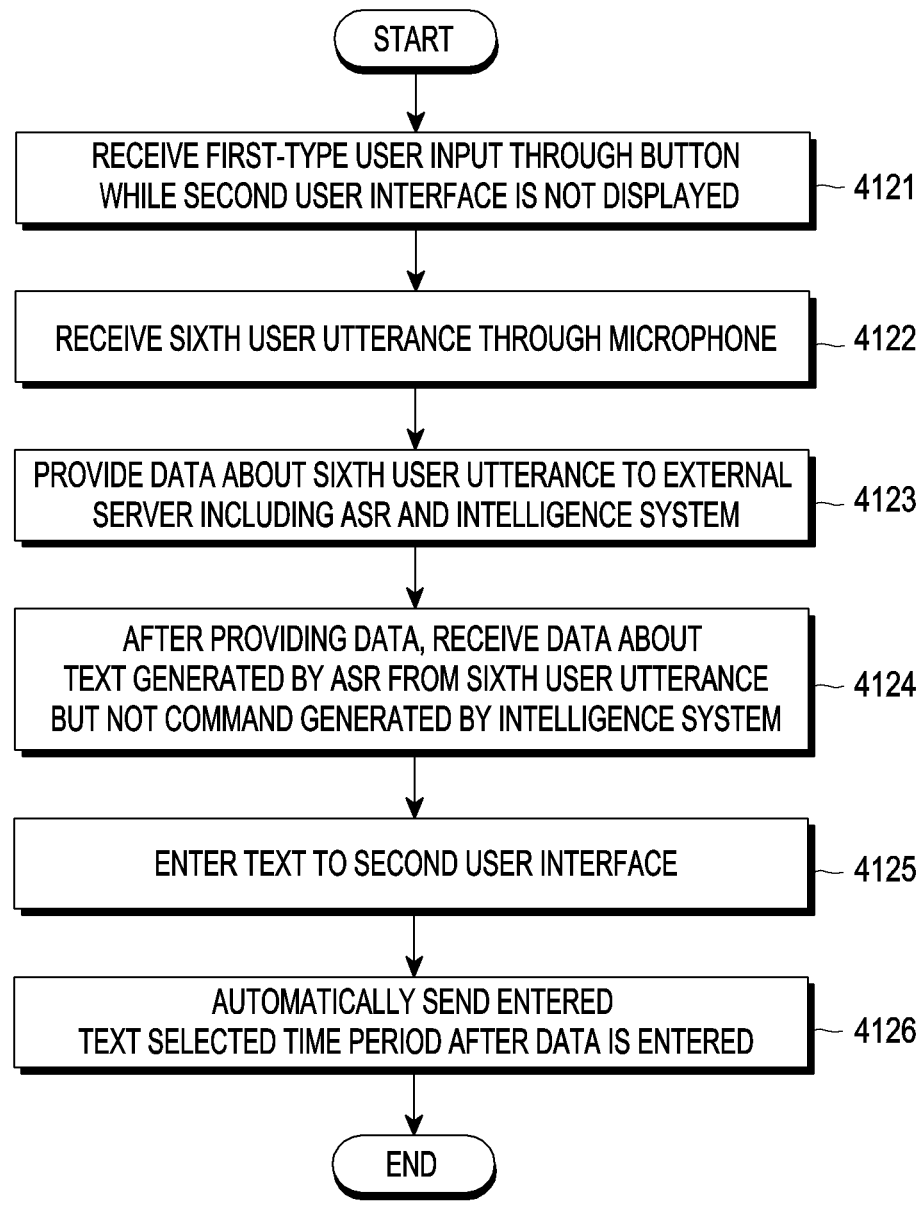

FIG. 41C is a flowchart illustrating a fifth operation of a first application program according to various embodiments of the present invention. For example, the first application may be an application including the first user interface described above in connection with FIGS. 4A to 4C.

In operation 4121, the electronic device 101 (e.g., the processor 120 or 210) may receive the first-type user input through the button while displaying a second user interface. For example, the electronic device 101 may enter into the dialog mode. In operation 4122, the electronic device 101 (e.g., the processor 120 or 210) may receive a sixth user utterance. In operation 4123, the electronic device 101 (e.g., the processor 120 or 210 or the communication interface 170 or the communication module 220) may provide sixth data about the sixth user utterance to the external server. In operation 4124, after providing the sixth data, the electronic device 101 (e.g., the processor 120 or 210 or the communication interface 170 or the communication module 220) may receive data about a text generated by ASR from the sixth user utterance but not receive a command generated by the intelligence system from the external server. In operation 4125, the electronic device 101 (e.g., the processor 120 or 210) may enter the text to the second user interface. In operation 4126, if a selected time period elapses after the data entry, the electronic device 101 (e.g., the processor 120 or 210) may automatically send the entered text via the wireless communication circuit.

Figure 42A:
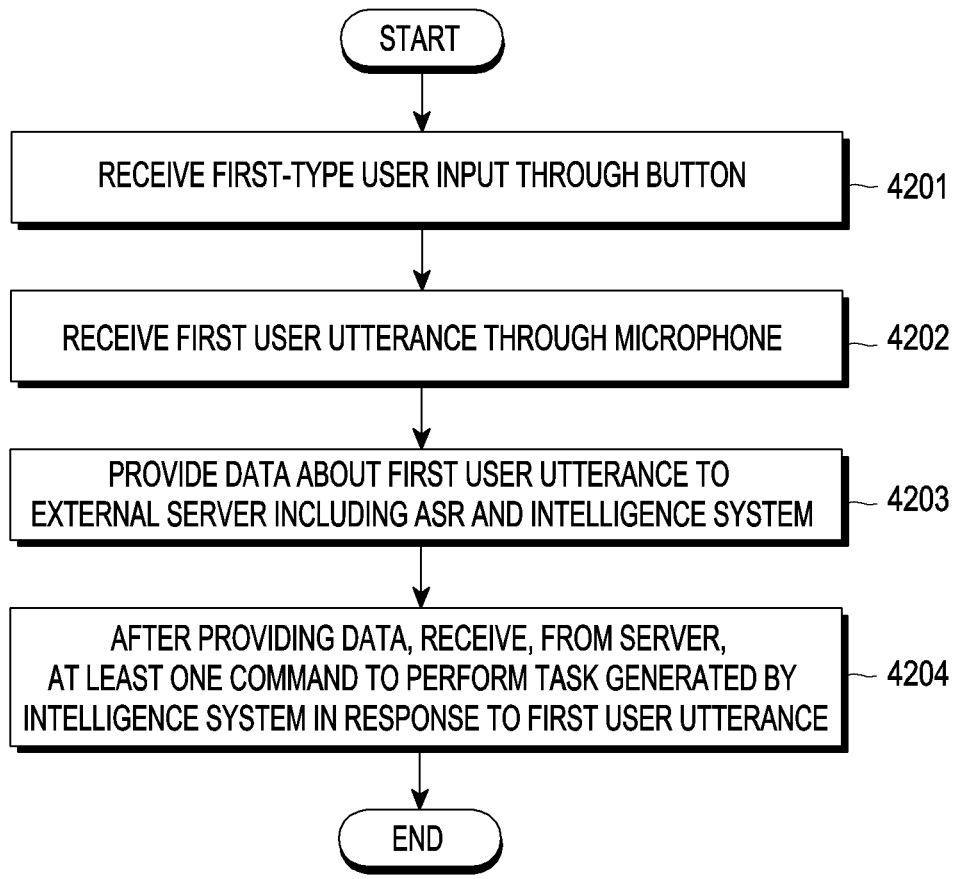
FIGS. 42A and 42B are flowcharts illustrating a method of operating an electronic device according to various embodiments of the present invention.
Figure 42B:
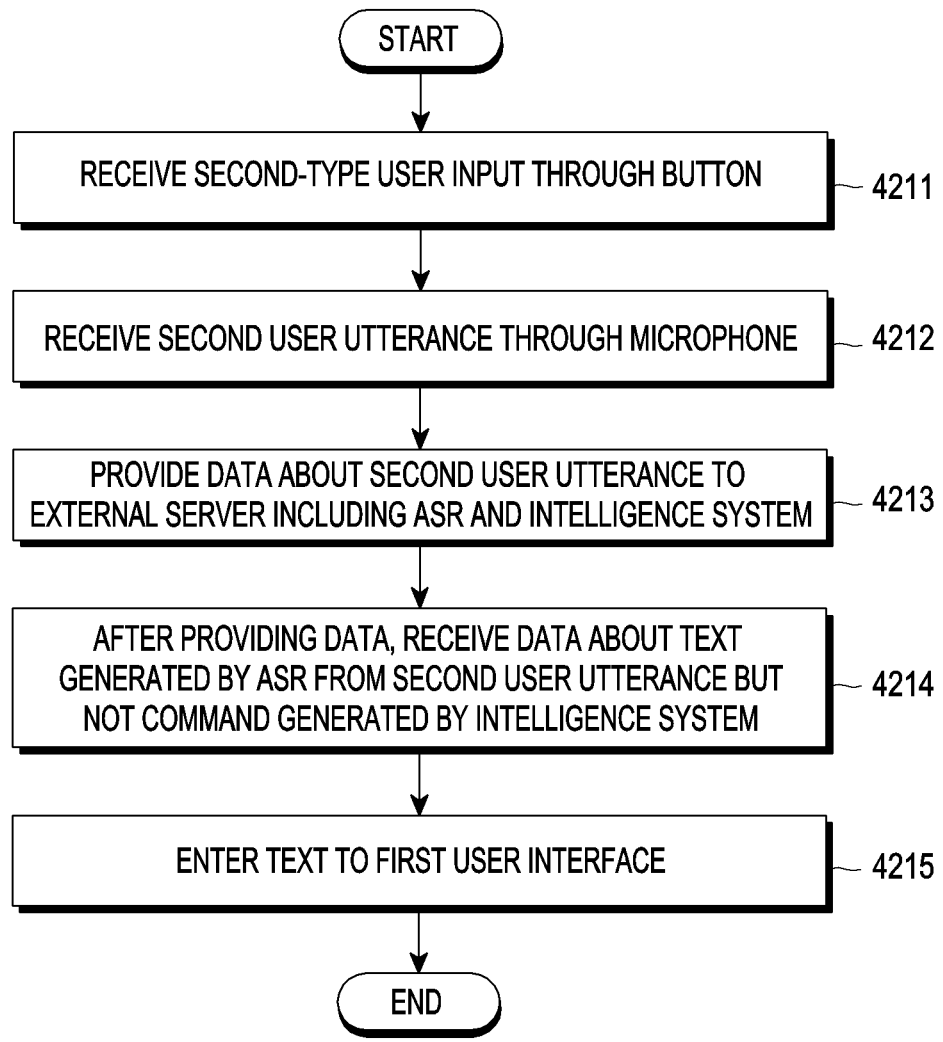

FIGS. 42A and 42B are flowcharts illustrating operations of an electronic device according to an embodiment of the present invention.

Referring to FIG. 42A, in operation 4201, the electronic device 101 (e.g., the processor 120 or 210) may receive a first-type user input through a button. For example, the electronic device 101 may be configured to enter into the command mode corresponding to the first-type user input regardless of the current state of the electronic device. In operation 4202, the electronic device 101 (e.g., the processor 120 or 210) may receive a first user utterance through the microphone. In operation 4203, the electronic device 101 (e.g., the processor 120 or 210 or the communication interface 170 or the communication module 220) may provide data about the first user utterance to an external server. In operation 4204, after providing the data about the first user utterance, the electronic device 101 (e.g., the processor 120 or 210 or the communication interface 170 or the communication module 220) may receive at least one command from the server to perform a task generated by the intelligence system in response to the first user utterance.

Referring to FIG. 42B, in operation 4211, the electronic device 101 (e.g., the processor 120 or 210) may receive a second-type user input through a button. For example, the electronic device 101 may be configured to enter into the user utterance processing mode to request only ASR of the dictation mode or dialog mode corresponding to the second-type user input regardless of the current state of the electronic device. In operation 4212, the electronic device 101 (e.g., the processor 120 or 210 or the communication interface 170 or the communication module 220) may receive a second user utterance through the microphone. In operation 4213, the electronic device 101 (e.g., the processor 120 or 210 or the communication interface 170 or the communication module 220) may provide data about the second user utterance to an external server. In operation 4214, after providing the data about the second user utterance, the electronic device 101 (e.g., the processor 120 or 210 or the communication interface 170 or the communication module 220) may not receive a command generated by the intelligence system in response to the second user utterance but may receive data about a text generated by ASR from the second user utterance. In operation 4215, the electronic device 101 (e.g., the processor 120 or 210) may enter the text to the first user interface and display the same.

An integrated intelligence system applicable to an electronic device (e.g., the electronic device 101) or external server (e.g., the external server 600) according to various embodiments of the present invention is described with reference to FIGS. 43 to 46.

Figure 43:
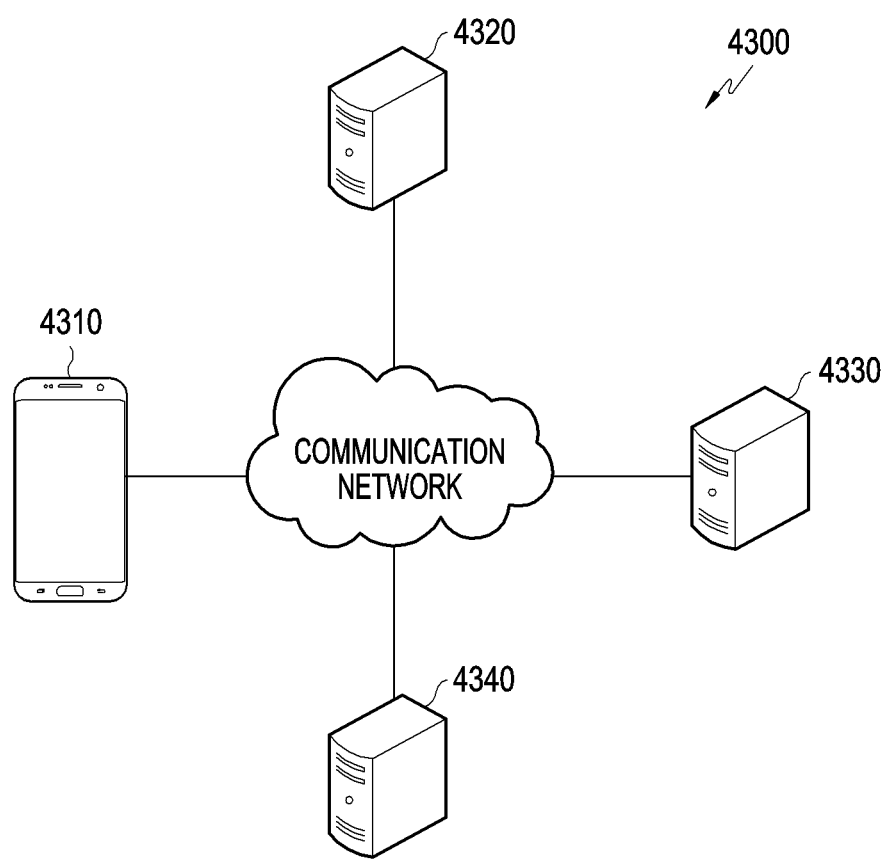
FIG. 43 is a view illustrating an integrated intelligence system according to various embodiments of the present invention.

FIG. 43 is a view illustrating an integrated intelligence system according to various embodiments of the present invention.

Referring to FIG. 43, an integrated intelligence system 4300 may include a user terminal 4310 (e.g., the electronic device 101), an intelligent server 4320, a personal information server 4330, or a proposing server 4340. At least one of the intelligent server 4320, the personal information server 4330, or the proposing server 4340 may be included in the above-described external server 600.

The user terminal 4310 may provide services necessary for the user through an application (or application program) (e.g., an alarm application, message application, photo (Gallery) application, etc.) stored in the user terminal 4310. For example, the user terminal 4310 may execute and operate another application through an intelligent application (or speech recognition application) stored in the user terminal 4310. The intelligent application of the user terminal 4310 may receive user inputs to execute and operate the other application through the intelligent application. The user inputs may be received through, e.g., a physical button, touchpad, voice input, or remote input. According to an embodiment of the present invention, the user terminal 4310 may be various terminal devices (or electronic devices) connectable to the internet, such as a cellular phone, smartphone, personal digital assistant (PDA), or laptop computer.

According to an embodiment of the present invention, the user terminal 4310 may receive a user utterance as a user input. The user terminal 4310 may receive the user utterance and generate a command to operate the application based on the user utterance. Accordingly, the user terminal 4310 may operate the application using the command. The intelligent server 4320 may receive the user's voice input (e.g., a user utterance) from the user terminal 4310 through a communication network and convert the voice input into text data. According to another embodiment, the intelligent server 4320 may generate (or select) a path rule (e.g., an action sequence) based on the text data. The path rule may include information about actions (or operations or tasks) to perform the functions of the application or information about parameters necessary to execute the operations. Further, the path rule may include the order of the operations of the application. The user terminal 4310 may receive the path rule, select an application according to the path rule, and execute the operations included in the path rule on the selected application.

For example, the user terminal 4310 may execute the operation and display, on the display, the screen corresponding to the state of the user terminal 4310 having performed the operation. As another example, the user terminal 4310 may execute the operation and abstain from displaying the results of performing the operation on the display. The user terminal 4310 may execute, e.g., a plurality of operations and display, on the display, only some results of the plurality of operations. The user terminal 4310 may display, on the display, e.g., the results of executing only the last operation in order. As another example, the user terminal 4310 may receive a user input and display the results of executing the operation on the display.

The personal information server 4330 may include a database storing user information. For example, the personal information server 4330 may receive user information (e.g., context information or application execution) from the user terminal 4310 and store the user information in the database. The intelligent server 4320 may receive the user information from the personal information server 4330 through the communication network and use the same in creating a path rule for user inputs. According to an embodiment of the present invention, the user terminal 4310 may receive user information from the personal information server 4330 through the communication network and use the same as information for managing the database.

The proposing server 4340 may include a database that stores information about functions to be provided or introductions of applications or functions in the terminal. For example, the proposing server 4340 may receive user information of the user terminal 4310 from the personal information server 4330 and include a database for functions that the user may use. The user terminal 4310 may receive the information about functions to be provided from the proposing server 4340 through the communication network and provide the information to the user.

Figure 44:
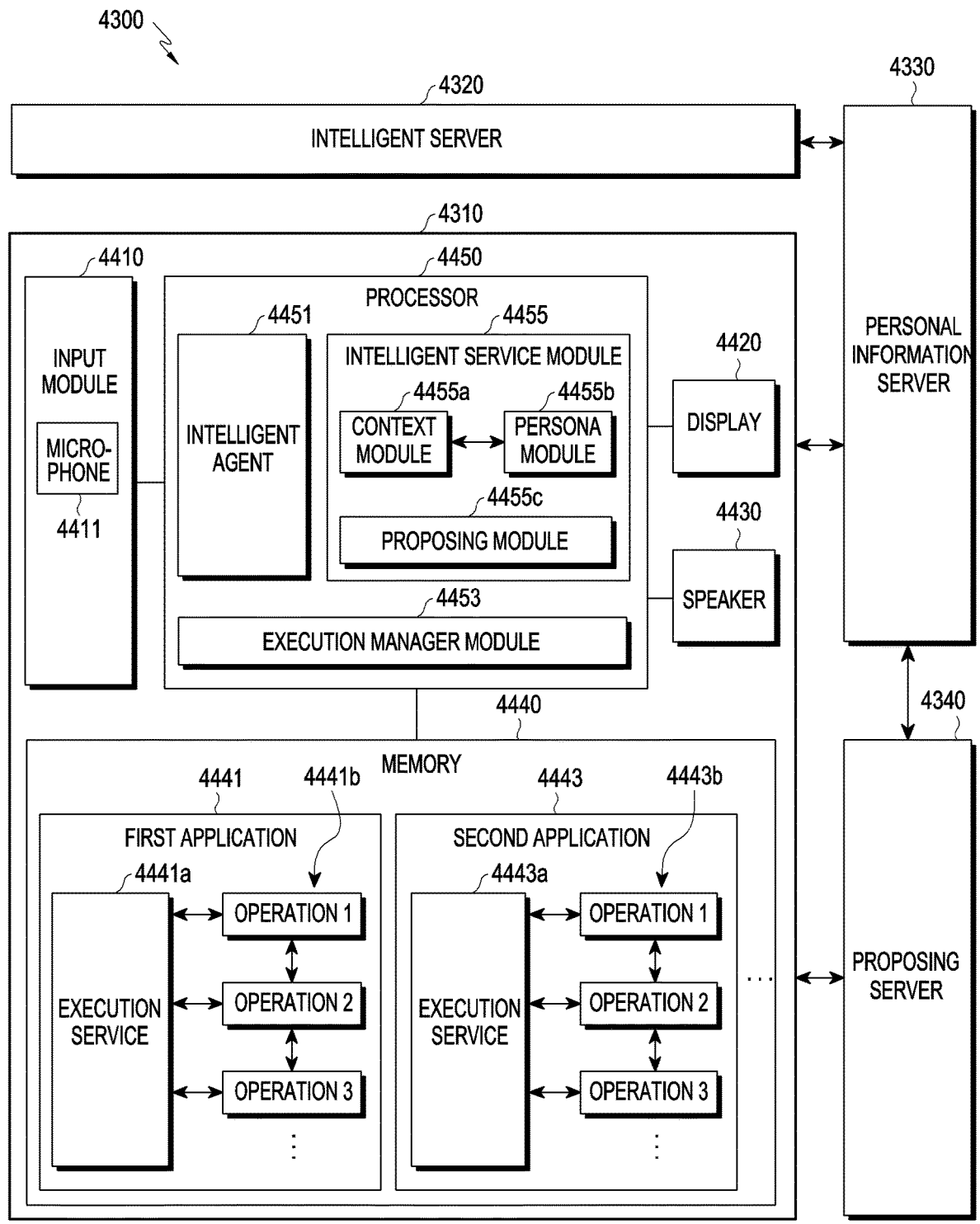
FIG. 44 is a block diagram illustrating a user terminal of an integrated intelligence system according to an embodiment of the present invention.

FIG. 44 is a block diagram illustrating a user terminal of an integrated intelligence system according to an embodiment of the present invention.

Referring to FIG. 44, a user terminal 4310 may include an input module 4410 (e.g., the microphone 288 or input device 250), a display 4420 (e.g., the display 160 or 260), a speaker 4430 (e.g., the speaker 282), a memory 4440 (e.g., the memory 130 or 230), or a processor 4450 (e.g., the processor 120 or 210). The user terminal 4310 may further include a housing. The components of the user terminal 4310 may be positioned in or on the housing.

According to an embodiment of the present invention, the input module 4410 may receive user inputs from the user. For example, the input module 4410 may receive a user input from an external device (e.g., a keyboard or headset) connected thereto. As another example, the input module 4410 may include a touchscreen combined with the display 4420 (e.g., a touchscreen display). As another example, the input module 4410 may include a hardware key (or a physical key) positioned in the user terminal 4310 (or the housing of the user terminal 4310).

According to an embodiment of the present invention, the input module 4410 may include a microphone 4411 capable of receiving user utterances as voice signals. For example, the input module 4410 may include a speech input system and receive user utterances as voice signals through the speech input system.

According to an embodiment of the present invention, the display 4420 may display images, videos, and/or application execution screens. For example, the display 4420 may display a graphic user interface (GUI) of an application.

According to an embodiment of the present invention, the speaker 4430 may output voice signals. For example, the speaker 4430 may output voice signals generated from inside the user terminal 4310 to the outside.

According to an embodiment of the present invention, the memory 4440 may store a plurality of applications 4441 and 4443. The plurality of applications 4441 and 4443 stored in the memory 4440 may be selected, executed, and operated according to the user's inputs.

According to an embodiment of the present invention, the memory 4440 may include a database that may store information necessary to recognize user inputs. For example, the memory 4440 may include a log database capable of storing log information. As another example, the memory 4440 may include a persona database capable of storing user information.

According to an embodiment of the present invention, the memory 4440 may store the plurality of applications 4441 and 4443. The plurality of applications 4441 and 4443 may be loaded and operated. For example, the plurality of applications 4441 and 4443 stored in the memory 4440 may be loaded and operated by the execution manager module 4453 of the processor 4450. The plurality of applications 4441 and 4443 may include execution services 4441*a* and 4443*a* or a plurality of operations (or unit operations) 4441*b* and 4443*b* performing functions. The execution services 4441*a* and 4443*a* may be generated by the execution manager module 4453 of the processor 4450 and may execute the plurality of operations 4441*b* and 4443*b*.

According to an embodiment of the present invention, when the operations 141*b* and 143*b* of the applications 4441 and 4443 are executed, the execution state screens as per the execution of the operations 4441*b* and 4443*b* may be displayed on the display 4420. The execution state screens may be screens, e.g., in the state of the operations 4441*b* and 4443*b* having been completed. The execution state screens may be screens, e.g., in the state of the execution of the operations 4441*b* and 4443*b* having been stopped (partial landing) (e.g., where parameters required for the operations 4441*b* and 4443*b* are not inputted).

According to an embodiment of the present invention, the execution services 4441*a* and 4443*a* may execute the operations 4441*b* and 4443*b* as per a path rule. For example, the execution services 4441*a* and 4443*a* may be generated by the execution manager module 4453, receive an execution request as per the path rule from the execution manager module 4453, and execute the operations 4441*b* and 4443*b* of the applications 4441 and 4443 according to the execution request. The execution services 4441*a* and 4443*a*, when the execution of the operations 4441*b* and 4443*b* is complete, may send completion information to the execution manager module 4453.

According to an embodiment of the present invention, where the plurality of operations 4441*b* and 4443*b* are executed on the applications 4441 and 4443, the plurality of operations 4441*b* and 4443*b* may sequentially be executed. When the execution of one operation (operation 1) is complete, the execution services 4441*a* and 4443*a* may open the next operation (operation 2) and send completion information to the execution manager module 4453. Here, open an operation may be appreciated as transitioning the operation into an executable state or preparing for the execution of the operation. In other words, unless the operation is open, the operation cannot be executed. Upon receiving the completion information, the execution manager module 4453 may send execution requests for the next operations 4441*b* and 4443*b* to the execution service (e.g., operation 2). According to an embodiment of the present invention, where the plurality of applications 4441 and 4443 are executed, the plurality of applications 4441 and 4443 may sequentially be executed. For example, when the execution of the last operation of the first application 4441 is complete, and completion information is thus sent, the execution manager module 4453 may send an execution request for the first operation of the second application 4443 to the execution service 4443*a*.

According to an embodiment of the present invention, where the plurality of operations 4441*b* and 4443*b* are executed on the applications 4441 and 4443, the resultant screens of execution of the plurality of operations 4441*b* and 4443*b* may be displayed on the display 4420. According to an embodiment of the present invention, only some of the plurality of resultant screens of execution of the plurality of operations 4441*b* and 4443*b* may be displayed on the display 4420.

According to an embodiment of the present invention, the memory 4440 may store an intelligent application (e.g., a speech recognition application) interworking with the intelligent agent 4451. The application interworking with the intelligent agent 4451 may receive a user utterance as a voice signal and process the same. According to an embodiment of the present invention, the application interworking with the intelligent agent 4451 may be operated by particular inputs entered through the input module 4410 (e.g., inputs through the hardware key or touchscreen, or particular voice inputs).

According to an embodiment of the present invention, the processor 4450 may control the overall operation of the user terminal 4310. For example, the processor 4450 may control the input module 4410 to receive user inputs. The processor 4450 may control the display 4420 to display images. The processor 4450 may control the speaker 4430 to output voice signals. The processor 4450 may control the memory 4440 to fetch or store necessary information.

According to an embodiment of the present invention, the processor 4450 may include the intelligent agent 4451, the execution manager module 4453, or the intelligent service module 4455. According to an embodiment of the present invention, the processor 4450 may execute commands stored in the memory 4440 to drive the intelligent agent 4451, the execution manager module 4453, or the intelligent service module 4455. Several modules mentioned according to various embodiments of the present invention may be implemented in hardware or software. According to an embodiment of the present invention, operations performed by the intelligent agent 4451, the execution manager module 4453, or the intelligent service module 4455 may be appreciated as operations performed by the processor 4450.

According to an embodiment of the present invention, the intelligent agent 4451 may generate commands to operate applications based on voice signals received as user inputs. According to an embodiment of the present invention, the execution manager module 4453 may receive commands generated by the intelligent agent 4451 to select, execute, and operate the applications 4441 and 4443 stored in the memory 4440. According to an embodiment of the present invention, the intelligent service module 4455 may be used to manage user information to process user inputs.

The intelligent agent 4451 may send user inputs received through the input module 4410 to the intelligent server 4320 for processing.

According to an embodiment of the present invention, the intelligent agent 4451 may pre-process the user inputs before sending the user inputs to the intelligent server 4320. According to an embodiment of the present invention, the intelligent agent 4451 may include an AEC module, an NS module, an EPD module, or an AGC module to pre-process the user inputs. The AEC module may remove echoes mixed in the user inputs. The NS module may suppress background noise mixed in the user inputs. The EPD module may detect end points of user voices contained in the user inputs to find where the user voices are present. The AGC module may recognize the user inputs and adjust the volume of the user inputs to be properly processed. According to an embodiment of the present invention, although the intelligent agent 4451 may include all of the pre-processing components described above to provide a better performance, the intelligent agent 4451 may alternatively include only some of the pre-processing components to be operated at reduced power.

According to an embodiment of the present invention, the intelligent agent 4451 may include a wake-up recognition module to recognize the user's invocation. The wake-up recognition module may recognize the user's wake-up command through the speech recognition module, and upon receiving the wake-up command, the wake-up recognition module may activate the intelligent agent 4451 to receive user inputs. According to an embodiment of the present invention, the wake-up recognition module of the intelligent agent 4451 may be implemented in a low-power processor (e.g., a processor included in an audio codec). According to an embodiment of the present invention, the intelligent agent 4451 may be activated by a user input through the hardware key. Where the intelligent agent 4451 is activated, an intelligent application (e.g., a speech recognition application) interworking with the intelligent agent 4451 may be executed.

According to an embodiment of the present invention, the intelligent agent 4451 may include a speech recognition module to execute user inputs. The speech recognition module may receive user inputs to execute operations on the application. For example, the speech recognition module may recognize limited user (voice) inputs (e.g., the "Click" sound made when the capturing operation is executed on the camera application) for executing operations, such as the wake-up command on the applications 4441 and 4443. The speech recognition module assisting the intelligent server 4320 in recognizing user inputs may recognize user commands processable in, e.g., the user terminal 4310 and quickly process the user commands. According to an embodiment of the present invention, the speech recognition module to execute user inputs of the intelligent agent 4451 may be implemented in an application processor.

According to an embodiment of the present invention, the speech recognition module (including the speech recognition module of the wake-up module) of the intelligent agent 4451 may recognize user inputs using an algorithm for recognizing voice. The algorithm used to recognize voice may be at least one of, e.g., a hidden markov model (HMM)

algorithm, an artificial neural network (ANN) algorithm, or a dynamic time warping (DTW) algorithm.

According to an embodiment of the present invention, the intelligent agent 4451 may convert the user's voice inputs into text data. According to an embodiment of the present invention, the intelligent agent 4451 may deliver the user's voice to the intelligent server 4420 and receive text data converted. Accordingly, the intelligent agent 4451 may display the text data on the display 4420.

According to an embodiment of the present invention, the intelligent agent 4451 may receive a path rule from the intelligent server 4320. According to an embodiment of the present invention, the intelligent agent 4451 may send the path rule to the execution manager module 4453.

According to an embodiment of the present invention, the intelligent agent 4451 may send an execution result log as per the path rule received from the intelligent server 4320 to the intelligent service module 4455. The execution result log sent may be accrued and managed in user preference information of a persona manager 4455b.

According to an embodiment of the present invention, the execution manager module 4453 may receive the path rule from the intelligent agent 4451, execute the applications 4441 and 4443, and allow the applications 4441 and 4443 to the operations 4441b and 4443b contained in the path rule. For example, the execution manager module 4453 may send command information to execute the operations 4441b and 4443b to the applications 4441 and 4443 and receive completion information about the operations 4441b and 4443b from the applications 4441 and 4443.

According to an embodiment of the present invention, the execution manager module 4453 may send or receive command information to execute the operations 4441b and 4443b of the applications 4441 and 4443 between the intelligent agent 4451 and the applications 4441 and 4443. The execution manager module 4453 may bind the applications 4441 and 4443 to be executed as per the path rule and send the command information about the operations 4441b and 4443b contained in the path rule to the application 4441 and 4443. For example, the execution manager module 4453 may sequentially send the operations 4441b and 4443b contained in the path rule to the applications 4441 and 4443 and sequentially execute the operations 4441b and 4443b of the applications 4441 and 4443 as per the path rule.

According to an embodiment of the present invention, the execution manager module 4453 may manage the execution states of the operations 4441b and 4443b of the applications 4441 and 4443. For example, the execution manager module 4453 may receive information about the execution states of the operations 4441b and 4443b from the applications 4441 and 4443. Where the execution states of the operations 4441b and 4443b are, e.g., partial landing states (e.g., when no parameters required for the operations 4441b and 4443b are entered yet), the execution manager module 4453 may send information about the partial landing states to the intelligent agent 4451. The intelligent agent 4451 may request the user to enter necessary information (e.g., parameter information) using the received information. Where the execution states of the operations 4441b and 4443b are, e.g., operation states, utterances may be received from the user, and the execution manager module 4453 may send information about the applications 4441 and 4443 being executed and information about the execution states to the intelligent agent 4451. The intelligent agent 4451 may receive parameter information about the user utterance through the intelligent server 4320 and send the received parameter information to the execution manager module 4453. The execution manager module 4453 may change the parameters of the operations 4441b and 4443b into new parameters using the received parameter information.

According to an embodiment of the present invention, the execution manager module 4453 may deliver the parameter information contained in the path rule to the applications 4441 and 4443. Where the plurality of applications 4441 and 4443 are sequentially executed as per the path rule, the execution manager module 4453 may deliver the parameter information contained in the path rule from one application to the other.

According to an embodiment of the present invention, the execution manager module 4453 may receive a plurality of path rules. The execution manager module 4453 may select a plurality of path rules based on a user utterance. For example, where a user utterance specifies a certain application 4441 to execute some operation 4441a but does not specify another application 4443 to execute the other operation 4443b, the execution manager module 4453 may receive a plurality of different path rules by which the same application 4441 (e.g., Gallery application) to execute the operation 4441a is executed and a different app 4443 (e.g., message application or telegram application) to execute the other operation 4443b is executed. The execution manager module 4453 may execute the same operations 4441b and 4443b (e.g., the same continuous operations 4441b and 4443b) of the plurality of path rules. Where the same operations have been executed, the execution manager module 4453 may display, on the display 4420, the state screen where the different applications 4441 and 4443 each contained in a respective one of the plurality of path rules may be selected.

According to an embodiment, the intelligent service module 4455 may include a context module 4455a, a persona manager 4455b, or a proposing module 4455c.

The context module 4455a may gather current states of the applications 4441 and 4443 from the applications 4441 and 4443. For example, the context module 4455a may receive context information indicating the current states of the applications 4441 and 4443 to gather the current states of the applications 4441 and 4443.

The persona manager 4455b may manage personal information of the user who uses the user terminal 4310. For example, the persona manager 4455b may gather use information and execution results for the user terminal 4310 to manage the user's personal information.

The proposing module 4455c may predict the user's intent to recommend the user for commands. For example, the proposing module 4455c may recommend the user for commands given the user's current state (e.g., time, place, context, or application).

Figure 45:
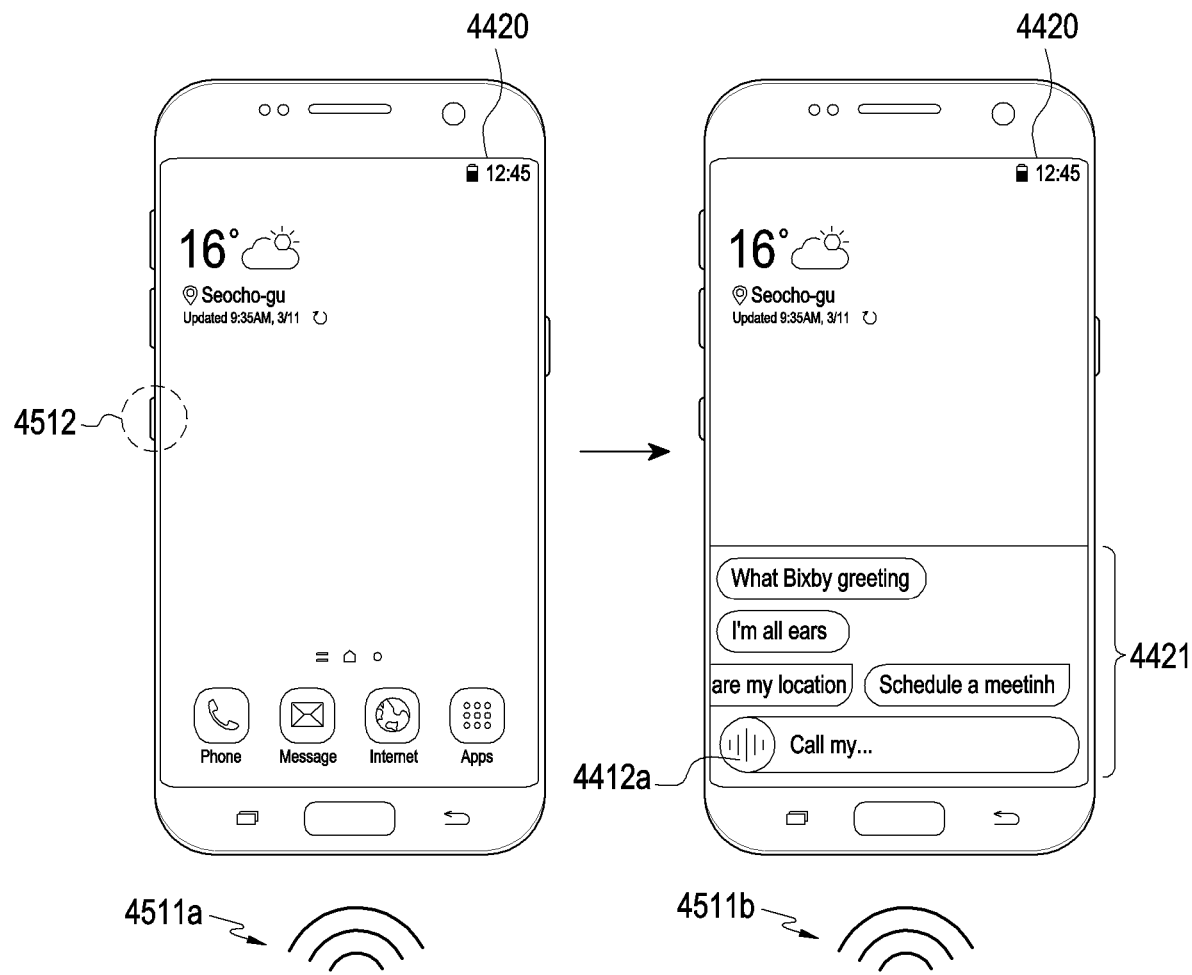
FIG. 45 is a view illustrating an example of executing an intelligent app on a user terminal according to an embodiment of the present invention.

FIG. 45 is a view illustrating an example of executing an intelligent application on a user terminal according to an embodiment of the present invention.

FIG. 45 illustrates an example in which the user terminal 4310 receives user inputs and executes an intelligent application (e.g., a speech recognition application) interworking with the intelligent agent 4451.

According to an embodiment of the present invention, the user terminal 4310 may execute an intelligent application to recognize voice through the hardware key 4512. For example, where the user terminal 4310 receives user inputs through the hardware key 4512, the user terminal 4310 may display a user interface (UI) 4421 of the intelligent application on the display 4420. The user may touch a speech recognition button 4421a in the UI 4421 of the intelligent application for voice entry 4511b with the intelligent application UI 4421 displayed on the display 4420. As another example, the user may continuously press the hardware key 4512 for voice entry 4511*b*.

According to an embodiment of the present invention, the user terminal 4310 may execute an intelligent application to recognize voice through the microphone 4411. For example, when a designated voice (e.g., "wake up!") is entered (4511*a*) through the microphone 4411, the user terminal 4310 may display the intelligent application UI 4421 on the display 4420.

Figure 46:
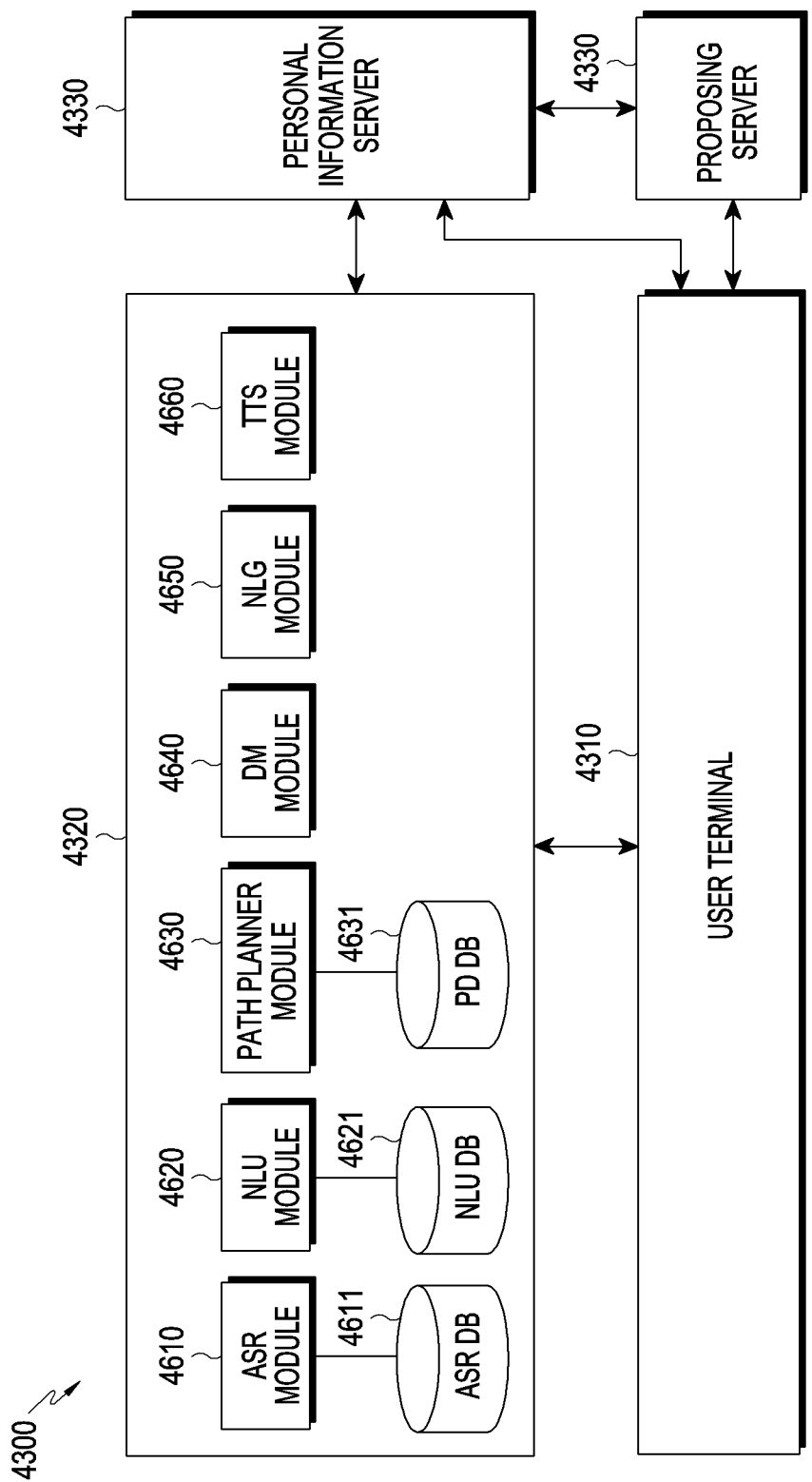
FIG. 46 is a block diagram illustrating an intelligent server in an integrated intelligence system according to an embodiment of the present invention.

FIG. 46 is a block diagram illustrating an intelligent server in an integrated intelligence system according to an embodiment of the present invention.

Referring to FIG. 46, an intelligent server 4320 may include an automatic speech recognition (ASR) module 4610 (e.g., the ASR module 751), a natural language understanding (NLU) module 4620 (e.g., the NLU module 753), a path planner module 4630 (e.g., the action planning manager 759), a dialog manager (DM) module 4640 (e.g., the DM 757), a natural language generating (NLG) module 4650 (e.g., the NLG manager 761), or a text-to-speech (TTS) module 4660 (e.g., the TTS manager 763).

The natural language understanding module 4620 or the path planner module 4630 of the intelligent server 4320 may generate a path rule (e.g., an action sequence or task).

According to an embodiment of the present invention, the automatic speech recognition (ASR) module 4610 may convert user inputs received from the user terminal 4310 into text data.

According to an embodiment of the present invention, the automatic speech recognition module 4610 may convert user inputs received from the user terminal 4310 into text data. For example, the automatic speech recognition module 4610 may include a speech recognition module. The speech recognition module may include an acoustic model and a language model. For example, the acoustic modem may include vocalization-related information, and the language model may include unit phonemic information and combinations of pieces of unit phonemic information. The speech recognition module may convert user utterances into text data using the vocalization-related information and unit phonemic information. Information about the acoustic model and the language model may be stored in, e.g., an automatic speech recognition (ASR) database (DB) 4611.

According to an embodiment of the present invention, the natural language understanding module 4620 may perform syntactic analysis or semantic analysis to grasp the user's intent. As per the syntactic analysis, the user input may be divided into syntactic units (e.g., words, phrases, or morphemes) and what syntactic elements the syntactic units have may be grasped. The semantic analysis may be performed using, e.g., semantic matching, rule matching, or formula matching. Thus, the natural language understanding module 4620 may obtain a domain, intent, or parameters (or slots) necessary to represent the intent for the user input.

According to an embodiment of the present invention, the natural language understanding module 4620 may determine the user's intent and parameters using the matching rule which has been divided into the domain, intent, and parameters (or slots) necessary to grasp the intent. For example, one domain (e.g., an alarm) may include a plurality of intents (e.g., alarm settings or releasing alarm), and one intent may include a plurality of parameters (e.g., time, repetition count, or alarm sound). The plurality of rules may include, e.g., one or more essential element parameters. The matching rule may be stored in a natural language understanding (NLU) database (DB) 4621.

According to an embodiment of the present invention, the natural language understanding module 4620 may grasp the meaning of a word extracted from the user input using linguistic features (e.g., syntactic elements) such as morphemes or phrases, match the grasped meaning of the word to the domain and intent, and determine the user's intent. For example, the natural language understanding module 4620 may calculate how many words extracted from the user input are included in each domain and intent to thereby determine the user's intent. According to an embodiment of the present invention, the natural language understanding module 4620 may determine the parameters of the user input using the word which is a basis for grasping the intent. According to an embodiment of the present invention, the natural language understanding module 4620 may determine the user's intent using the natural language understanding database 4621 storing the linguistic features for grasping the intent of the user input. According to an embodiment of the present invention, the natural language understanding module 4620 may determine the user's intent using a personal language model (PLM). For example, the natural language understanding module 4620 may determine the user's intent using personal information (e.g., contacts list or music list). The personal language model may be stored in, e.g., the natural language understanding database 4621. According to an embodiment of the present invention, the automatic speech recognition module 4610, but not the natural language understanding module 4620 alone, may recognize the user's voice by referring to the personal language model stored in the natural language understanding database 4621.

According to an embodiment of the present invention, the natural language understanding module 4620 may generate a path rule based on the intent of the user input and parameters. For example, the natural language understanding module 4620 may select an application to be executed based on the intent of the user input and determine operations to be performed on the selected application. The natural language understanding module 4620 may determine parameters corresponding to the determined operations to generate a path rule. According to an embodiment of the present invention, the path rule generated by the natural language understanding module 4620 may include information about the application to be executed, the operations to be executed on the application, and the parameters necessary to execute the operations.

According to an embodiment of the present invention, the natural language understanding module 4620 may generate one or more path rules based on the parameters and intent of the user input. For example, the natural language understanding module 4620 may receive a path rule set corresponding to the user terminal 4310 from the path planner module 4630, map the parameters and intent of the user input to the received path rule set, and determine the path rule.

According to an embodiment of the present invention, the natural language understanding module 4620 may determine the application to be executed, operations to be executed on the application, and parameters necessary to execute the operations based on the parameters and intent of the user input, thereby generating one or more path rules. For example, the natural language understanding module 4620 may generate a path rule by arranging the application to be executed and the operations to be executed on the application in the form of ontology or a graph model according to the user input using the information of the user terminal 4310. The generated path rule may be stored through, e.g., the path planner module 4630 in a path rule database (PR DB) 4631. The generated path rule may be added to the path rule set of the database 4631.

According to an embodiment of the present invention, the natural language understanding module 4620 may select at least one of a plurality of path rules generated. For example, the natural language understanding module 4620 may select the optimal one of the plurality of path rules. As another example, the natural language understanding module 4620 may select a plurality of path rules when only some operations are specified based on the user utterance. The natural language understanding module 4620 may determine one of the plurality of path rules by the user's additional input.

According to an embodiment of the present invention, the natural language understanding module 4620 may send the path rule to the user terminal 4310 at a request for the user input. For example, the natural language understanding module 4620 may send one path rule corresponding to the user input to the user terminal 4310. As another example, the natural language understanding module 4620 may send a plurality of path rules corresponding to the user input to the user terminal 4310. For example, where only some operations are specified based on the user utterance, the plurality of path rules may be generated by the natural language understanding module 4620.

According to an embodiment of the present invention, the path planner module 4630 may select at least one of the plurality of path rules.

According to an embodiment of the present invention, the path planner module 4630 may deliver a path rule set including the plurality of path rules to the natural language understanding module 4620. The plurality of path rules in the path rule set may be stored in the form of a table in the path rule database 4631 connected with the path planner module 4630. For example, the path planner module 4630 may deliver a path rule set corresponding to information (e.g., OS information or application information) of the user terminal 4310 which is received from the intelligent agent 4451 to the natural language understanding module 4620. The table stored in the path rule database 4631 may be stored, e.g., per domain or per domain version.

According to an embodiment of the present invention, the path planner module 4630 may select one or more path rules from the path rule set and deliver the same to the natural language understanding module 4620. For example, the path planner module 4630 may match the user's intent and parameters to the path rule set corresponding to the user terminal 4310 to select one or more path rules and deliver them to the natural language understanding module 4620.

According to an embodiment of the present invention, the path planner module 4630 may generate one or more path rules using the user's intent and parameters. For example, the path planner module 4630 may determine an application to be executed and operations to be executed on the application based on the user's intent and parameters to generate one or more path rules. According to an embodiment of the present invention, the path planner module 4630 may store the generated path rule in the path rule database 4631.

According to an embodiment of the present invention, the path planner module 4630 may store the path rule generated by the natural language understanding module 4620 in the path rule database 4631. The generated path rule may be added to the path rule set stored in the path rule database 4631.

According to an embodiment of the present invention, the table stored in the path rule database 4631 may include a plurality of path rules or a plurality of path rule sets. The plurality of path rule or the plurality of path rule sets may reflect the kind, version, type, or nature of the device performing each path rule.

According to an embodiment of the present invention, the dialog manager module 4640 may determine whether the user's intent grasped by the natural language understanding module 4620 is clear. For example, the dialog manager module 4640 may determine whether the user's intent is clear based on whether parameter information is sufficient. The dialog manager module 4640 may determine whether the parameters grasped by the natural language understanding module 4620 are sufficient to perform a task. According to an embodiment of the present invention, where the user's intent is unclear, the dialog manager module 4640 may perform feedback to send a request for necessary information to the user. For example, the dialog manager module 4640 may perform feedback to send a request for parameter information to grasp the user's intent.

According to an embodiment of the present invention, the dialog manager module 4640 may include a content provider module. Where the operation can be performed based on the intent and parameters grasped by the natural language understanding module 4620, the content provider module may generate the results of performing the task corresponding to the user input. According to an embodiment of the present invention, the dialog manager module 4640 may send the results generated by the content provider module to the user terminal 4310 in response to the user input.

According to an embodiment of the present invention, the natural language generating (NLG) module 4650 may convert designated information into text. The text information may be in the form of a natural language utterance. The designated information may be, e.g., information about an additional input, information indicating that the operation corresponding to the user input is complete, or information indicating the user's additional input (e.g., feedback information for the user input). The text information may be sent to the user terminal 4310 and displayed on the display 4420, or the text information may be sent to the text-to-speech module 4660 and converted into a voice.

According to an embodiment of the present invention, the text-to-speech module 4660 may convert text information into voice information. The text-to-speech module 4660 may receive the text information from the natural language generating module 4650, convert the text information into voice information, and send the voice information to the user terminal 4310. The user terminal 4310 may output the voice information through the speaker 4430.

According to an embodiment of the present invention, the natural language understanding module 4620, the path planner module 4630, and the dialog manager module 4640 may be implemented in a single module. For example, the natural language understanding module 4620, the path planner module 4630, and the dialog manager module 4640 may be implemented in a single module to determine the user's intent and parameter and to generate a response (e.g., a path rule) corresponding to the user's intent and parameters determined. Accordingly, the generated response may be transmitted to the user terminal 4310.

According to various embodiments of the present invention, a method of controlling an electronic device may include receiving a first-type user input through the button while a first user interface is not displayed on the touchscreen display, after receiving the first-type user input, receiving a first user utterance through the microphone, providing first data about the first user utterance to an external server including an automatic speech recognition (ASR) and intelligence system, and after providing the first data, receiving at least one command to perform a task generated by the intelligence system in response to the first user utterance from the external server.

According to various embodiments of the present invention, a method of controlling an electronic device may comprise receiving a first user input through the button while the first user interface is displayed on the touchscreen display, after receiving the first-type user input, receiving a second user utterance through the microphone, providing second data about the second user utterance to the external server, after providing the second data, receiving data about a text generated by the automatic speech recognition from the second user utterance from the external server but not receiving a command generated by the intelligence system, and entering the text to the first user interface.

According to various embodiments of the present invention the first-type user input may be one of a single press on the button, a double press on the button, a triple press on the button, a single press-and-hold on the button, or a double press-and-hold on the button.

According to various embodiments of the present invention, the method of controlling the electronic device may further comprise displaying the first user interface along with a virtual keyboard.

According to various embodiments of the present invention, the method of controlling the electronic device may further comprise enabling the processor to receive data about a text generated by ASR from the first user utterance in the first operation from the external server.

According to various embodiments of the present invention, the first application program may include at least one of a note application program, an email application program, a web browser application program, or a calendar application program.

According to various embodiments of the present invention, the first application program may include a message application. According to various embodiments of the present invention, the method of controlling the electronic device may further comprise automatically sending the entered text through the wireless communication circuit a selected time period after the text is entered.

According to various embodiments of the present invention, the method of controlling the electronic device may comprise receiving a second-type user input through the button while displaying the first user interface on the touchscreen display, after receiving the second-type user input, receiving a third user utterance through the microphone, providing third data about the third user utterance to the external server, and after providing the third data, receiving, from the external server, at least one command to perform a task generated by the intelligence system in response to the third user utterance.

According to various embodiments of the present invention, the method of controlling the electronic device may comprise receiving the second-type user input through the button while the first user interface is not displayed on the touchscreen display, after receiving the second-type user input, receiving a fourth user utterance through the microphone, providing fourth data about the fourth user utterance to the external server, after providing the fourth data, receiving, from the external server, at least one command to perform a task generated by the intelligence system in response to the fourth user utterance, receiving a fifth user utterance through the microphone, providing fifth data about the fifth user utterance to the external server, and after providing the fifth data, receiving, from the external server, at least one command to perform a task generated by the intelligence system in response to the fifth user utterance.

According to various embodiments of the present invention, the first-type user input and the second-type user input may differ from each other and be selected from one of a single press on the button, a double press on the button, a triple press on the button, a single press-and-hold on the button, or a double press-and-hold on the button.

According to various embodiments of the present invention, the method of controlling the electronic device may comprise receiving a first-type user input through the button while displaying the second user interface, after receiving the first-type user input, receiving a sixth user utterance through the microphone, providing sixth data about the sixth user utterance to the external server, after providing the sixth data, receiving, from the external server, data about a text generated by ASR from the sixth user utterance but not receiving a command generated by the intelligence system, entering the text to the second user interface, and automatically sending the entered text through the wireless communication circuit a selected time period after the text is entered.

According to various embodiments of the present invention, the method of controlling the electronic device may comprise receiving a first-type user input through the button, after receiving the first-type user input, receiving a first user utterance through the microphone, providing first data about the first user utterance to an external server including an automatic speech recognition (ASR) and intelligence system, and after providing the first data, receiving, from the external server, at least one command to perform a task generated by the intelligence system in response to the first user utterance.

According to various embodiments of the present invention, the method of controlling the electronic device may comprise receiving a second-type user input through the button, after receiving the second-type user input, receiving a second user utterance through the microphone, providing second data about the second user utterance to the external server, after providing the second data, receiving data about a text generated by ASR from the second user utterance from the external server but not receiving a command generated by the intelligence system, and entering the text to the first user interface.

According to various embodiments of the present invention, the method of controlling the electronic device may further comprise enabling the processor to receive data about a text generated by ASR from the first user utterance in the first operation from the external server.

According to various embodiments of the present invention, the method of controlling the electronic device may further comprise performing the first operation independently from displaying the first user interface on the display.

According to various embodiments of the present invention, the method of controlling the electronic device may further comprise performing the second operation in at least one case where the electronic device is in locked state or the touchscreen display is turned off.

According to various embodiments of the present invention, the method of controlling the electronic device may further comprise performing the second operation while displaying the first user interface on the touchscreen display.

According to various embodiments of the present invention, the method of controlling the electronic device may comprise receiving a user utterance through the microphone, sending information associated with whether to perform natural language understanding (NLU) on a text obtained by performing automatic speech recognition (ASR) on data about the user utterance along with the data about the user utterance to an external server performing at least one of automatic speech recognition (ASR) or natural language understanding (NLU), if the information indicates not to perform the natural language understanding, receiving the text for the data about the user utterance from the external server and, if the information indicates to perform the natural language understanding, receiving a command obtained as a result of performing the natural language understanding on the text from the external server.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to an embodiment of the disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program commands may include not only machine language codes but also high-level language codes which are executable by various computing means using an interpreter. The aforementioned hardware devices may be configured to operate as one or more software modules to carry out exemplary embodiments of the disclosure, and vice versa.

Modules or programming modules in accordance with various embodiments of the disclosure may include at least one or more of the aforementioned components, omit some of them, or further include other additional components. Operations performed by modules, programming modules or other components in accordance with various embodiments of the disclosure may be carried out sequentially, simultaneously, repeatedly, or heuristically. Furthermore, some of the operations may be performed in a different order, or omitted, or include other additional operation(s).

According to various embodiments of the present invention, there is provided a storage medium storing commands which, when executed by at least one processor, enable the at least one processor to perform at least one operation that comprises receiving a first-type user input through the button while the first user interface is not displayed on the touchscreen display, after receiving the first-type user input, receiving a first user utterance through the microphone, providing first data about the first user utterance to an external server including an automatic speech recognition (ASR) system and an intelligence system, after providing the first data, receiving at least one command to perform a task generated by the intelligence system in response to the first user utterance from the external server, receiving the first user input through the button while the first user interface is displayed on the touchscreen display, after receiving the first-type user input, receiving a second user utterance through the microphone, providing second data about the second user utterance to the external server, after providing the second data, receiving data about a text generated by the automatic speech recognition from the second user utterance from the external server but not receiving a command generated by the intelligence system, and entering the text to the first user interface.

Or, the at least one operation may comprise receiving a first-type user input through the button, after receiving the first-type user input, receiving a first user utterance through the microphone, providing first data about the first user utterance to an external server including an automatic speech recognition (ASR) and intelligent system, after providing the first data, receiving at least one command to perform tasks generated by the intelligent system in response to the first user utterance from the external server, receiving a second-type user input through the button, after receiving the second-type user input, receiving a second user utterance through the microphone, providing second data about the second user utterance to the external server, after providing the second data, receiving data about a text generated by the ASR from the second user utterance from the external server but not receiving a command generated by the intelligence system, and entering the text to the first user interface.

Or, the at least one operation may comprise receiving a user utterance through the microphone, sending information associated with whether to perform natural language understanding (NLU) on a text obtained by performing automatic speech recognition (ASR) on data about the user utterance along with the data about the user utterance to an external server performing at least one of automatic speech recognition (ASR) or natural language understanding (NLU), if the information indicates not to perform the natural language understanding, receiving the text for the data about the user utterance from the external server and, if the information indicates to perform the natural language understanding, receiving a command obtained as a result of performing the natural language understanding on the text from the external server.

The embodiments disclosed herein are proposed for description and understanding of the disclosed technology and does not limit the scope of the present invention. Accordingly, the scope of the present invention should be interpreted as including all changes or various embodiments based on the technical spirit of the present invention.

What is claimed is:

1. A portable communication device comprising:
a display;
a microphone;
at least one processor; and
memory storing instructions,
wherein the instructions, when executed by the at least one processor individually or collectively, cause the portable communication device to:
receive a first voice input via the microphone;
based at least in part on the first voice input corresponding to a wake-up voice command to execute a speech processing application, display a first execution screen corresponding to the speech processing application via the display;
receive a second voice input via the microphone; and
based at least in part on the second voice input corresponding to the wake-up voice command and a specified voice command, the specified voice command being different from the wake-up voice command and associated with a voice input processing mode, activate the voice input processing mode and display, via the display, an indicator indicative of listening to a user voice input, the indicator being different from the first execution screen, and
wherein in a case that a third voice input is received while a text box and the indicator are displayed in the voice input processing mode, a first text corresponding to the third voice input is input with respect to the text box and displayed in the text box.

2. The portable communication device of claim 1, wherein the instructions, when executed by the at least one processor individually or collectively, cause the portable communication device to:
based at least in part on the third voice input being received while the text box is not activated, display second text corresponding to one or more voice commands associated with the third voice input via the display.

3. The portable communication device of claim 2, wherein the instructions, when executed by the at least one processor individually or collectively, cause the portable communication device to:
display the second text in an area of the display different from an area in which the text box is displayed.

4. The portable communication device of claim 1, wherein the instructions, when executed by the at least one processor individually or collectively, cause the portable communication device to:
based at least in part on the first voice input being received while the text box is activated, display the first execution screen via the display.

5. The portable communication device of claim 1, wherein the instructions, when executed by the at least one processor individually or collectively, cause the portable communication device to:
display a graphical keyboard interface with the text box while the text box is activated.

6. A method in a portable communication device, comprising:
receiving a first voice input via a microphone of the portable communication device;
based at least in part on the first voice input corresponding to a wake-up voice command to execute a speech processing application, displaying a first execution screen corresponding to the speech processing application via a display of the portable communication device;
receiving a second voice input via the microphone; and
based at least in part on the second voice input corresponding to the wake-up voice command and a specified voice command, the specified voice command being different from the wake-up voice command and associated with a voice input processing mode, activating the voice input processing mode and displaying, via the display, an indicator indicative of a state of listening to obtain a user voice input, the indicator being different from the first execution screen, and
wherein in a case that a third voice input is received while a text box and the indicator are displayed in the voice input processing mode, a first text corresponding to the third voice input is input with respect to the text box and displayed in the text box.

7. The method of claim 6, further comprising:
based at least in part on the third voice input being received while the text box is not activated, displaying a second text corresponding to one or more voice commands associated with the third voice input via the display.

8. The method of claim 7, further comprising:
displaying the second text in an area of the display different from an area in which the text box is displayed.

9. The method of claim 6, further comprising:
based at least in part on the first voice input being received while the text box is activated, displaying the first execution screen via the display.

10. The method of claim 6, further comprising:
displaying a graphical keyboard interface with the text box while the text box is activated.

11. A non-transitory computer readable medium storing instructions executable by at least one processor individually or collectively to cause a portable communication device to perform:
receiving a first voice input via a microphone of the portable communication device;
based at least in part on the first voice input corresponding to a wake-up voice command to execute a speech processing application, displaying a first execution screen corresponding to the speech processing application via a display of the portable communication device;
receiving a second voice input via the microphone; and
based at least in part on the second voice input corresponding to the wake-up voice command and a specified voice command, the specified voice command being different from the wake-up voice command and associated with a voice input processing mode, activating the voice input processing mode and displaying, via the display, an indicator indicative of a state of listening to obtain a user voice input, the indicator being different from the first execution screen, and
wherein in a case that a third voice input is received while a text box and the indicator are displayed in the voice input processing mode, a first text corresponding to the third voice input is input with respect to the text box and displayed in the text box.

12. The non-transitory computer readable medium of claim 11, further comprising:
based at least in part on the third voice input being received while the text box is not activated, displaying a second text corresponding to one or more voice commands associated with the third voice input via the display.

13. The non-transitory computer readable medium of claim 12, further comprising:
    displaying the second text in an area of the display different from an area in which the text box is displayed.

14. The non-transitory computer readable medium of claim 11, further comprising:
    based at least in part on the first voice input being received while the text box is activated, displaying the first execution screen via the display.

15. The non-transitory computer readable medium of claim 11, further comprising:
    displaying a graphical keyboard interface with the text box while the text box is activated.

* * * * *